(12) United States Patent
Shiokawa

(10) Patent No.: US 10,473,902 B2
(45) Date of Patent: *Nov. 12, 2019

(54) PROJECTION SYSTEM AND PROJECTION-TYPE IMAGE DISPLAY APPARATUS

(71) Applicant: SEIKO EPSON CORPORATION, Tokyo (JP)

(72) Inventor: Koji Shiokawa, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 54 days.

This patent is subject to a terminal disclaimer.

(21) Appl. No.: 15/601,606

(22) Filed: May 22, 2017

(65) Prior Publication Data

US 2017/0351070 A1    Dec. 7, 2017

(30) Foreign Application Priority Data

Jun. 1, 2016  (JP) .................................. 2016-109811
Dec. 9, 2016  (JP) .................................. 2016-239109

(51) Int. Cl.
| | |
|---|---|
| G02B 15/22 | (2006.01) |
| G02B 27/00 | (2006.01) |
| G02B 13/22 | (2006.01) |
| G02B 7/04  | (2006.01) |

(Continued)

(52) U.S. Cl.
CPC .............. *G02B 15/22* (2013.01); *G02B 7/04* (2013.01); *G02B 13/22* (2013.01); *G02B 15/161* (2013.01); *G02B 27/0025* (2013.01); *G03B 33/12* (2013.01)

(58) Field of Classification Search
CPC ...... G02B 3/00; G02B 3/0037; G02B 3/0081; G02B 13/00; G02B 13/0015; G02B 13/16; G02B 13/18; G02B 15/22; G02B 15/161; G02B 27/0025
See application file for complete search history.

(56) References Cited

U.S. PATENT DOCUMENTS

| | | |
|---|---|---|
| 715,998 A   | 12/1902 | Davis |
| 717,287 A   | 12/1902 | Schellenbach |
| 6,896,375 B2 | 5/2005 | Peterson et al. |

(Continued)

FOREIGN PATENT DOCUMENTS

| | | |
|---|---|---|
| JP | 2005-128286 A | 5/2005 |
| JP | 2005-157153 A | 6/2005 |

(Continued)

*Primary Examiner* — Thong Q Nguyen
(74) *Attorney, Agent, or Firm* — Oliff PLC

(57) ABSTRACT

A projection system that can be incorporated in a projector includes a first lens unit that makes a screen (enlargement-side image formation plane), which is located on the enlargement-side, conjugate with an intermediate image and a second lens unit that makes the intermediate image conjugate with a reduction-side image formation plane, which is located on the reduction side. The first lens unit has positive power, and the second lens unit has negative power. A second-lens-unit intermediate-image-side first lens, which is provided in the second lens unit and closest to the intermediate image, has positive power. The following expression is satisfied:

$-0.3 \leq fU1/fU2 < 0$ where fU1 denotes the focal length of the first lens unit, and fU2 denotes the focal length of the second lens unit.

18 Claims, 22 Drawing Sheets

(51) Int. Cl.
*G02B 15/16* (2006.01)
*G03B 33/12* (2006.01)

(56) References Cited

U.S. PATENT DOCUMENTS

| | | | |
|---|---|---|---|
| 7,009,765 B2 | 3/2006 | Gohman | |
| 7,090,354 B2 | 8/2006 | Engle et al. | |
| 7,150,537 B2 | 12/2006 | Peterson et al. | |
| 7,159,988 B2 | 1/2007 | Yatsu et al. | |
| 7,175,287 B2 | 2/2007 | Gohman | |
| 7,227,682 B2 * | 6/2007 | Caldwell | G02B 7/008 359/432 |
| 7,261,420 B2 | 8/2007 | Yatsu et al. | |
| 7,413,312 B2 | 8/2008 | Engle et al. | |
| 9,041,848 B2 | 5/2015 | Inoko | |
| 9,217,912 B2 | 12/2015 | Peterson et al. | |
| 9,261,767 B2 * | 2/2016 | Takano | G03B 21/28 |
| 9,429,826 B2 | 8/2016 | Peterson et al. | |
| 2004/0002653 A1 | 1/2004 | Greppi et al. | |
| 2004/0223123 A1 | 11/2004 | Engle et al. | |
| 2004/0227990 A1 | 11/2004 | Peterson et al. | |
| 2004/0233394 A1 | 11/2004 | Gohman | |
| 2004/0257539 A1 | 12/2004 | Peterson et al. | |
| 2005/0088762 A1 | 4/2005 | Ohashi | |
| 2005/0117123 A1 | 6/2005 | Yatsu et al. | |
| 2007/0146652 A1 | 6/2007 | Peterson et al. | |
| 2007/0253076 A1 * | 11/2007 | Takaura | G02B 13/16 359/780 |
| 2008/0130106 A1 | 6/2008 | Gohman | |
| 2009/0244701 A1 | 10/2009 | Gohman | |
| 2012/0300296 A1 * | 11/2012 | Lin | G02B 13/16 359/433 |
| 2014/0204351 A1 * | 7/2014 | Matsuo | G02B 13/16 353/98 |
| 2015/0042965 A1 | 2/2015 | Peterson et al. | |
| 2015/0234167 A1 | 8/2015 | Ode | |
| 2016/0070158 A1 | 3/2016 | Peterson et al. | |
| 2016/0246034 A1 | 8/2016 | Amano | |
| 2016/0246035 A1 | 8/2016 | Amano | |
| 2016/0246036 A1 | 8/2016 | Amano | |
| 2016/0246037 A1 | 8/2016 | Amano | |
| 2016/0246038 A1 | 8/2016 | Amano | |
| 2016/0256034 A1 | 9/2016 | Woolman et al. | |
| 2016/0256038 A1 | 9/2016 | Goldfarb et al. | |
| 2016/0341943 A1 | 11/2016 | Peterson et al. | |
| 2016/0342075 A1 | 11/2016 | Peterson et al. | |
| 2016/0363746 A1 * | 12/2016 | Minefuji | G03B 21/006 |
| 2017/0343776 A1 * | 11/2017 | Nagatoshi | G02B 13/04 |
| 2017/0343777 A1 | 11/2017 | Nagatoshi | |
| 2017/0343779 A1 * | 11/2017 | Nagahara | G02B 13/16 |
| 2018/0059389 A1 * | 3/2018 | Inoue | G02B 13/16 |
| 2018/0164554 A1 * | 6/2018 | Shiokawa | G02B 13/06 |

FOREIGN PATENT DOCUMENTS

| | | | | |
|---|---|---|---|---|
| JP | 2006-523318 | * | 10/2006 | |
| JP | 2010-211219 | * | 9/2010 | |
| JP | 2011-081415 | * | 4/2011 | |
| JP | 5266642 | * | 8/2013 | G03B 21/14 |
| JP | 2014-29392 A | | 2/2014 | |
| JP | 2015-152890 A | | 8/2015 | |
| JP | 2016-156982 A | | 9/2016 | |
| JP | 2016-156983 A | | 9/2016 | |
| JP | 2016-156984 A | | 9/2016 | |
| JP | 2016-156985 A | | 9/2016 | |
| JP | 2016-156986 A | | 9/2016 | |
| JP | 2017-211477 A | | 11/2017 | |
| JP | 2017-211478 A | | 11/2017 | |
| JP | 2017-211481 A | | 11/2017 | |

\* cited by examiner

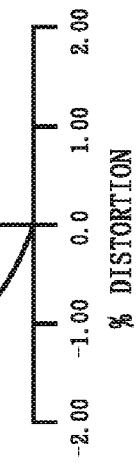
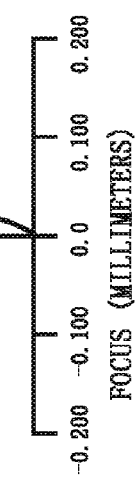
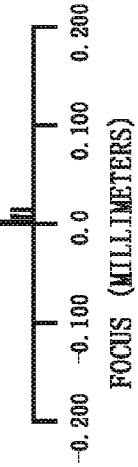
FIG. 9

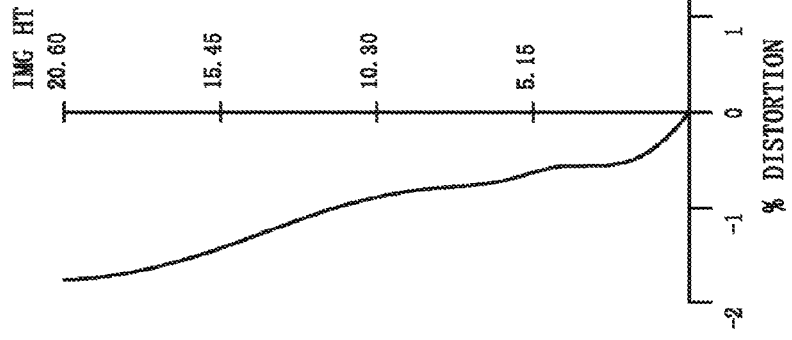
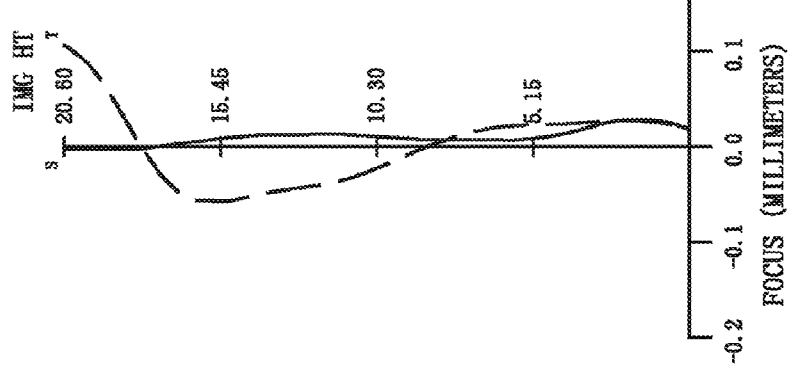
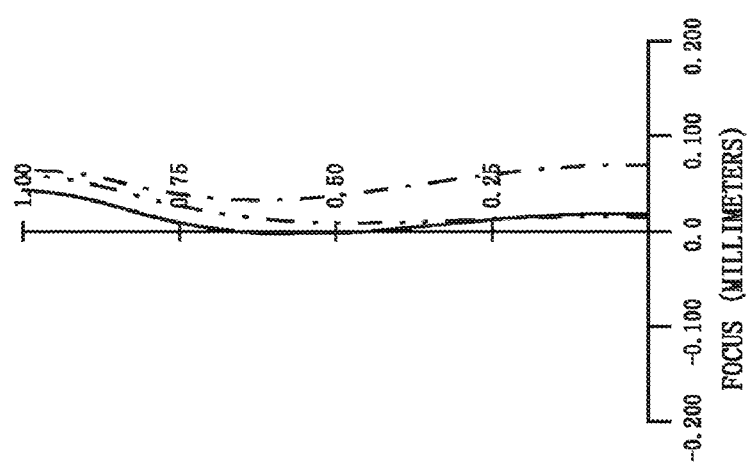
FIG.22

PROJECTION SYSTEM AND PROJECTION-TYPE IMAGE DISPLAY APPARATUS

BACKGROUND

1. Technical Field

The present invention relates to a projection system suitable to be incorporated in a projection-type image display apparatus that enlarges and projects an image on an image display device and further relates to a projection-type image display apparatus including the projection system.

2. Related Art

JP-A-2014-29392 describes an optical system that can be incorporated in a projection-type image display apparatus, such as a projector. The optical system described in JP-A-2014-29392, when incorporated in a projection-type image display apparatus, forms an intermediate image of an image on an image display device in the optical system and further forms an image of the intermediate image on a screen. That is, the optical system described in JP-A-2014-29392 includes a first lens unit that makes the screen (enlargement-side image formation plane) conjugate to the intermediate image and a second lens unit that makes the intermediate image conjugate to a reduction-side image formation plane (image on image display device).

In such an optical system, it is required to increase the angle of view so that the image on the image display device can be enlarged and projected even when the projection-type image display apparatus is disposed in a position close to the screen.

Increasing the angle of view of the optical system, however, tends to produce field curvature of the image projected on the screen. To solve the problem, increasing the number of lenses that form the optical system allows suppression of the field curvature in the projected image. Increasing the number of lenses, however, not only increases the overall length of the lens and the lens diameter of an enlargement-side lens but also increases the cost of the optical system and hence the manufacturing cost of the projection-type image display apparatus.

SUMMARY

An advantage of some aspects of the invention is to provide a projection system that can prevent field curvature of projected image accompanied by an increase in the angle of view without an increase in the number of lenses. Another advantage of some aspects of the invention is to provide a projection-type image display apparatus in which the projection system is incorporated.

A projection system according to an aspect of the invention includes a first lens unit that makes an enlargement-side image formation plane, which is located on an enlargement-side, conjugate with an intermediate image and a second lens unit that makes the intermediate image conjugate with a reduction-side image formation plane, which is located on a reduction side. The first lens unit has positive power, and the second lens unit has negative power. A second-lens-unit intermediate-image-side first lens, which is provided in the second lens unit and closest to the intermediate image, has positive power. The following expression is satisfied:

$-0.3 \leq fU1/fU2 < 0$ where fU1 denotes a focal length of the first lens unit, and fU2 denotes a focal length of the second lens unit.

According to the aspect of the invention, since the second-lens-unit intermediate-image-side first lens, which is provided in the second lens unit and closest to the first lens unit, is a positive lens, the intermediate image is readily formed in a position shifted from the second-lens-unit intermediate-image-side first lens toward the first lens unit. Since the intermediate image is formed by the positive lens, distortion produced by the first lens unit is readily corrected by the second lens unit. Further, since the projection system according to the aspect of the invention satisfies the conditional expression, it is easy to increase an angle of view without an increase in the number of lenses. Further, since the projection system according to the aspect of the invention satisfies the conditional expression, the lens diameter of the second lens unit can be reduced. That is, when the value of the conditional expression exceeds the lower limit, the focal length of the first lens unit increases, so that it is not easy to increase the angle of view. Further, when the value of the conditional expression exceeds the lower limit, the inclination of light rays between the second lens unit and the intermediate image with respect to the optical axis increases, resulting in degradation in field curvature and an increase in the diameter of the lens that is provided in the second lens unit and closest to the intermediate image (second-lens-unit intermediate-image-side first lens). On the other hand, when the value of the conditional expression exceeds the upper limit, the second lens unit has positive power, so that light rays incident from the side facing the intermediate image on the first lens unit become roughly telecentric light rays or light rays the overall diameter of which increases. As a result, since the burden on the first lens unit increases, it is necessary to increase the number of lenses of the first lens unit for aberration correction.

In the aspect of the invention, a chief ray of off-axis light rays that travel between the second-lens-unit intermediate-image-side first lens and a first-lens-unit intermediate-image-side lens, which is provided in the first lens unit and closest to the intermediate image, may approach an optical axis when the chief ray travels from the second-lens-unit intermediate-image-side first lens toward the first-lens-unit intermediate-image-side lens. In the configuration described above, distortion produced by the first lens unit is more readily corrected by the second lens unit.

In the aspect of the invention, a focus position on the intermediate image where the off-axis light rays are brought into focus desirably approaches the second-lens-unit intermediate-image-side first lens with distance toward an off-axis side. In the configuration described above, distortion produced by the first lens unit is more readily corrected by the second lens unit.

In the aspect of the invention, the second-lens-unit intermediate-image-side first lens desirably has a refractive index greater than 1.7 and an Abbe number smaller than 35. When the refractive index is greater than 1.7, the intermediate image is readily formed in a position shifted from the second-lens-unit intermediate-image-side first lens toward the first lens unit, whereby a variety of aberrations are readily corrected. When the Abbe number is smaller than 35, the chromatic aberrations are readily corrected. In the present specification, the refractive index is the refractive index at the d line.

In the aspect of the invention, a first-lens-unit enlargement-side lens, which is provided in the first lens unit and closest to the enlargement-side image formation plane, is desirably made of a resin and an aspheric lens having negative power. When the first-lens-unit enlargement-side lens is an aspheric lens having negative power, the diameter thereof can be reduced. Further, when the first-lens-unit enlargement-side lens is made of a resin, the lens is readily processed, and the manufacturing cost thereof can be suppressed.

In the aspect of the invention, the first lens unit desirably includes a first-lens-unit enlargement-side lens, a first lens group having at least two lenses each having negative power, and a second lens group arranged from the enlargement-side toward the intermediate image. To change the size of an image projected on the enlargement-side image formation plane, the first lens group and the second lens group are desirably moved along the optical axis with the first-lens-unit enlargement-side lens fixed to perform focusing. In the configuration described above, when the projection size is changed, focusing is readily performed.

In the aspect of the invention, at least one of a first-lens-unit intermediate-image-side lens, which is provided in the first lens unit and is closest to the intermediate image, and a second-lens-unit intermediate-image-side second lens, which is provided in the second lens unit and located in a position adjacent to the second-lens-unit intermediate-image-side first lens, is desirably an aspheric lens. That is, at least one of the two lenses located on opposite sides of the second-lens-unit intermediate-image-side first lens is desirably an aspheric lens. When at least one of the lenses described above is an aspheric lens, field curvature can be corrected in a high image height position. Field curvature can therefore be satisfactorily corrected.

In the aspect of the invention, the second lens unit may include a mirror that is located between the second-lens-unit intermediate-image-side first lens and a second-lens-unit intermediate-image-side second lens, which is located in the position adjacent to the second-lens-unit intermediate-image-side first lens, and the mirror may deflect the optical path between the second-lens-unit intermediate-image-side first lens and the second-lens-unit intermediate-image-side second lens. In the configuration described above, since the projection system can be folded, the projection system is readily incorporated into a projection-type image display apparatus, such as a projector. Further, the arrangement of the mirror between the second-lens-unit intermediate-image-side first lens and the second-lens-unit intermediate-image-side second lens allows the intermediate image to be formed in a position relatively remote from the mirror. As a result, in a case where scratches, dust, and other defects are present on the surface of the mirror, a situation in which these undesirable objects are displayed in the enlargement-side image formation plane can be avoided.

In the aspect of the invention, a second-lens-unit reduction-side first lens, which is provided in the second lens unit and closest to the reduction-side image formation plane, and a second-lens-unit reduction-side second lens, which is located in the position adjacent to the second-lens-unit reduction-side first lens on the side closer to the intermediate image, each desirably have positive power, and at least one of the second-lens-unit reduction-side first lens and the second-lens-unit reduction-side second lens desirably has a refractive index greater than 1.75 but smaller than 2.00 and an Abbe number greater than 20 but smaller than 45. In the configuration described above, field curvature and chromatic aberrations are readily corrected.

In the aspect of the invention, a second-lens-unit reduction-side first lens, which is provided in the second lens unit and closest to the reduction-side image formation plane, may have positive power, a second-lens-unit reduction-side second lens, which is located in the position adjacent to the second-lens-unit reduction-side first lens on a side closer to the intermediate image, may have negative power, and the following expressions may be satisfied:

$$1.75 < nd11 < 2;$$

$$20 < vd11 < 45;$$

$$nd11 - nd12 > 0.1; \text{ and}$$

$$vd12 - vd11 > 40$$

where nd11 and vd11 denote a refractive index and an Abbe number of the second-lens-unit reduction-side first lens, respectively, and nd12 and vd12 denote a refractive index and an Abbe number of the second-lens-unit reduction-side second lens, respectively. In the configuration described above, chromatic aberrations are readily corrected.

In the aspect of the invention, even in a case where the projection system has a wide angle of viewing of 120° or greater, occurrence of aberrations can be suppressed without an increase in the number of lenses.

A projection-type image display apparatus according to another aspect of the invention includes the projection system described above and an image display device that displays an image in the reduction-side image formation plane.

According to the aspect of the invention, an increase in the angle of view of the projection system can be achieved without occurrence of field curvature in the image suppressed and an increase in the number of lenses. The projection-type image display apparatus can therefore project an image displayed in the reduction-side image formation plane by the image display device on a screen (enlargement-side image formation plane) with the angle of view increased and distortion suppressed. Further, in the projection system, an increase in the number of lenses is suppressed, and an increase in manufacturing cost of the projection system is suppressed, whereby an increase in manufacturing cost of the projection-type image display apparatus can be suppressed.

BRIEF DESCRIPTION OF THE DRAWINGS

The invention will be described with reference to the accompanying drawings, wherein like numbers reference like elements.

FIG. 9 is an aberration diagram of the projection system in a case where the lenses thereof are located in Position 2.

FIG. 22 is an aberration diagram of the projection system in a case where the lenses thereof are located in Position 3.

DESCRIPTION OF EXEMPLARY EMBODIMENTS

A projection system according to an embodiment of the invention and a projection-type image display apparatus including the projection system will be described below in detail with reference to the drawings.

Projection-Type Image Display Apparatus

Figure 1:
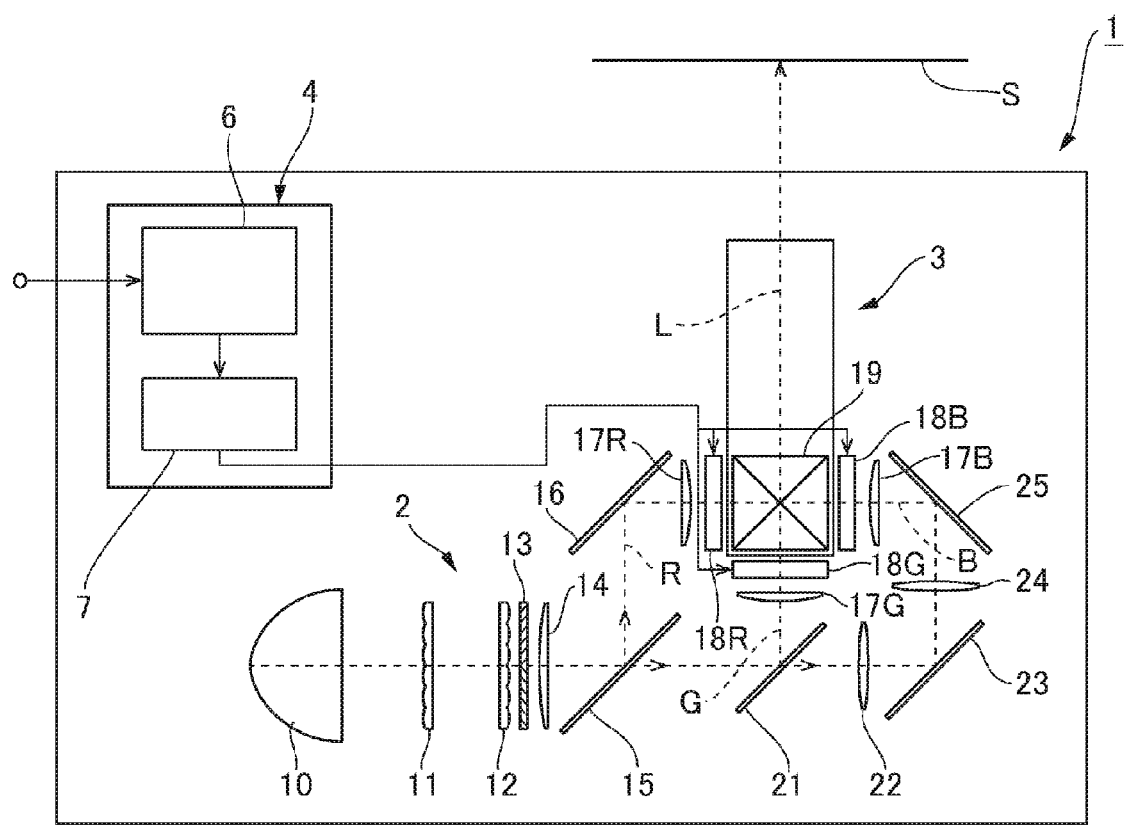
FIG. 1 shows a schematic configuration of a projection-type image display apparatus including a projection system according to an embodiment of the invention.

FIG. 1 is a schematic configuration diagram of a projector including a projection system according to an embodiment of the invention. A projector (projection-type image display apparatus) 1 includes an image light generating system 2, which generates image light to be projected on a screen S, a projection system 3, which enlarges and projects the image light, and a controller 4, which controls the action of the image light generating system 2, as shown in FIG. 1.

Image Light Generating System and Controller

The image light generating system 2 includes a light source 10, a first optical integration lens 11, a second optical integration lens 12, a polarization conversion element 13, and a superimposing lens 14. The light source 10 is formed, for example, of an ultralight-pressure mercury lamp or a solid-state light source. Each of the first optical integration lens 11 and the second optical integration lens 12 includes a plurality of lens elements arranged in an array. The first optical integration lens 11 divides a light flux from the light source 10 into a plurality of light fluxes. The lens elements of the first optical integration lens 11 bring the light flux from the light source 10 into focus in the vicinity of the lens elements of the second optical integration lens 12.

The polarization conversion element 13 converts light from the second optical integration lens 12 into predetermined linearly polarized light. The superimposing lens 14 superimposes images of the lens elements of the first optical integration lens 11, which pass through the second optical integration lens 12, on one another on a display area of each of liquid crystal panels 18R, 18G, and 18B, which will be described later.

The image light generating system 2 includes a first dichroic mirror 15, a reflection mirror 16 and a field lens 17R, and the liquid crystal panel 18R. The first dichroic mirror 15 reflects R light that is part of the light rays incident through the superimposing lens 14 and transmits G light and B light that are part of the light rays incident through the superimposing lens 14. The R light reflected off the first dichroic mirror 15 travels via the reflection mirror 16 and the field lens 17R and impinges on the liquid crystal panel 18R. The liquid crystal panel 18R is an image display device. The liquid crystal panel 18R modulates the R light in accordance with an image signal to form a red image.

The image light generating system 2 further includes a second dichroic mirror 21, a field lens 17G, and the liquid crystal panel 18G. The second dichroic mirror 21 reflects the G light that is part of the light rays through the first dichroic mirror 15 and transmits the B light that is part of the light rays through the first dichroic mirror 15. The G light reflected off the second dichroic mirror 21 travels through the field lens 17G and impinges on the liquid crystal panel 18G. The liquid crystal panel 18G is an image display device. The liquid crystal panel 18G modulates the G light in accordance with an image signal to form a green image.

The image light generating system 2 further includes a relay lens 22, a reflection mirror 23, a relay lens 24, a reflection mirror 25, and a field lens 17B, and the liquid crystal panel 18B. The B light having passed through the second dichroic mirror 21 travels via the relay lens 22, the reflection mirror 23, the relay lens 24, the reflection mirror 25, and the field lens 17B and impinges on the liquid crystal panel 18B. The liquid crystal panel 18B is an image display device. The liquid crystal panel 18B modulates the B light in accordance with an image signal to form a blue image.

The liquid crystal panels 18R, 18G, and 18B surround a cross dichroic prism 19 in three directions. The cross dichroic prism 19 is a light combining prism and combines the light fluxes modulated by the liquid crystal panels 18R, 18G, and 18B with one another to form image light.

The cross dichroic prism 19 forms part of the projection system 3. The projection system 3 enlarges the combined image light from the cross dichroic prism 19 (images formed by liquid crystal panels 18R, 18G, and 18B) and projects the enlarged image light on the screen S.

The controller 4 includes an image processor 6, to which an external image signal, such as a video signal, is inputted, and a display driver 7, which drives the liquid crystal panels 18R, 18G, and 18B on the basis of an image signal outputted from the image processor 6.

The image processor 6 converts the image signal inputted from an external apparatus into image signals containing grayscales and other parameters of the colors. The display driver 7 causes the liquid crystal panels 18R, 18G, and 18B to operate on the basis of the color image signals outputted from the image processor 6. The image processor 6 thus displays images corresponding to the image signals on the liquid crystal panels 18R, 18G, and 18B.

Projection System

The projection system 3 will next be described. In the following sections, Examples 1 to 5 will be described as examples of the configuration of the projection system 3 incorporated in the projector 1.

Example 1

Figure 2:
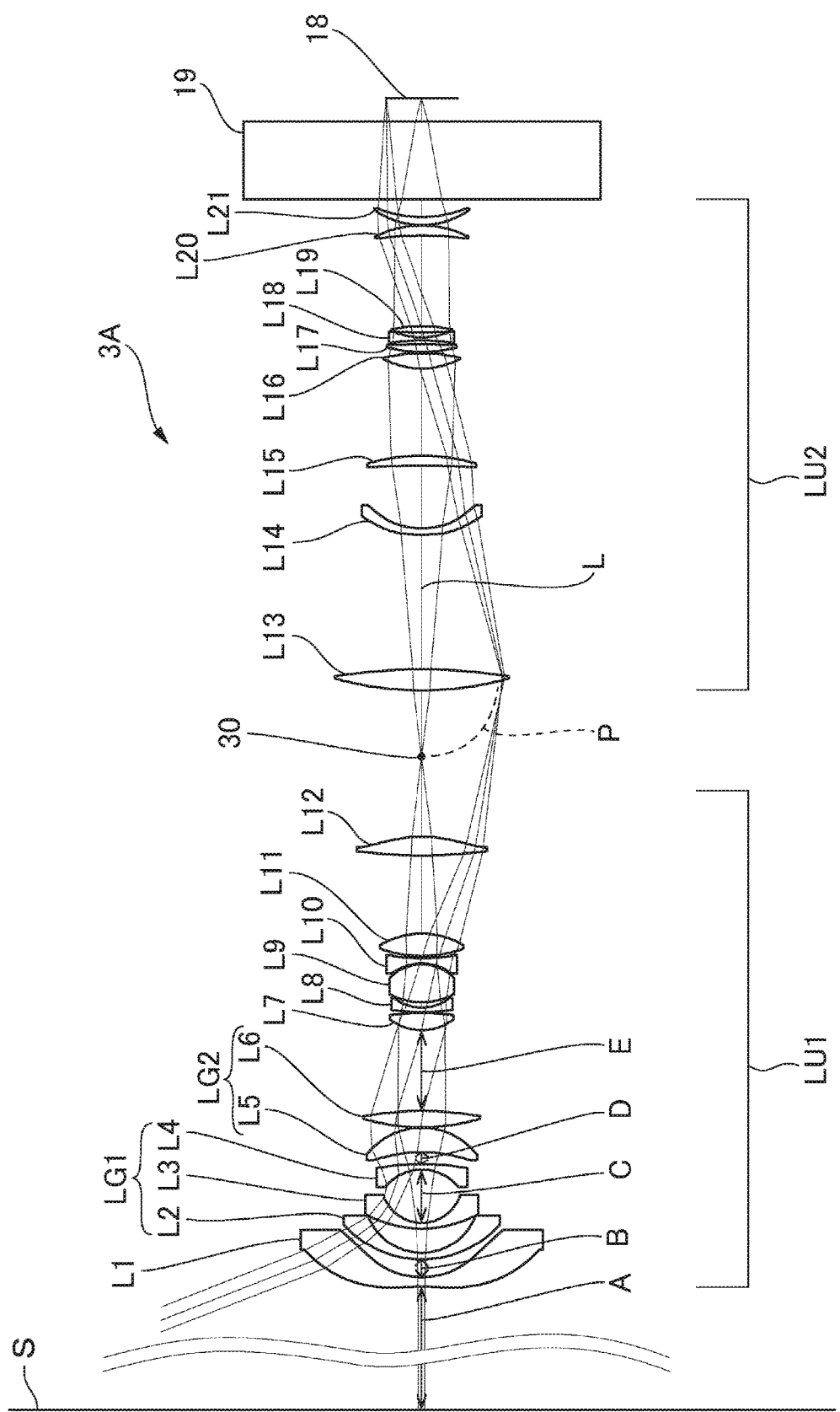
FIG. 2 is a configuration diagram of a projection system of Example 1.

FIG. 2 is a configuration diagram (light ray diagram) of a projection system of Example 1. A projection system 3A of the present example is formed of a first lens unit LU1, which makes the screen S, which is an enlargement-side image formation plane, conjugate with an intermediate image 30, and a second lens unit LU2, which makes the intermediate image 30 conjugate with the liquid crystal panels 18 (18R, 18G, and 18B), each of which is a reduction-side image formation plane, as shown in FIG. 2. The first lens unit LU1 has positive power. The second lens unit LU2 has negative power.

The first lens unit LU1 includes a first-lens-unit first lens L1 (first-lens-unit enlargement-side lens), which has negative power, a first lens group LG1, which has negative power, and a second lens group LG2, which has positive power, arranged from the side facing the screen S toward the intermediate image 30. The first-lens-unit first lens L1 is made of a resin. The first-lens-unit first lens L1 is an aspheric lens having aspheric shapes on both sides. In the present example, the first-lens-unit first lens L1 has a shape that is convex toward the screen S.

The first lens group LG1 is formed of at least two lenses. In the present example, the first lens group LG1 is formed of three lenses, a first-lens-unit second lens L2, a first-lens-unit third lens L3, and a first-lens-unit fourth lens L4, arranged from the side facing the screen S toward the intermediate image 30. Each of the first-lens-unit second lens L2, the first-lens-unit third lens L3, and the first-lens-unit fourth lens L4 has negative power. The second lens group LG2 is formed of at least two lenses each having positive power. In the present example, the second lens group LG2 is formed of a first-lens-unit fifth lens L5, which has positive power, and a first-lens-unit sixth lens L6, which has positive power.

The first-lens-unit LU1 further includes a first-lens-unit seventh lens L7, a first-lens-unit eighth lens L8, a first-lens-unit ninth lens L9, a first-lens-unit tenth lens L10, a first-lens-unit eleventh lens L11, and a first-lens-unit twelfth lens L12 arranged from the side facing the second lens group LG2 toward the intermediate image 30. The first lens unit LU1 is therefore formed of 12 lenses. In the present example, the first-lens-unit eighth lens L8 is an aspheric lens having aspheric shapes on both sides. The first-lens-unit twelfth lens L12 (first-lens-unit intermediate-image-side lens) is also an aspheric lens having aspheric shapes on both sides.

The second lens unit LU2 includes a second-lens-unit first lens L13, a second-lens-unit second lens L14, a second-lens-unit third lens L15, a second-lens-unit fourth lens L16, a second-lens-unit fifth lens L17, a second-lens-unit sixth lens L18, a second-lens-unit seventh lens L19, a second-lens-unit eighth lens L20, and a second-lens-unit ninth lens L21 arranged from the side facing the intermediate image 30 toward the liquid crystal panels. That is, the second lens unit LU2 is formed of 9 lenses. The cross dichroic prism 19 is disposed between the second-lens-unit ninth lens L21 and the liquid crystal panels 18.

The second-lens-unit first lens L13 (second-lens-unit intermediate-image-side first lens) has positive power. In the present example, the second-lens-unit first lens L13 is a convex lens having convex shapes on both sides. The second-lens-unit second lens L14 is an aspheric lens having aspheric shapes on both sides. The second-lens-unit ninth lens L21 (second-lens-unit reduction-side first lens), which is closest to the liquid crystal panels 18, and the second-lens-unit eighth lens L20 (second-lens-unit reduction-side second lens), which is located in the position adjacent to the second-lens-unit ninth lens L21, each have positive power.

In the projection system 3A, the chief ray of off-axis light rays that travel between the first-lens-unit twelfth lens L12 and the second-lens-unit first lens L13, which are located on opposite sides of the intermediate image 30, approaches the optical axis L when the chief ray travels from the second-lens-unit first lens L13 toward the first-lens-unit twelfth lens L12, as shown in FIG. 2. A focus position P on the intermediate image 30 where the off-axis light rays are brought into focus approaches the second-lens-unit first lens L13 with distance toward the off-axis side.

To change the size of an image projected by the projection system 3A on the screen S, the first lens group LG1, the first-lens-unit fourth lens L4, which is provided in the first lens group LG1 and closest to the second lens group LG2, and the second lens group LG2 are moved along the optical axis L with the first-lens-unit first lens L1 fixed to perform focusing.

The projection system 3A of Example 1 has the following data on the focal length $|f|$, the maximum angle of view (half angle of view) $\omega$, the F-number FNo, and the effective image circle diameter $\phi$.

$|f| = 7.5$ mm $\omega = 68°$ $FNo = 1.95$ $\phi = 37$ mm

The projection system 3A has the following lens data. The column labeled with "Lens" represents reference characters assigned to the lenses in FIG. 2. A surface having a surface number to which * is attached is an aspheric surface. Reference character R denotes the radius of curvature. Reference character d denotes the on-axis inter-surface distance (mm) (lens thickness or inter-lens distance). Reference character nd denotes the refractive index. Reference character vd denotes the Abbe number. The on-axis inter-surface distance A is the distance between the screen S and the first-lens-unit first lens L1. The on-axis inter-surface distance B is the distance between the first-lens-unit first lens L1 and the first lens group LG1 (between first-lens-unit first lens L1 and first-lens-unit second lens L2). The on-axis inter-surface distance C is the distance between the first-lens-unit third lens L3 and the first-lens-unit fourth lens L4. The on-axis inter-surface distance D is the distance between the first lens group LG1 and the second lens group LG2. The on-axis inter-surface distance E is the distance between the second lens group LG2 and the first-lens-unit seventh lens L7. The on-axis inter-surface distance A changes when the projection size is changed, and the on-axis inter-surface distances B, C, D, and E change when the focusing is performed in the case where the projection size is changed.

| Lens | Surface number | R | d | nd | vd |
|---|---|---|---|---|---|
| S |   | INFINITY | A |   |   |
| L1 | *1 | −75.989 | 5.5 | 1.5094 | 56.6 |
|   | *2 | 112.662 | B |   |   |
| L2 | 3 | 60.275 | 3.8 | 1.83481 | 42.73 |
|   | 4 | 33.168 | 14.278 |   |   |
| L3 | 5 | 68.899 | 3.2 | 1.804 | 46.58 |
|   | 6 | 23.577 | C |   |   |
| L4 | 7 | −27.497 | 3.2 | 1.83481 | 42.73 |
|   | 8 | −148.796 | D |   |   |
| L5 | 9 | −86.903 | 14.15 | 1.8061 | 33.27 |
|   | 10 | −40.744 | 0.2 |   |   |
| L6 | 11 | 118.453 | 9.39 | 1.804 | 46.58 |
|   | 12 | −187.435 | E |   |   |
| L7 | 13 | 30.36 | 10.02 | 1.497 | 81.54 |
|   | 14 | −126.045 | 0.509 |   |   |

-continued

| Lens | Surface number | R | d | nd | vd |
|---|---|---|---|---|---|
| L8 | *15 | 116.851 | 2.5 | 1.8061 | 40.73 |
|  | *16 | 26.764 | 3.065 |  |  |
| L9 | 17 | 40.741 | 21.83 | 1.437 | 95.1 |
|  | 18 | −26.136 | 0.528 |  |  |
| L10 | 19 | −29.159 | 2.87 | 1.90366 | 31.32 |
|  | 20 | 93.799 | 1.385 |  |  |
| L11 | 21 | 70.804 | 12.93 | 1.437 | 95.1 |
|  | 22 | −47.24 | 45 |  |  |
| L12 | *23 | 309.297 | 10.96 | 1.51633 | 64.06 |
|  | *24 | −58.426 | 84.359 |  |  |
| L13 | 25 | 187.026 | 12.03 | 1.92286 | 20.88 |
|  | 26 | −325.921 | 77.653 |  |  |
| L14 | *27 | 135.895 | 3.8 | 1.51633 | 64.06 |
|  | *28 | 61.542 | 35.945 |  |  |
| L15 | 29 | −566.992 | 5.79 | 1.84666 | 23.78 |
|  | 30 | −108.611 | 50.159 |  |  |
| L16 | 31 | 48.2376 | 8.76 | 1.43875 | 94.93 |
|  | 32 | −94.92 | 0.786 |  |  |
| L17 | 33 | 82.104 | 4.24 | 1.497 | 81.54 |
|  | 34 | −1661.363 | 2.376 |  |  |
| L18 | 35 | −108.16 | 1.7 | 1.80518 | 25.42 |
|  | 36 | 41.885 | 2.829 |  |  |
| L19 | 37 | 279.108 | 3.65 | 1.497 | 81.54 |
|  | 38 | −90.589 | 52.555 |  |  |
| L20 | 39 | −188.487 | 5.77 | 1.92286 | 20.82 |
|  | 40 | −60.096 | 0.2 |  |  |
| L21 | 41 | 47.639 | 4.67 | 1.62299 | 58.16 |
|  | 42 | 69.997 | 10 |  |  |
| 19 | 43 | INFINITY | 45 |  |  |
|  |  | INFINITY | 13.312 |  |  |

When focusing is performed with the projection size changed, the on-axis inter-surface distances A, B, C, D, and E, the focal length |f|, and the half angle of view ω change as shown in the following list. In the list, Position 1 collectively refers to the positions of the lenses after the focusing in a case where the on-axis inter-surface distance A, which is the distance between the first-lens-unit first lens and the screen S, is set at 900 mm. Similarly, Position 2 collectively refers to the positions of the lenses in a case where the on-axis inter-surface distance A is set at 600 mm, and Position 3 collectively refers to the positions of the lenses in a case where the on-axis inter-surface distance A is set at 6000 mm.

|  | Position 1 | Position 2 | Position 3 |
|---|---|---|---|
| A | 900 | 600 | 3000 |
| B | 10.131 | 10.502 | 9.612 |
| C | 30.753 | 30.906 | 30.521 |
| D | 6.799 | 6.792 | 6.81 |
| E | 46.498 | 45.981 | 47.238 |
| Focal length |f| | 8.05 | 8.01 | 8.1 |
| Maximum angle of view ω | 68.6° | 68.46° | 68.9° |

Aspheric surface data on each of the aspheric surfaces are next shown in the following Tables 1 and 2. Table 1 shows coefficients of an aspheric surface equation for specifying the shapes of the aspheric surfaces labeled with the surface numbers 1 and 2, each of which represents an aspheric surface. Table 2 shows coefficients of an even-numbered aspheric surface equation for specifying the shapes of the aspheric surfaces labeled with the surface numbers 15, 16, 23, 24, 27, and 28, each of which represents an aspheric surface.

TABLE 1

|  | 1 | 2 |
|---|---|---|
| Radius of Y curvature | −75.9890 | 112.6620 |
| Conic constant | −40.3041 | 3.4247 |
| Second aspheric surface coefficient | 1.20977E−03 | 3.64200E−03 |
| Third aspheric surface coefficient | 8.08099E−05 | 1.66092E−04 |
| Fourth aspheric surface coefficient | 1.81947E−06 | −1.87829E−07 |
| Fifth aspheric surface coefficient | −6.08259E−08 | −7.33706E−09 |
| Sixth aspheric surface coefficient | 3.77293E−10 | −5.82830E−11 |
| Seventh aspheric surface coefficient | 4.46022E−12 | −7.59351E−12 |
| Eighth aspheric surface coefficient | −2.31166E−14 | −1.48726E−13 |
| Ninth aspheric surface coefficient | −2.40212E−16 | −2.03262E−15 |
| Tenth aspheric surface coefficient | −1.00550E−18 | −1.78149E−17 |
| Eleventh aspheric surface coefficient | −5.42041E−21 | −1.44060E−20 |
| Twelfth aspheric surface coefficient | −4.47977E−23 | 5.19308E−21 |
| Thirteenth aspheric surface coefficient | 3.29487E−24 | 1.68675E−22 |
| Fourteenth aspheric surface coefficient | 6.50421E−26 | 3.45783E−24 |
| Fifteenth aspheric surface coefficient | −3.50534E−28 | 4.95220E−26 |
| Sixteenth aspheric surface coefficient | 1.02780E−30 | 6.63467E−28 |
| Seventeenth aspheric surface coefficient | −2.69961E−32 | 7.58685E−30 |
| Eighteenth aspheric surface coefficient | −2.74931E−34 | −1.85169E−32 |
| Nineteenth aspheric surface coefficient | −1.01711E−35 | −5.85377E−33 |
| Twentieth aspheric surface coefficient | 3.65811E−38 | −2.02698E−34 |

TABLE 2

|  | 15 | 16 | 23 | 24 | 27 | 28 |
|---|---|---|---|---|---|---|
| Radius of Y curvature | 116.8510 | 26.7640 | 309.2970 | −58.4260 | 135.8950 | 61.5420 |
| Conic constant (K) | 34.5621 | −0.0931 | −62.2625 | −3.4895 | −9.7144 | −0.0643 |
| Fourth coefficient (A) | −5.39280E−06 | 2.64522E−07 | 1.52405E−06 | 3.83114E−06 | 1.17568E−05 | 1.16727E−05 |
| Sixth coefficient (B) | −5.11825E−09 | 4.20931E−09 | −1.37179E−09 | −2.54199E−09 | −9.36248E−09 | −8.00838E−09 |
| Eighth coefficient (C) | −3.05157E−12 | 2.78103E−12 | −3.72776E−13 | 1.88975E−13 | 3.63538E−12 | 4.00574E−13 |
| Tenth coefficient (D) | −6.60415E−14 | −4.86850E−14 | 3.47591E−16 | 3.03512E−16 | −8.79099E−16 | 1.04775E−15 |

TABLE 2-continued

|  | 15 | 16 | 23 | 24 | 27 | 28 |
|---|---|---|---|---|---|---|
| Twelfth coefficient (E) | 2.41466E−17 | 3.16672E−17 | 1.65952E−19 | 7.37803E−21 | 2.17155E−19 | 8.91214E−21 |
| Fourteenth coefficient (F) | −1.87073E−31 | −1.86341E−31 | −3.12620E−23 | 5.47911E−23 | 0.00000E+00 | 0.00000E+00 |
| Sixteenth coefficient (G) | 1.31825E−21 | 4.60580E−21 | 0.00000E+00 | 0.00000E+00 | 0.00000E+00 | 0.00000E+00 |
| Eighteenth coefficient (H) | −5.23374E−24 | −2.32077E−23 | 0.00000E+00 | 0.00000E+00 | 0.00000E+00 | 0.00000E+00 |
| Twentieth coefficient (J) | 1.14118E−27 | 2.56724E−26 | 0.00000E+00 | 0.00000E+00 | 0.00000E+00 | 0.00000E+00 |

According to the projection system 3A of the present example, since the second-lens-unit first lens L13 is a positive lens, the intermediate image 30 is readily formed in a position shifted from the second-lens-unit first lens L13 toward the first lens unit LU1. Since the intermediate image 30 is formed by the positive lens, distortion produced by the first lens unit LU1 is readily corrected by the second lens unit LU2. Further, the chief ray of the off-axis light rays that travel between the first-lens-unit twelfth lens L12 and the second-lens-unit first lens L13, which are located on opposite sides of the intermediate image 30, approaches the optical axis L when the chief ray travels from the second-lens-unit first lens L13 toward the first-lens-unit twelfth lens L12, and the focus position P on the intermediate image 30 where the off-axis light rays are brought into focus approaches the second-lens-unit first lens L13 with distance toward the off-axis side. As a result, the distortion produced by the first lens unit LU1 is more readily corrected by the second lens unit LU2.

The projection system 3A satisfies the following conditional expression (1).

$$-0.3 \leq fU1/fU2 < 0 \quad (1)$$

where fU1 denotes the focal length of the first lens unit LU1, and fU2 denotes the focal length of the second lens unit LU2.

That is:

$$fU1=16.9462,$$

$$fU2=-248.79, \text{ and}$$

$$fU1/fU2=-0.068.$$

Since the projection system 3A satisfies the conditional expression (1), it is easy to increase the maximum angle of view to a value greater than or equal to 120° (increase the half angle of view ωto a value greater than or equal to 60°) without an increase in the number of lenses. Further, the lens diameter of the second lens unit LU2 can be reduced. That is, when the value of the conditional expression (1) exceeds the lower limit, the focal length of the first lens unit LU1 increases, so that it is not easy to increase the angle of view. Further, when the value of the conditional expression (1) exceeds the lower limit, the inclination of the light rays between the second lens unit LU2 and the intermediate image 30 with respect to the optical axis L increases, resulting in degradation in field curvature and an increase in the diameter of the lens that is provided in the second lens unit LU2 and closest to the intermediate image 30 (second-lens-unit first lens L13). On the other hand, when the value of the conditional expression (1) exceeds the upper limit, the second lens unit LU2 has positive power, so that the light rays incident from the side facing the intermediate image 30 on the first lens unit LU1 become roughly telecentric light rays or light rays the overall diameter of which increases. As a result, since the burden on the first lens unit LU1 increases, it is necessary to increase the number of lenses of the first lens unit LU1 for aberration correction. Further, since the projection system 3A of the present example satisfies the conditional expression (1), an increase in the size of the first-lens-unit first lens L1 can be suppressed.

In the projection system 3A, the second-lens-unit first lens L13 has a refractive index nd13 and an Abbe number vd13 as follows:

$$nd13=1.92286; \text{ and}$$

$$vd13=20.88,$$

and the following conditional expressions (2) and (3) are satisfied.

$$nd1>1.7 \quad (2)$$

$$vd1<35 \quad (3)$$

In the projection system 3A of the present example, since the refractive index of the second-lens-unit first lens L13, which has positive power, satisfies the conditional expression (2) (refractive index is greater than 1.7), the intermediate image 30 is readily formed in a position shifted from the second-lens-unit first lens L13 toward the first lens unit LU1. Further, since the Abbe number of the second-lens-unit first lens L13 satisfies the conditional expression (3) (Abbe number is smaller than 35), chromatic aberrations can be satisfactorily corrected.

Further, in the projection system 3A, the second-lens-unit eighth lens L20 (second-lens-unit reduction-side second lens) has a refractive index nd20 and an Abbe number vd20 as follows:

$$nd20=1.92286; \text{ and}$$

$$vd20=20.82,$$

and the refractive index nd20 and the Abbe number vd20 satisfy the following conditional expressions (4) and (5).

$$1.75<nd20<2.00 \quad (4)$$

$$20<vd20<45 \quad (5)$$

That is, in the projection system 3A, the two lenses that are provided in the second lens unit LU2 and close to the liquid crystal panels (second-lens-unit eighth lens L20 and second-lens-unit ninth lens L21) each have positive power, and the refractive index of at least one of the two lenses (second-lens-unit eighth lens L20) is greater than 1.75 but smaller than 2.00. Further, the Abbe number of the second-lens-unit eighth lens L20, which satisfies the conditional expression (4), is greater than 20 but smaller than 45. Field curvature and chromatic aberrations can therefore be satisfactorily corrected.

Further, in the projection system 3A, each of the first-lens-unit twelfth lens L12 and the second-lens-unit second lens L14 is an aspheric lens. Since each of these lenses is an aspheric lens, field curvature can be corrected in a high image height position. Field curvature can therefore be satisfactorily corrected.

The first-lens-unit twelfth lens L12 has a refractive index nd12 and an Abbe number vd12 as follows:

$nd12=1.51633$; and $vd12=64.06$, and the refractive index nd12 and the Abbe number vd12 satisfy the following conditional expressions (6) and (7).

$$1.5<nd12<1.8 \quad (6)$$

$$35<vd12<85 \quad (7)$$

Further, the second-lens-unit second lens L14 has a refractive index nd14 and an Abbe number vd14 as follows:

$nd14=1.51633$; and $vd14=64.06$, and the refractive index nd14 and the Abbe number vd14 satisfy the following conditional expressions (6') and (7').

$$1.5<nd14<1.8 \quad (6')$$

$$35<vd14<85 \quad (7')$$

In the projection system 3A, since the first-lens-unit twelfth lens L12 and the second-lens-unit second lens L14, which are located on opposite sides of the second-lens-unit first lens L13, which forms the intermediate image 30, satisfy the conditional expressions (6) and (6'), field curvature can be satisfactorily corrected. Further, since the first-lens-unit twelfth lens L12 and the second-lens-unit second lens L14, which are located on opposite sides of the second-lens-unit first lens L13, which forms the intermediate image 30, satisfy the conditional expressions (7) and (7'), chromatic aberrations can be satisfactorily corrected.

Figure 3:
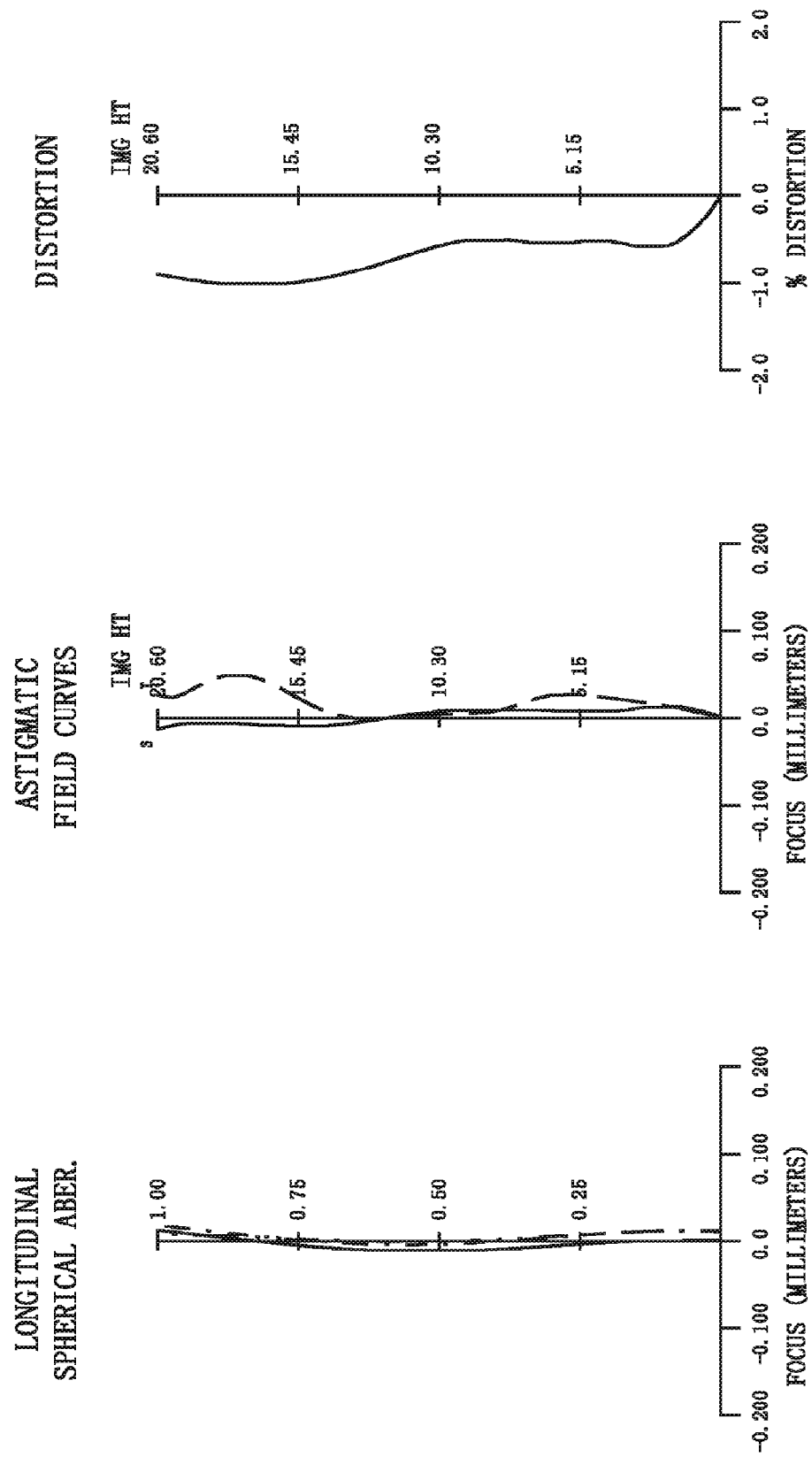
FIG. 3 is an aberration diagram of the projection system in a case where the lenses thereof are located in Position 1.
Figure 4:
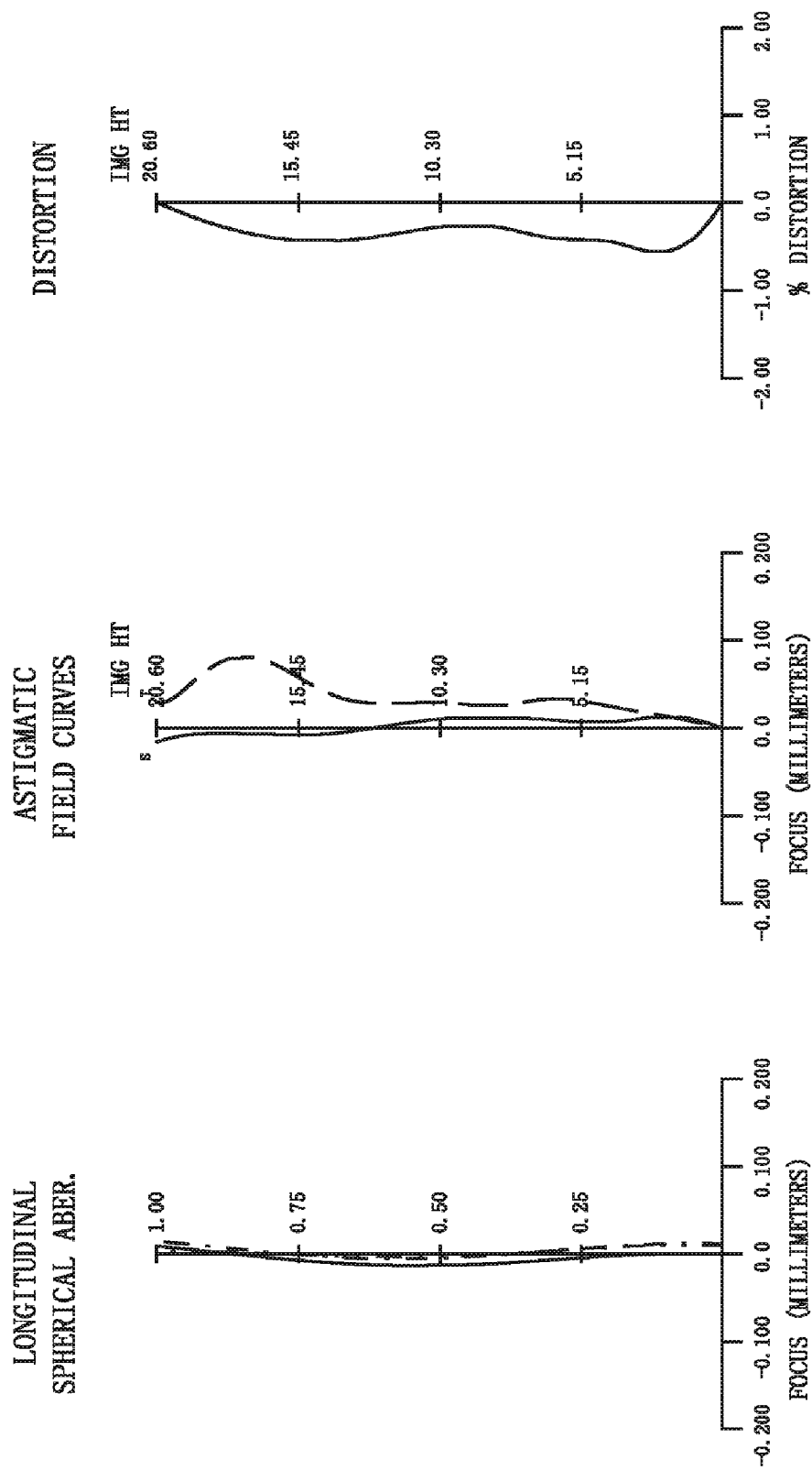
FIG. 4 is an aberration diagram of the projection system in a case where the lenses thereof are located in Position 2.
Figure 5:
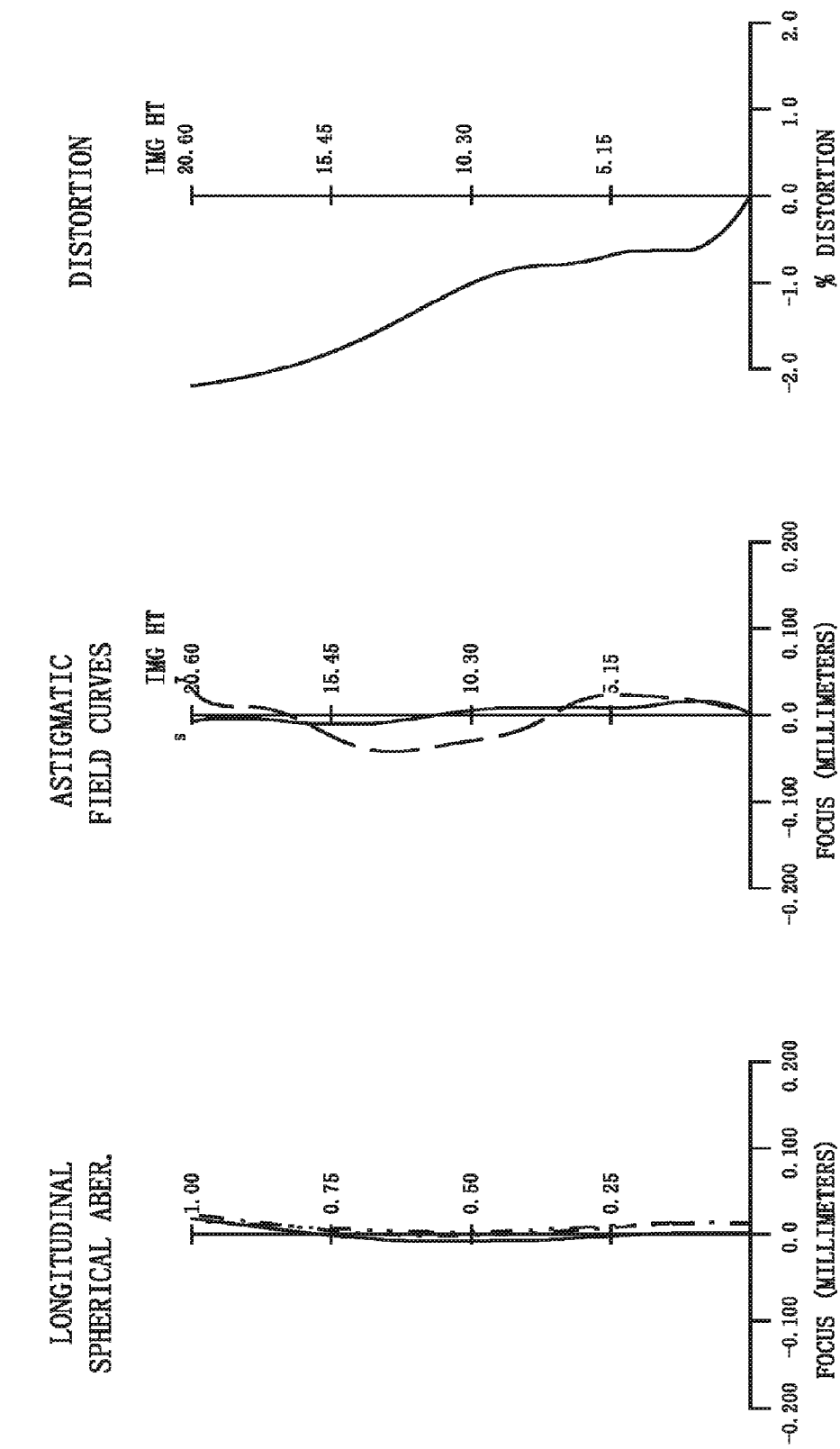
FIG. 5 is an aberration diagram of the projection system in a case where the lenses thereof are located in Position 3.

FIG. 3 is an aberration diagram (spherical aberration, astigmatism, and distortion) in the case where the lenses of the projection system 3A are located in Position 1. FIG. 4 is an aberration diagram (spherical aberration, astigmatism, and distortion) in the case where the lenses of the projection system 3A are located in Position 2. FIG. 5 is an aberration diagram (spherical aberration, astigmatism, and distortion) in the case where the lenses of the projection system 3A are located in Position 3. In the projection system 3A, the spherical aberration, astigmatism, and distortion are satisfactorily corrected, as shown in FIGS. 3 to 5.

Further, in the projection system 3A, the first-lens-unit first lens L1 is made of a resin and is therefore readily processed. The manufacturing cost of the projection system 3A can therefore be suppressed. The manufacturing cost of the projector 1 can be suppressed accordingly. Further, since the first-lens-unit first lens L1 is an aspheric lens, the diameter thereof can be readily reduced.

Figure 6:
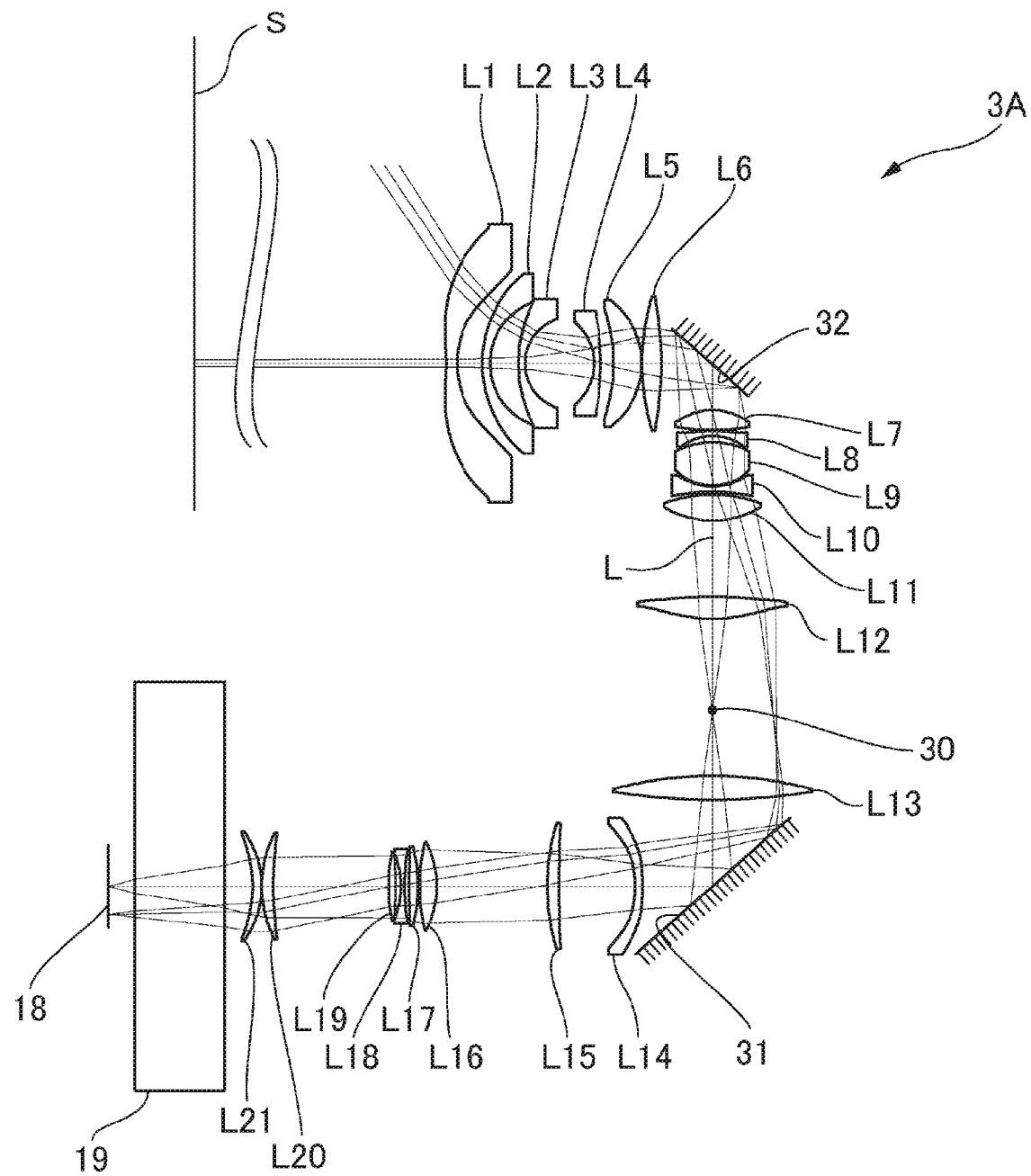
FIG. 6 is a configuration diagram in a case where the optical path of the projection system of Example 1 is deflected.

To incorporate the projection system 3A into the projector 1, a first mirror 31 is disposed between the second-lens-unit first lens L13 and the second-lens-unit second lens L14 to deflect the optical path (optical axis L) therebetween, as shown in FIG. 6. Further, a second mirror 32 is disposed between the first-lens-unit sixth lens L6 and the first-lens-unit seventh lens L7 to deflect the optical path (optical axis L) therebetween.

Since the arrangement of the first mirror 31 and the second mirror 32 in the projection system 3A allows the optical axis L to be oriented in a desired direction, the projection system 3A is readily incorporated into the projector 1. Further, since the on-axis inter-surface distance between the second-lens-unit first lens L13 and the second-lens-unit second lens L14 and the on-axis inter-surface distance between the first-lens-unit sixth lens L6 and the first-lens-unit seventh lens L7 have large values, the mirrors are readily disposed between these lenses. Moreover, the arrangement of the first mirror 31 between the second-lens-unit first lens L13 and the second-lens-unit second lens L14 allows the intermediate image 30 to be formed in a position relatively remote from the first mirror 31. As a result, in a case where scratches, dust, and other defects are present on the surface of the first mirror 31, a situation in which these undesirable objects are displayed on the screen S (enlargement-side image formation plane) can be avoided.

Example 2

Figure 7:
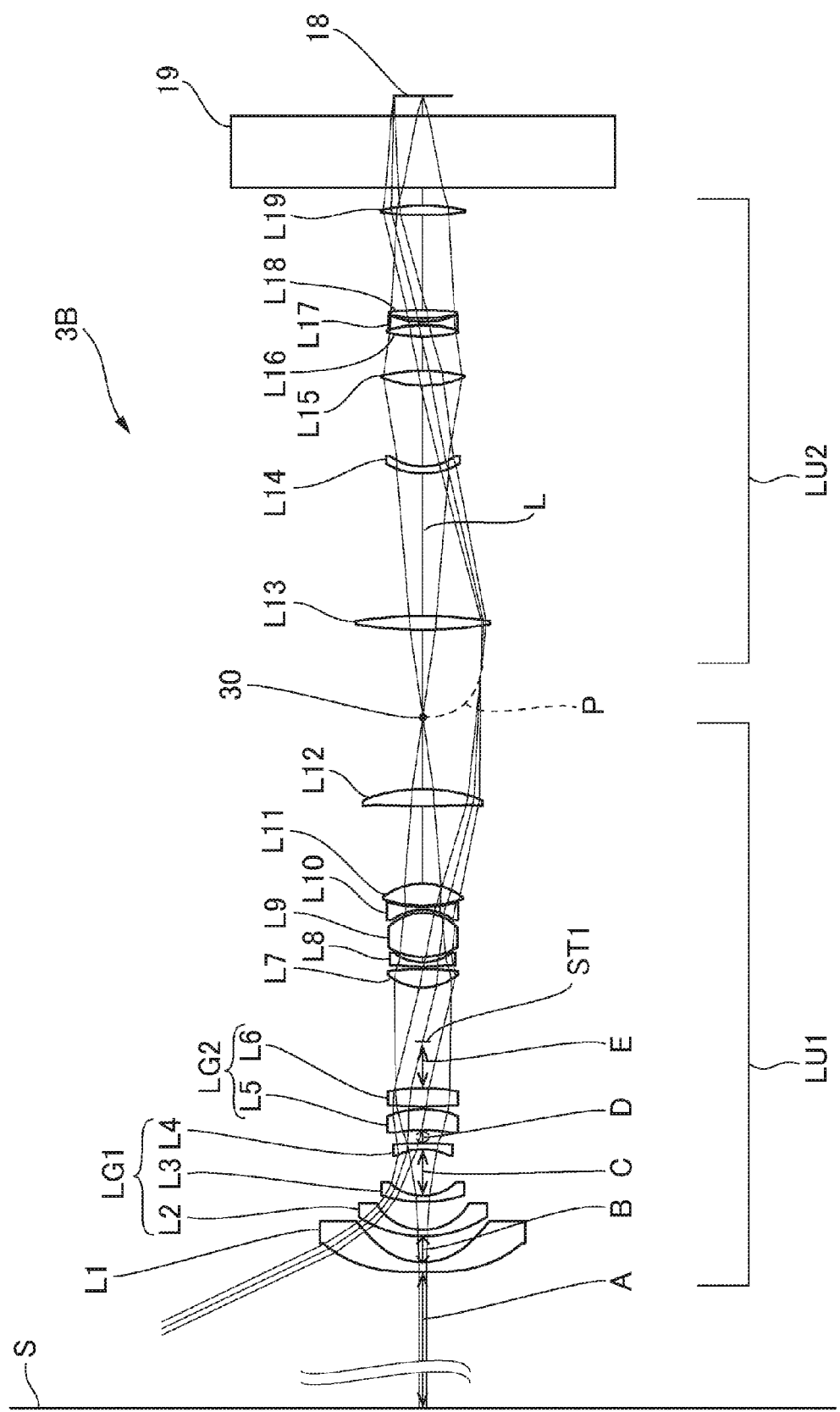
FIG. 7 is a configuration diagram of a projection system of Example 2.

FIG. 7 is a configuration diagram (light ray diagram) of a projection system of Example 2. A projection system 3B of the present example is formed of a first lens unit LU1, which makes the screen S, which is an enlargement-side image formation plane, conjugate with an intermediate image 30, and a second lens unit LU2, which makes the intermediate image 30 conjugate with the liquid crystal panels 18 (18R, 18G, and 18B), each of which is a reduction-side image formation plane, as shown in FIG. 7. The first lens unit LU1 has positive power. The second lens unit LU2 has negative power.

The first lens unit LU1 includes a first-lens-unit first lens L1 (first-lens-unit enlargement-side lens), which has negative power, a first lens group LG1, which has negative power, and a second lens group LG2, which has positive power, arranged from the side facing the screen S toward the intermediate image 30. The first-lens-unit first lens L1 is made of a resin. The first-lens-unit first lens L1 is an aspheric lens having aspheric shapes on both sides. In the present example, the first-lens-unit first lens L1 has a meniscus shape that is convex toward the screen S.

The first lens group LG1 is formed of at least two lenses. In the present example, the first lens group LG1 is formed of three lenses, a first-lens-unit second lens L2, a first-lens-unit third lens L3, and a first-lens-unit fourth lens L4, arranged from the side facing the screen S toward the intermediate image 30. Each of the first-lens-unit second lens L2, the first-lens-unit third lens L3, and the first-lens-unit fourth lens L4 has negative power. The second lens group LG2 is formed of at least two lenses each having positive power. In the present example, the second lens group LG2 is formed of a first-lens-unit fifth lens L5, which has positive power, and a first-lens-unit sixth lens L6, which has positive power.

The first lens unit LU1 further includes a first-lens-unit seventh lens L7, a first-lens-unit eighth lens L8, a first-lens-unit ninth lens L9, a first-lens-unit tenth lens L10, a first-lens-unit eleventh lens L11, and a first-lens-unit twelfth lens L12 arranged from the side facing the second lens group LG2 toward the intermediate image 30. The first lens unit LU1 is therefore formed of 12 lenses. In the present example, a stop ST1 is disposed between the second lens group LG2 and the first-lens-unit seventh lens L7. The first-lens-unit eighth lens L8 is an aspheric lens having aspheric shapes on both sides. The first-lens-unit twelfth lens L12 (first-lens-unit intermediate-image-side lens) is an aspheric lens having aspheric shapes on both sides.

The second lens unit LU2 includes a second-lens-unit first lens L13, a second-lens-unit second lens L14, a second-lens-unit third lens L15, a second-lens-unit fourth lens L16, a second-lens-unit fifth lens L17, a second-lens-unit sixth lens L18, and a second-lens-unit seventh lens L19 arranged from the side facing the intermediate image 30 toward the liquid crystal panels. That is, the second lens unit LU2 is formed of 7 lenses. The cross dichroic prism 19 is disposed between the second-lens-unit seventh lens L19 and the liquid crystal panels 18.

The second-lens-unit first lens L13 (second-lens-unit intermediate-image-side first lens) has positive power. In the present example, the second-lens-unit first lens L13 is a convex lens having convex shapes on both sides. The second-lens-unit second lens L14 is an aspheric lens having aspheric shapes on both sides. The second-lens-unit seventh lens L19 (second-lens-unit reduction-side first lens), which is the lens closest to the liquid crystal panels 18, and the second-lens-unit sixth lens L18 (second-lens-unit reduction-side second lens), which is located in the position adjacent to the second-lens-unit seventh lens L19, each have positive power.

In the projection system 3B, the chief ray of off-axis light rays that travel between the first-lens-unit twelfth lens L12 and the second-lens-unit first lens L13, which are located on opposite sides of the intermediate image 30, approaches an optical axis L when the chief ray travels from the second-lens-unit first lens L13 toward the first-lens-unit twelfth lens L12, as shown in FIG. 7. A focus position P on the intermediate image 30 where the off-axis light rays are brought into focus approaches the second-lens-unit first lens L13 with distance toward the off-axis side.

To change the size of an image projected by the projection system 3B on the screen S, the first lens group LG1, the first-lens-unit fourth lens L4, which is provided in the first lens group LG1 and closest to the second lens group LG2, and the second lens group LG2 are moved along the optical axis L with the first-lens-unit first lens L1 fixed to perform focusing.

The projection system 3B of Example 2 has the following data on the focal length |f|, the maximum angle of view (half angle of view) ω, the F-number FNo, and the effective image circle diameter φ.

|f|=7.73 mm

ω=63.59°

FNo=1.85

φ=31 mm

The projection system 3B has the following lens data. The column labeled with "Lens" represents reference characters assigned to the lenses in FIG. 7. A surface having a surface number to which * is attached is an aspheric surface. Reference character R denotes the radius of curvature. Reference character d denotes the on-axis inter-surface distance (mm) (lens thickness or inter-lens distance). Reference character nd denotes the refractive index. Reference character vd denotes the Abbe number. The on-axis inter-surface distance A is the distance between the screen S and the first-lens-unit first lens L1. The on-axis inter-surface distance B is the distance between the first-lens-unit first lens L1 and the first lens group LG1 (first-lens-unit first lens L1 and first-lens-unit second lens L2). The on-axis inter-surface distance C is the distance between the first-lens-unit third lens L3 and the first-lens-unit fourth lens L4 in the first lens group LG1. The on-axis inter-surface distance D is the distance between the first lens group LG1 and the second lens group LG2. The on-axis inter-surface distance E is the distance between the second lens group LG2 and the stop ST1. The on-axis inter-surface distance A changes when the projection size is changed, and the on-axis inter-surface distances B, C, D, and E change when the focusing is performed in the case where the projection size is changed.

| Lens | Surface number | R | d | nd | vd |
|---|---|---|---|---|---|
| S | | INFINITY | A | | |
| L1 | *1 | −87.355 | 5.486 | 1.5094 | 56.6 |
| | *2 | 104.27 | B | | |
| L2 | 3 | 59.74 | 3.5 | 1.83481 | 42.73 |
| | 4 | 28.143 | 15.617 | | |
| L3 | 5 | 68.243 | 3.37 | 1.83481 | 42.73 |
| | 6 | 25.161 | C | | |
| L4 | 7 | −29.135 | 3.2 | 1.83481 | 42.73 |
| | 8 | −233.337 | D | | |
| L5 | 9 | −102.244 | 11.88 | 1.85478 | 24.8 |
| | 10 | −46.086 | 1.424 | | |
| L6 | 11 | 236.848 | 10.29 | 1.7725 | 49.6 |
| | 12 | −92.54 | E | | |
| ST1 | 13 | INFINITY | 30 | | |
| L7 | 14 | 28.521 | 10.24 | 1.497 | 81.54 |
| | 15 | −140.597 | 1.263 | | |
| L8 | *16 | 115.593 | 2.5 | 1.8061 | 40.73 |
| | *17 | 25.36 | 2.914 | | |
| L9 | 18 | 34.448 | 24.52 | 1.437 | 95.1 |
| | 19 | −25.276 | 1.733 | | |
| L10 | 20 | −26.887 | 1.7 | 1.90366 | 31.32 |
| | 21 | 75.059 | 0.692 | | |
| L11 | 22 | 66.477 | 12.18 | 1.437 | 95.1 |
| | 23 | −34.266 | 43.047 | | |
| L12 | *24 | 241.546 | 9.66 | 1.58573 | 59.7 |
| | *25 | −75.08 | 88.696 | | |
| L13 | 26 | 223.305 | 7.64 | 1.92286 | 20.88 |
| | 27 | −233.194 | 79.495 | | |
| L14 | *28 | 48.85 | 3.8 | 1.51633 | 64.06 |
| | *29 | 33.713 | 44.916 | | |
| L15 | 30 | 54.381 | 8.33 | 1.43875 | 94.93 |
| | 31 | −90.118 | 19.104 | | |
| L16 | 32 | 90.4 | 6 | 1.43875 | 94.93 |
| | 33 | −70.269 | 0.542 | | |
| L17 | 34 | −61.383 | 1.7 | 1.72825 | 28.46 |
| | 35 | 46.915 | 2.06 | | |
| L18 | 36 | 97.503 | 4.32 | 1.8061 | 40.73 |
| | 37 | −166.039 | 52.767 | | |
| L19 | 38 | 138.202 | 5.44 | 1.92286 | 20.88 |
| | 39 | −107.524 | 10 | | |
| 19 | 40 | INFINITY | 40 | 1.51633 | 64.14 |
| | 41 | INFINITY | 11.276 | | |

When focusing is performed with the projection size changed, the on-axis inter-surface distances A, B, C, D, and E, the focal length |f|, and the half angle of view ω change as shown in the following list. In the list, Position 1 collectively refers to the positions of the lenses after the focusing in the case where the on-axis inter-surface distance A, which is the distance between the first-lens-unit first lens and the screen S, is set at 900 mm. Similarly, Position 2 collectively refers to the positions of the lenses in the case where the on-axis inter-surface distance A is set at 600 mm, and Position 3 collectively refers to the positions of the lenses in the case where the on-axis inter-surface distance A is set at 6000 mm.

| | Position 1 | Position 2 | Position 3 |
|---|---|---|---|
| A | 900 | 600 | 3000 |
| B | 14.406 | 14.911 | 13.727 |

-continued

|   | Position 1 | Position 2 | Position 3 |
|---|---|---|---|
| C | 26.025 | 26.181 | 25.791 |
| D | 7.185 | 7.17 | 7.206 |
| E | 26.06 | 25.414 | 26.952 |
| Focal length $|f|$ | 7.73 | 7.69 | 7.79 |
| Maximum angle of view $\omega$ | 63.59° | 63.43° | 63.79° |

Aspheric surface data on each of the aspheric surfaces are next shown in the following Tables 3 and 4. Table 3 shows coefficients of an aspheric surface equation for specifying the shapes of the aspheric surfaces labeled with the surface numbers 1 and 2, each of which represents an aspheric surface. Table 4 shows coefficients of an even-numbered aspheric surface equation for specifying the shapes of the aspheric surfaces labeled with the surface numbers 16, 17, 24, 25, 28, and 29, each of which represents an aspheric surface.

TABLE 3

|   | 1 | 2 |
|---|---|---|
| Radius of Y curvature | −87.355 | 104.27 |
| Conic constant | −77.405 | 2.483 |
| Second aspheric surface coefficient | 4.19385E−03 | 7.50394E−03 |
| Third aspheric surface coefficient | 5.22321E−05 | 1.95260E−04 |
| Fourth aspheric surface coefficient | 1.45076E−06 | 1.09379E−07 |
| Fifth aspheric surface coefficient | −5.43576E−08 | −1.57442E−08 |
| Sixth aspheric surface coefficient | 4.30781E−10 | −2.47333E−10 |
| Seventh aspheric surface coefficient | 4.66814E−12 | −1.07173E−11 |
| Eighth aspheric surface coefficient | −2.49723E−14 | −1.87615E−13 |
| Ninth aspheric surface coefficient | −2.75641E−16 | −2.07013E−15 |
| Tenth aspheric surface coefficient | −1.29778E−18 | −6.93276E−18 |
| Eleventh aspheric surface coefficient | −6.71539E−21 | 4.32030E−19 |
| Twelfth aspheric surface coefficient | 1.66091E−23 | 1.79224E−20 |
| Thirteenth aspheric surface coefficient | 4.29748E−24 | 4.63223E−22 |
| Fourteenth aspheric surface coefficient | 9.03939E−26 | 9.03874E−24 |
| Fifteenth aspheric surface coefficient | −9.43222E−29 | 1.34181E−25 |

TABLE 3-continued

|   | 1 | 2 |
|---|---|---|
| Sixteenth aspheric surface coefficient | 1.05074E−29 | 7.81710E−28 |
| Seventeenth aspheric surface coefficient | 3.09732E−32 | −5.05347E−29 |
| Eighteenth aspheric surface coefficient | 6.19218E−34 | −3.27901E−30 |
| Nineteenth aspheric surface coefficient | 9.50067E−36 | 0.00000E+00 |
| Twentieth aspheric surface coefficient | 7.54473E−38 | 0.00000E+00 |

TABLE 4

|   | 16 | 17 | 24 | 25 | 28 | 29 |
|---|---|---|---|---|---|---|
| Radius of Y curvature | 115.5930 | 25.3600 | 241.5460 | −75.0800 | 48.8500 | 33.7130 |
| Conic constant (K) | 33.4215 | −0.0433 | 4.8438 | −2.5574 | −2.1420 | −0.1580 |
| Fourth coefficient (A) | −5.49797E−06 | 9.05772E−07 | 1.50837E−07 | 2.75070E−06 | 1.30789E−05 | 1.17925E−05 |
| Sixth coefficient (B) | −7.56152E−09 | 3.67947E−09 | −2.01031E−09 | −3.22244E−09 | −7.22757E−09 | −5.66759E−09 |
| Eighth coefficient (C) | −9.56258E−12 | −1.57208E−11 | −4.17220E−13 | 1.56878E−13 | 5.28697E−12 | 3.67992E−12 |
| Tenth coefficient (D) | −2.69353E−14 | 5.66349E−14 | 2.54886E−16 | 2.92808E−16 | −1.73181E−15 | −8.40820E−16 |
| Twelfth coefficient (E) | 2.41468E−17 | 3.16674E−17 | 9.43242E−20 | −5.51063E−21 | 4.81888E−20 | 3.66834E−19 |
| Fourteenth coefficient (F) | 1.06880E−25 | 1.06880E−25 | −7.35113E−23 | −7.14436E−23 | 2.11369E−22 | 1.31287E−21 |
| Sixteenth coefficient (G) | 5.37538E−22 | 3.50779E−21 | 6.93034E−26 | 0.00000E+00 | −1.85194E−24 | 2.10745E−24 |
| Eighteenth coefficient (H) | −5.43826E−24 | −2.78766E−23 | −7.48293E−29 | 0.00000E+00 | −1.44804E−27 | −2.38035E−26 |
| Twentieth coefficient (J) | 5.14632E−27 | 4.19364E−26 | 0.00000E+00 | 0.00000E+00 | 0.00000E+00 | 0.00000E+00 |

According to the projection system 3B of the present example, since the second-lens-unit first lens L13 is a positive lens, the intermediate image 30 is readily formed in a position shifted from the second-lens-unit first lens L13 toward the first lens unit LU1. Since the intermediate image 30 is formed by the positive lens, distortion produced by the first lens unit LU1 is readily corrected by the second lens unit LU2. Further, the chief ray of the off-axis light rays that travel between the first-lens-unit twelfth lens L12 and the second-lens-unit first lens L13, which are located on opposite sides of the intermediate image 30, approaches the optical axis L when the chief ray travels from the second-lens-unit first lens L13 toward the first-lens-unit twelfth lens L12, and the focus position P on the intermediate image 30 where the off-axis light rays are brought into focus approaches the second-lens-unit first lens L13 with distance toward the off-axis side. As a result, the distortion produced by the first lens unit LU1 is more readily corrected by the second lens unit LU2.

The projection system 3B satisfies the following conditional expression (1):

$$-0.3 \leq fU1/fU2 < 0 \tag{1}$$

where fU1 denotes the focal length of the first lens unit LU1, and fU2 denotes the focal length of the second lens unit LU2.

That is, $$fU1 = 15.066,$$

$$fU2 = -441.493, \text{ and}$$

$$fU1/fU2 = -0.034.$$

Since the projection system 3B satisfies the conditional expression (1), it is easy to increase the maximum angle of view to a value greater than or equal to 120° (increase the half angle of view ω to a value greater than or equal to 60°) without an increase in the number of lenses. Further, the lens diameter of the second lens unit LU2 can be reduced. That is, when the value of the conditional expression (1) exceeds the lower limit, the focal length of the first lens unit LU1 increases, so that it is not easy to increase the angle of view. Further, when the value of the conditional expression (1) exceeds the lower limit, the inclination of the light rays between the second lens unit LU2 and the intermediate image 30 with respect to the optical axis L increases, resulting in degradation in field curvature and an increase in the diameter of the lens that is provided in the second lens unit LU2 and closest to the intermediate image 30 (second-lens-unit first lens L13). On the other hand, when the value of the conditional expression (1) exceeds the upper limit, the second lens unit LU2 has positive power, so that the light rays incident from the side facing the intermediate image 30 on the first lens unit LU1 become roughly telecentric light rays or light rays the overall diameter of which increases. As a result, since the burden on the first lens unit LU1 increases, it is necessary to increase the number of lenses of the first lens unit LU1 for aberration correction. Further, since the projection system 3B of the present example satisfies the conditional expression (1), an increase in the size of the first-lens-unit first lens L1 can be suppressed.

In the projection system 3B, the second-lens-unit first lens L13 has a refractive index nd13 and an Abbe number vd13 as follows:

$$nd13=1.92286; \text{ and}$$

$$vd13=20.88,$$

and the following conditional expressions (2) and (3) are satisfied.

$$nd1>1.7 \quad (2)$$

$$vd1<35 \quad (3)$$

In the projection system 3B of the present example, since the refractive index of the second-lens-unit first lens L13, which has positive power, satisfies the conditional expression (2) (refractive index is greater than 1.7), the intermediate image 30 is readily formed in a position shifted from the second-lens-unit first lens L13 toward the first lens unit LU1. Further, since the Abbe number of the second-lens-unit first lens L13 satisfies the conditional expression (3) (Abbe number is smaller than 35), chromatic aberrations can be satisfactorily corrected.

Further, in the projection system 3B, the second-lens-unit sixth lens L18 (second-lens-unit reduction-side second lens) has a refractive index nd18 and an Abbe number vd18 as follows:

$$nd18=1.8061; \text{ and}$$

$$vd18=40.73,$$

and the refractive index nd18 and the Abbe number vd18 satisfy the following conditional expressions (4) and (5).

$$1.75<nd18<2.00 \quad (4)$$

$$20<vd18<45 \quad (5)$$

In the projection system 3B, the second-lens-unit seventh lens L19 (second-lens-unit reduction-side first lens) has a refractive index nd19 and an Abbe number vd19 as follows:

$$nd19=1.92286; \text{ and}$$

$$vd19=20.88,$$

and the refractive index nd19 and the Abbe number vd19 satisfy the following conditional expressions (4') and (5').

$$1.75<nd19<2.00 \quad (4')$$

$$20<v19<45 \quad (5')$$

That is, in the projection system 3B, the two lenses that are provided in the second lens unit LU2 and close to the liquid crystal panels (second-lens-unit sixth lens L18 and second-lens-unit seventh lens L19) each have positive power, and the refractive indices of the two lenses are greater than 1.75 but smaller than 2.00. Further, the Abbe numbers of the two lenses are greater than 20 but smaller than 45. Field curvature and chromatic aberrations can therefore be satisfactorily corrected.

Further, in the projection system 3B, each of the first-lens-unit twelfth lens L12 and the second-lens-unit second lens L14 is an aspheric lens. Since each of these lenses is an aspheric lens, field curvature can be corrected in a high image height position. Field curvature can therefore be satisfactorily corrected.

The first-lens-unit twelfth lens L12 has a refractive index nd12 and an Abbe number vd12 as follows:

$$nd12=1.58573; \text{ and}$$

$$vd12=59.7,$$

and the refractive index nd12 and the Abbe number vd12 satisfy the following conditional expressions (6) and (7):

$$1.5<nd12<1.8 \quad (6)$$

$$35<vd12<85 \quad (7)$$

Further, the second-lens-unit second lens L14 has a refractive index nd14 and an Abbe number vd14 as follows:

$$nd14=1.51633; \text{ and}$$

$$vd14=64.06,$$

and the refractive index nd14 and the Abbe number vd14 satisfy the following conditional expressions (6') and (7').

$$1.5<nd14<1.8 \quad (6')$$

$$35<vd14<85 \quad (7')$$

In the projection system 3B, since the first-lens-unit twelfth lens L12 and the second-lens-unit second lens L14, which are located on opposite sides of the second-lens-unit first lens L13, which forms the intermediate image 30, satisfy the conditional expressions (6) and (6'), field curvature can be satisfactorily corrected. Further, since the first-lens-unit twelfth lens L12 and the second-lens-unit second lens L14, which are located on opposite sides of the second-lens-unit first lens L13, which forms the intermediate image 30, satisfy the conditional expressions (7) and (7'), chromatic aberrations can be satisfactorily corrected.

Figure 8:
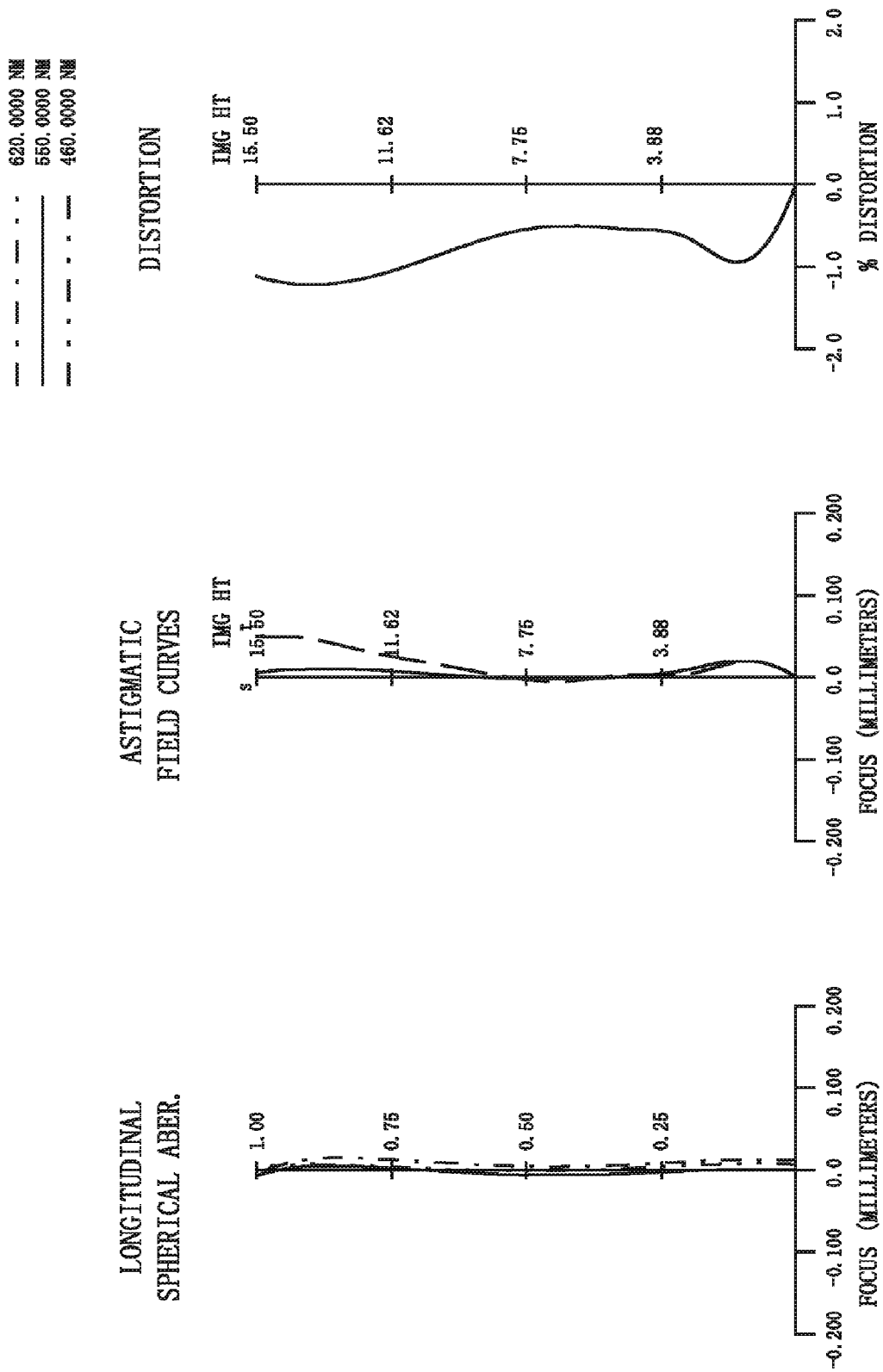
FIG. 8 is an aberration diagram of the projection system in a case where the lenses thereof are located in Position 1.
Figure 10:
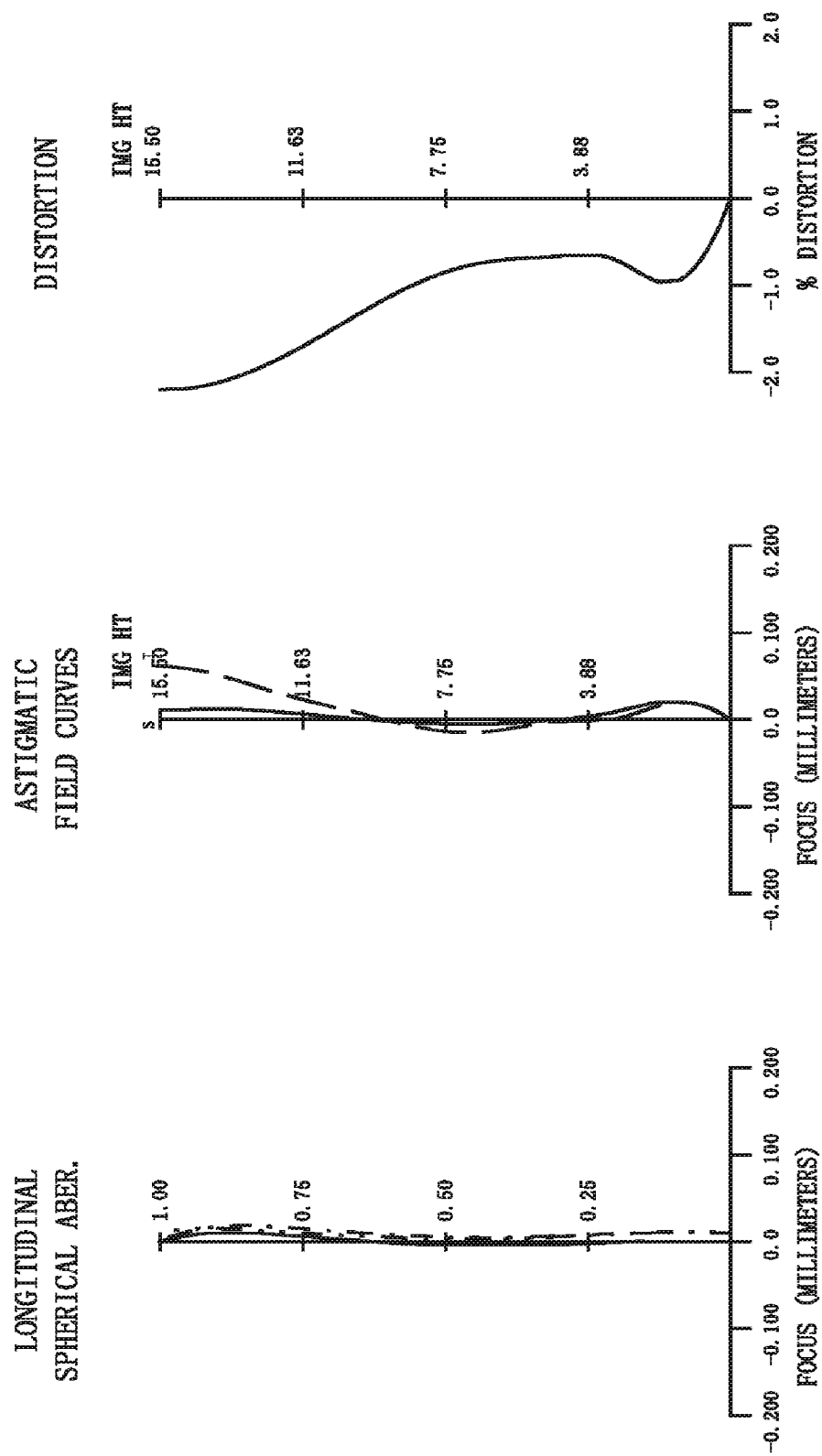
FIG. 10 is an aberration diagram of the projection system in a case where the lenses thereof are located in Position 3.

FIG. 8 is an aberration diagram (spherical aberration, astigmatism, and distortion) in the case where the lenses of the projection system 3B are located in Position 1. FIG. 9 is an aberration diagram (spherical aberration, astigmatism, and distortion) in the case where the lenses of the projection system 3B are located in Position 2. FIG. 10 is an aberration diagram (spherical aberration, astigmatism, and distortion) in the case where the lenses of the projection system 3B are located in Position 3. In the projection system 3B, the spherical aberration, astigmatism, and distortion are satisfactorily corrected, as shown in FIGS. 8 to 10.

Further, in the projection system 3B, the first-lens-unit first lens L1 is made of a resin and is therefore readily processed. The manufacturing cost of the projection system 3B can therefore be suppressed. The manufacturing cost of the projector 1 can be suppressed accordingly. Further, since the first-lens-unit first lens L1 is an aspheric lens, the diameter thereof can be readily reduced.

To incorporate the projection system 3B into the projector 1, the first mirror 31 is disposed between the second-lens-unit first lens L13 and the second-lens-unit second lens L14 to deflect the optical path (optical axis L) therebetween, as in the projection system 3A. Further, the second mirror 32 is disposed between the first-lens-unit sixth lens L6 and the first-lens-unit seventh lens L7 to deflect the optical path (optical axis L) therebetween (see FIG. 6).

Since the arrangement of the first mirror 31 and the second mirror 32 in the projection system 3B allows the optical axis L to be oriented in a desired direction, the projection system 3B is readily incorporated into the projector 1. Further, since the on-axis inter-surface distance between the second-lens-unit first lens L13 and the second-lens-unit second lens L14 and the on-axis inter-surface distance between the first-lens-unit sixth lens L6 and the first-lens-unit seventh lens L7 have large values, the mirrors are readily disposed between these lenses. Moreover, the arrangement of the first mirror 31 between the second-lens-unit first lens L13 and the second-lens-unit second lens L14 allows the intermediate image 30 to be formed in a position relatively remote from the first mirror 31. As a result, in a case where scratches, dust, and other defects are present on the surface of the first mirror 31, a situation in which these undesirable objects are displayed on the screen S (enlargement-side image formation plane) can be avoided.

Example 3

Figure 11:
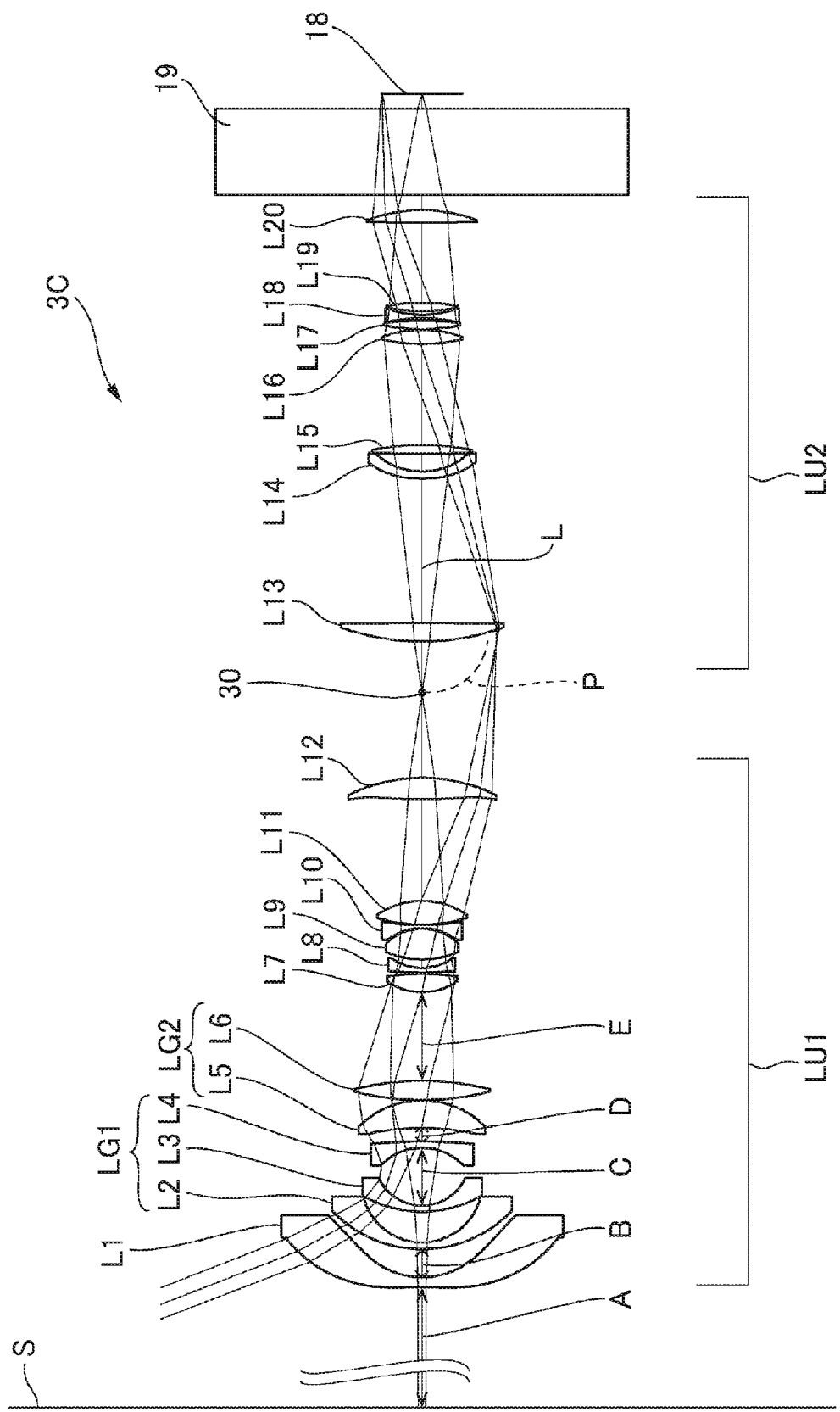
FIG. 11 is a configuration diagram of a projection system of Example 3.

FIG. 11 is a configuration diagram (light ray diagram) of a projection system of Example 3. A projection system 3C of the present example is formed of a first lens unit LU1, which makes the screen S, which is an enlargement-side image formation plane, conjugate with an intermediate image 30, and a second lens unit LU2, which makes the intermediate image 30 conjugate with the liquid crystal panels 18 (18R, 18G, and 18B), each of which is a reduction-side image formation plane, as shown in FIG. 11. The first lens unit LU1 has positive power. The second lens unit LU2 has negative power.

The first lens unit LU1 includes a first-lens-unit first lens L1 (first-lens-unit enlargement-side lens), which has negative power, a first lens group LG1, which has negative power, and a second lens group LG2, which has positive power, arranged from the side facing the screen S toward the intermediate image 30. The first-lens-unit first lens L1 is made of a resin. The first-lens-unit first lens L1 is an aspheric lens having aspheric shapes on both sides. In the present example, the first-lens-unit first lens L1 has a meniscus shape that is convex toward the screen S.

The first lens group LG1 is formed of at least two lenses. In the present example, the first lens group LG1 is formed of three lenses, a first-lens-unit second lens L2, a first-lens-unit third lens L3, and a first-lens-unit fourth lens L4, arranged from the side facing the screen S toward the intermediate image 30. Each of the first-lens-unit second lens L2, the first-lens-unit third lens L3, and the first-lens-unit fourth lens L4 has negative power. The second lens group LG2 is formed of at least two lenses each having positive power. In the present example, the second lens group LG2 is formed of a first-lens-unit fifth lens L5, which has positive power, and a first-lens-unit sixth lens L6, which has positive power.

The first lens unit LU1 further includes a first-lens-unit seventh lens L7, a first-lens-unit eighth lens L8, a first-lens-unit ninth lens L9, a first-lens-unit tenth lens L10, a first-lens-unit eleventh lens L11, and a first-lens-unit twelfth lens L12 arranged from the side facing the second lens group LG2 toward the intermediate image 30. The first lens unit LU1 is therefore formed of 12 lenses. In the present example, the first-lens-unit eighth lens L8 is an aspheric lens having aspheric shapes on both sides. The first-lens-unit twelfth lens L12 (first-lens-unit intermediate-image-side lens) is an aspheric lens having aspheric shapes on both sides.

The second lens unit LU2 includes a second-lens-unit first lens L13, a second-lens-unit second lens L14, a second-lens-unit third lens L15, a second-lens-unit fourth lens L16, a second-lens-unit fifth lens L17, a second-lens-unit sixth lens L18, a second-lens-unit seventh lens L19, and a second-lens-unit eighth lens L20 arranged from the side facing the intermediate image 30 toward the liquid crystal panels. That is, the second lens unit LU2 is formed of 8 lenses. The cross dichroic prism 19 is disposed between the second-lens-unit eighth lens L20 and the liquid crystal panels 18.

The second-lens-unit first lens L13 (second-lens-unit intermediate-image-side first lens) has positive power. In the present example, the second-lens-unit first lens L13 is a convex lens having convex shapes on both sides. The second-lens-unit second lens L14 is an aspheric lens having aspheric shapes on both sides. The second-lens-unit eighth lens L20 (second-lens-unit reduction-side first lens), which is closest to the liquid crystal panels 18, and the second-lens-unit seventh lens L19 (second-lens-unit reduction-side second lens), which is located in the position adjacent to the second-lens-unit eighth lens L20, each have positive power.

In the projection system 3C, the chief ray of off-axis light rays that travel between the first-lens-unit twelfth lens L12 and the second-lens-unit first lens L13, which are located on opposite sides of the intermediate image 30, approaches an optical axis L when the chief ray travels from the second-lens-unit first lens L13 toward the first-lens-unit twelfth lens L12, as shown in FIG. 11. A focus position P on the intermediate image 30 where the off-axis light rays are brought into focus approaches the second-lens-unit first lens L13 with distance toward the off-axis side.

To change the size of an image projected by the projection system 3C on the screen S, the first lens group LG1, the first-lens-unit fourth lens L4, which is provided in the first lens group LG1 and closest to the second lens group LG2, and the second lens group LG2 are moved along the optical axis L with the first-lens-unit first lens L1 fixed to perform focusing.

The projection system 3C of Example 3 has the following data on the focal length |f|, the maximum angle of view (half angle of view) ω, the F-number FNo, and the effective image circle diameter φ.

$|f|=8.05$ mm $\omega=68°$ $FNo=1.9$ $\phi=40$ mm

The projection system 3C has the following lens data. The column labeled with "Lens" represents reference characters assigned to the lenses in FIG. 11. A surface having a surface number to which * is attached is an aspheric surface. Reference character R denotes the radius of curvature. Reference character d denotes the on-axis inter-surface distance (mm) (lens thickness or inter-lens distance). Reference character nd denotes the refractive index. Reference character vd denotes the Abbe number. The on-axis inter-surface distance A is the distance between the screen S and the first-lens-unit first lens L1. The on-axis inter-surface distance B is the distance between the first-lens-unit first lens L1 and the first lens group LG1 (first-lens-unit first lens L1 and first-lens-unit second lens L2). The on-axis inter-surface distance C is the distance between the first-lens-unit third lens L3 and the first-lens-unit fourth lens L4 in the first lens group LG1. The on-axis inter-surface distance D is the distance between the first lens group LG1 and the second lens group LG2. The on-axis inter-surface distance E is the distance between the second lens group LG2 and the first-lens-unit seventh lens L7. The on-axis inter-surface distance A changes when the projection size is changed, and the on-axis inter-surface distances B, C, D, and E change when the focusing is performed in the case where the projection size is changed.

| Lens | Surface number | R | d | nd | vd |
|---|---|---|---|---|---|
| S |  | INFINITY | A |  |  |
| L1 | *1 | −75.2755 | 5.3 | 1.5094 | 56.6 |
|  | *2 | 116.611 | B |  |  |
| L2 | 3 | 60.308 | 3.5 | 1.83481 | 42.73 |
|  | 4 | 29.748 | 15.933 |  |  |
| L3 | 5 | 56.986 | 3.2 | 1.83481 | 42.73 |
|  | 6 | 23.377 | C |  |  |
| L4 | 7 | −28.023 | 3.2 | 1.83481 | 42.73 |
|  | 8 | −274.34 | D |  |  |
| L5 | 9 | −120.439 | 14.27 | 1.8061 | 33.27 |
|  | 10 | −43.472 | 0.2 |  |  |
| L6 | 11 | 133.02 | 10.02 | 1.804 | 46.58 |
|  | 12 | −132.613 | E |  |  |
| L7 | 13 | 30.098 | 9.37 | 1.497 | 81.54 |
|  | 14 | −133.237 | 0.757 |  |  |
| L8 | *15 | 113.136 | 2.47 | 1.8061 | 40.73 |
|  | *16 | 25.392 | 4.393 |  |  |
| L9 | 17 | 43.645 | 16.06 | 1.437 | 95.1 |
|  | 18 | −24.715 | 0.2 |  |  |
| L10 | 19 | −27.4333 | 1.7 | 1.90366 | 31.32 |
|  | 20 | 110.97 | 0.2 |  |  |
| L11 | 21 | 75.198 | 12.3 | 1.437 | 95.1 |
|  | 22 | −38.205 | 53 |  |  |
| L12 | *23 | 390.257 | 11.07 | 1.58313 | 59.38 |
|  | *24 | −63.982 | 70.573 |  |  |
| L13 | 25 | 115.399 | 9.66 | 1.92286 | 20.88 |
|  | 26 | −2450.857 | 75 |  |  |
| L14 | *27 | 71.286 | 3.8 | 1.58313 | 59.38 |
|  | *28 | 40.35 | 9.215 |  |  |
| L15 | 29 | 821.032 | 4.49 | 1.85548 | 24.8 |
|  | 30 | −116.494 | 52.433 |  |  |
| L16 | 31 | 87.47 | 7.44 | 1.43875 | 94.93 |
|  | 32 | −54.659 | 0.2 |  |  |
| L17 | 33 | 90.47 | 4.46 | 1.43875 | 94.93 |
|  | 34 | −157.905 | 1.344 |  |  |
| L18 | 35 | −72.58 | 1.7 | 1.71736 | 29.52 |
|  | 36 | 46.538 | 2.094 |  |  |
| L19 | 37 | 120.995 | 3.98 | 1.59282 | 68.63 |
|  | 38 | −118.57 | 41.642 |  |  |
| L20 | 39 | 744.044 | 6.62 | 1.92286 | 20.88 |
|  | 40 | −74.334 | 8 |  |  |
| 19 | 41 | I INFINITY | 44.747 | 1.51633 | 64.14 |
|  | 42 | INFINITY | 7.829 |  |  |

When focusing is performed with the projection size changed, the on-axis inter-surface distances A, B, C, D, and E, the focal length |f|, and the half angle of view ω change as shown in the following list. In the list, Position 1 collectively refers to the positions of the lenses after the focusing in the case where the on-axis inter-surface distance A, which is the distance between the first-lens-unit first lens and the screen S, is set at 900 mm. Similarly, Position 2 collectively refers to the positions of the lenses in the case where the on-axis inter-surface distance A is set at 600 mm, and Position 3 collectively refers to the positions of the lenses in the case where the on-axis inter-surface distance A is set at 6000 mm.

|  | Position 1 | Position 2 | Position 3 |
|---|---|---|---|
| A | 900 | 600 | 3000 |
| B | 14.486 | 14.96 | 13.867 |
| C | 30.021 | 30.207 | 29.774 |
| D | 7.109 | 7.095 | 7.124 |
| E | 46 | 45.354 | 46.851 |
| Focal length |f| | 8.05 | 8 | 8.121 |
| Maximum angle of view ω | 68° | 67.8° | 68.26° |

Aspheric surface data on each of the aspheric surfaces are next shown in the following Tables 5 and 6. Table 5 shows coefficients of an aspheric surface equation for specifying the shapes of the aspheric surfaces labeled with the surface numbers 1 and 2, each of which represents an aspheric surface. Table 6 shows coefficients of an even-numbered aspheric surface equation for specifying the shapes of the aspheric surfaces labeled with the surface numbers 15, 16, 23, 24, 27, and 28, each of which represents an aspheric surface.

TABLE 5

|  | 1 | 2 |
|---|---|---|
| Radius of Y curvature | −75.2755 | 116.6110 |
| Conic constant | −42.8278 | 3.2515 |
| Second aspheric surface coefficient | 2.99151E−03 | 6.22393E−03 |
| Third aspheric surface coefficient | 5.24169E−05 | 1.74702E−04 |
| Fourth aspheric surface coefficient | 1.82608E−06 | −1.40927E−07 |
| Fifth aspheric surface coefficient | −5.73290E−08 | −9.18305E−09 |
| Sixth aspheric surface coefficient | 3.90383E−10 | −9.27421E−11 |
| Seventh aspheric surface coefficient | 4.27347E−12 | −8.33616E−12 |
| Eighth aspheric surface coefficient | −2.58363E−14 | −1.61154E−13 |
| Ninth aspheric surface coefficient | −2.62138E−16 | −2.02369E−15 |
| Tenth aspheric surface coefficient | −1.06813E−18 | −1.66129E−17 |
| Eleventh aspheric surface coefficient | −2.97584E−21 | 2.46160E−20 |
| Twelfth aspheric surface coefficient | 1.91419E−23 | 6.33680E−21 |
| Thirteenth aspheric surface coefficient | 3.91878E−24 | 1.86473E−22 |
| Fourteenth aspheric surface coefficient | 7.17515E−26 | 3.61798E−24 |
| Fifteenth aspheric surface coefficient | −2.97684E−28 | 5.23520E−26 |
| Sixteenth aspheric surface coefficient | 1.21262E−30 | 6.76081E−28 |
| Seventeenth aspheric surface coefficient | −4.09559E−32 | 5.51894E−30 |
| Eighteenth aspheric surface coefficient | −3.97769E−34 | −5.34921E−32 |
| Nineteenth aspheric surface coefficient | −1.04966E−35 | −4.81208E−33 |

TABLE 5-continued

| | 1 | 2 |
|---|---|---|
| Twentieth aspheric surface coefficient | 1.69472E−38 | −1.73599E−34 |

TABLE 6

| | 15 | 16 | 23 | 24 | 27 | 28 |
|---|---|---|---|---|---|---|
| Radius of Y curvature | 113.1360 | 25.3920 | 390.2570 | −63.9820 | 71.2860 | 40.3500 |
| Conic constant (K) | 33.9909 | −0.1016 | 41.0000 | −1.5478 | −5.9080 | −0.4736 |
| Fourth coefficient (A) | −5.52224E−06 | 2.57922E−07 | 3.69652E−07 | 3.20852E−06 | 1.18426E−05 | 1.10680E−05 |
| Sixth coefficient (B) | −7.90378E−09 | 1.70243E−09 | −1.46599E−09 | −2.82889E−09 | −8.18472E−09 | −6.35575E−09 |
| Eighth coefficient (C) | −1.00488E−11 | −1.36608E−11 | −2.60121E−13 | 3.10088E−13 | 4.38177E−12 | 2.07672E−12 |
| Tenth coefficient (D) | −4.60473E−14 | 1.26104E−14 | 3.65397E−16 | 3.01709E−16 | −1.72338E−15 | −1.53928E−15 |
| Twelfth coefficient (E) | 2.41467E−17 | 3.16673E−17 | 1.12677E−19 | 6.96237E−21 | −4.53844E−20 | 6.13103E−20 |
| Fourteenth coefficient (F) | 2.89333E−26 | 2.89333E−26 | −9.80852E−23 | −4.86020E−23 | 1.72979E−36 | −5.30960E−37 |
| Sixteenth coefficient (G) | 9.89186E−22 | 4.59111E−21 | 0.00000E+00 | 0.00000E+00 | 0.00000E+00 | 0.00000E+00 |
| Eighteenth coefficient (H) | −1.02945E−23 | −4.87339E−23 | 0.00000E+00 | 0.00000E+00 | 0.00000E+00 | 0.00000E+00 |
| Twentieth coefficient (J) | 1.37138E−26 | 9.61349E−26 | 0.00000E+00 | 0.00000E+00 | 0.00000E+00 | 0.00000E+00 |

According to the projection system 3C of the present example, since the second-lens-unit first lens L13 is a positive lens, the intermediate image 30 is readily formed in a position shifted from the second-lens-unit first lens L13 toward the first lens unit LU1. Since the intermediate image 30 is formed by the positive lens, distortion produced by the first lens unit LU1 is readily corrected by the second lens unit LU2. Further, the chief ray of the off-axis light rays that travel between the first-lens-unit twelfth lens L12 and the second-lens-unit first lens L13, which are located on opposite sides of the intermediate image 30, approaches the optical axis L when the chief ray travels from the second-lens-unit first lens L13 toward the first-lens-unit twelfth lens L12, and the focus position P on the intermediate image 30 where the off-axis light rays are brought into focus approaches the second-lens-unit first lens L13 with distance toward the off-axis side. As a result, the distortion produced by the first lens unit LU1 is more readily corrected by the second lens unit LU2.

The projection system 3C satisfies the following conditional expression (1):

$$-0.3 \leq fU1/fU2 < 0 \quad (1)$$

where fU1 denotes the focal length of the first lens unit LU1, and fU2 denotes the focal length of the second lens unit LU2.

That is, $$fU1=14.9869,$$

$$fU2=-570.06, \text{ and}$$

$$fU1/fU2=-0.026.$$

Since the projection system 3C satisfies the conditional expression (1), it is easy to increase the maximum angle of view to a value greater than or equal to 120° (increase the half angle of view ω to a value greater than or equal to 60°) without an increase in the number of lenses. Further, the lens diameter of the second lens unit LU2 can be reduced. That is, when the value of the conditional expression (1) exceeds the lower limit, the focal length of the first lens unit LU1 increases, so that it is not easy to increase the angle of view. Further, when the value of the conditional expression (1) exceeds the lower limit, the inclination of the light rays between the second lens unit LU2 and the intermediate image 30 with respect to the optical axis L increases, resulting in degradation in field curvature and an increase in the diameter of the lens that is provided in the second lens unit LU2 and closest to the intermediate image 30 (second-lens-unit first lens L13). On the other hand, when the value of the conditional expression (1) exceeds the upper limit, the second lens unit LU2 has positive power, so that the light rays incident from the side facing the intermediate image 30 on the first lens unit LU1 become roughly telecentric light rays or light rays the overall diameter of which increases. As a result, since the burden on the first lens unit LU1 increases, it is necessary to increase the number of lenses of the first lens unit LU1 for aberration correction. Further, since the projection system 3C of the present example satisfies the conditional expression (1), an increase in the size of the first-lens-unit first lens L1 can be suppressed.

In the projection system 3C, the second-lens-unit first lens L13 has a refractive index nd13 and an Abbe number vd13 as follows:

$$nd13=1.92286; \text{ and}$$

$$vd13=20.88,$$

and the following conditional expressions (2) and (3) are satisfied.

$$nd1>1.7 \quad (2)$$

$$vd1<35 \quad (3)$$

In the projection system 3C of the present example, since the refractive index of the second-lens-unit first lens L13, which has positive power, satisfies the conditional expression (2) (refractive index is greater than 1.7), the intermediate image 30 is readily formed in a position shifted from the second-lens-unit first lens L13 toward the first lens unit LU1. Further, since the Abbe number of the second-lens-unit first lens L13 satisfies the conditional expression (3) (Abbe number is smaller than 35), chromatic aberrations can be satisfactorily corrected.

In the projection system 3C, the second-lens-unit eighth lens L20 (second-lens-unit deruction-side first lens) has a refractive index nd20 and an Abbe number vd20 as follows:

$$nd20=1.92286; \text{ and}$$

$$vd20=20.88,$$

and the refractive index nd20 and the Abbe number vd20 satisfy the following conditional expressions (4) and (5).

$$1.75 < nd20 < 2.00 \quad (4)$$

$$20 < vd20 < 45 \quad (5)$$

That is, in the projection system 3C, the two lenses that are provided in the second lens unit LU2 and close to the liquid crystal panels (second-lens-unit seventh lens L19 and second-lens-unit eighth lens L20) each have positive power, and the refractive index of at least one of the two lenses (second-lens-unit eighth lens L20) is greater than 1.75 but smaller than 2.00. Further, the Abbe number of the second-lens-unit eighth lens L20, which satisfies the conditional expression (4), is greater than 20 but smaller than 45. Field curvature and chromatic aberrations can therefore be satisfactorily corrected.

Further, in the projection system 3C, each of the first-lens-unit twelfth lens L12 and the second-lens-unit second lens L14 is an aspheric lens. Since each of these lenses is an aspheric lens, field curvature can be corrected in a high image height position. Field curvature can therefore be satisfactorily corrected.

The first-lens-unit twelfth lens L12 has a refractive index nd12 and an Abbe number vd12 as follows:

$$nd12 = 1.58313; \text{ and}$$

$$vd12 = 59.38,$$

and the refractive index nd12 and the Abbe number vd12 satisfy the following conditional expressions (6) and (7).

$$1.5 < nd12 < 1.8 \quad (6)$$

$$35 < vd12 < 85 \quad (7)$$

Further, the second-lens-unit second lens L14 has a refractive index nd14 and an Abbe number vd14 as follows:

$$nd14 = 1.58313; \text{ and}$$

$$vd14 = 59.38,$$

and the refractive index nd14 and the Abbe number vd14 satisfy the following conditional expressions (6') and (7').

$$1.5 < nd14 < 1.8 \quad (6')$$

$$35 < vd14 < 85 \quad (7')$$

In the projection system 3C, since the first-lens-unit twelfth lens L12 and the second-lens-unit second lens L14, which are located on opposite sides of the second-lens-unit first lens L13, which forms the intermediate image 30, satisfy the conditional expressions (6) and (6'), field curvature can be satisfactorily corrected. Further, since the first-lens-unit twelfth lens L12 and the second-lens-unit second lens L14, which are located on opposite sides of the second-lens-unit first lens L13, which forms the intermediate image 30, satisfy the conditional expressions (7) and (7'), chromatic aberrations can be satisfactorily corrected.

Figure 12:
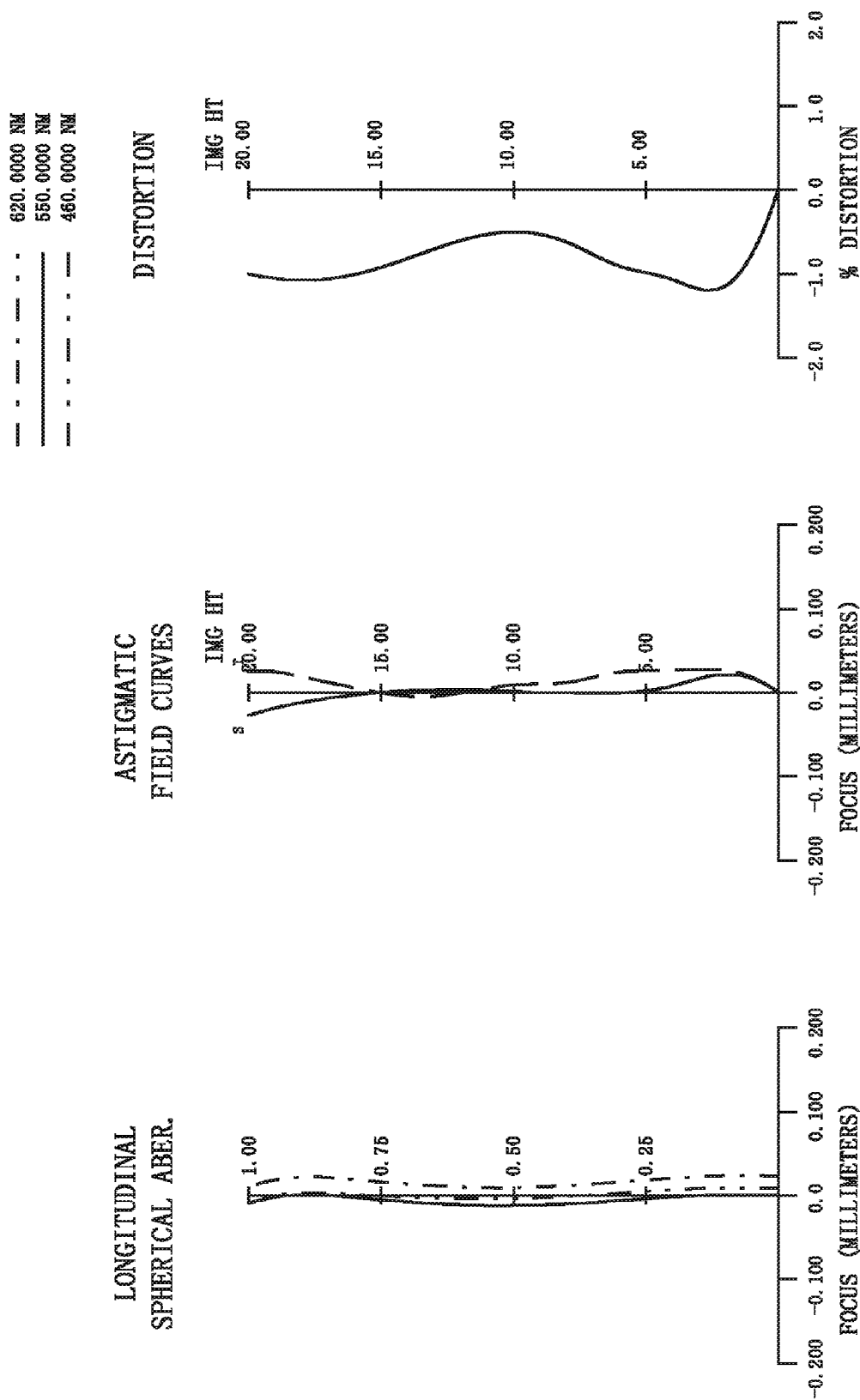
FIG. 12 is an aberration diagram of the projection system in a case where the lenses thereof are located in Position 1.
Figure 13:
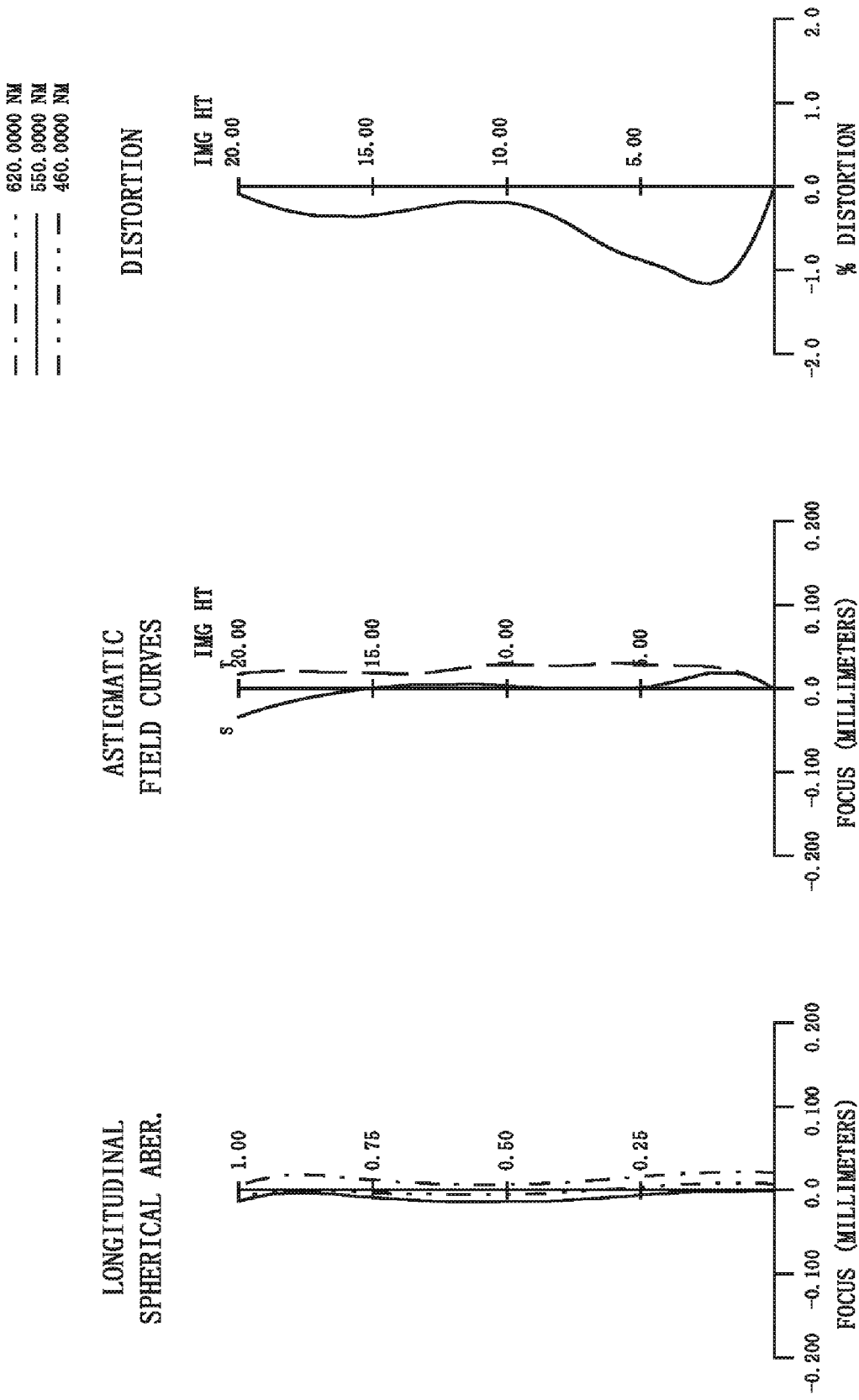
FIG. 13 is an aberration diagram of the projection system in a case where the lenses thereof are located in Position 2.
Figure 14:
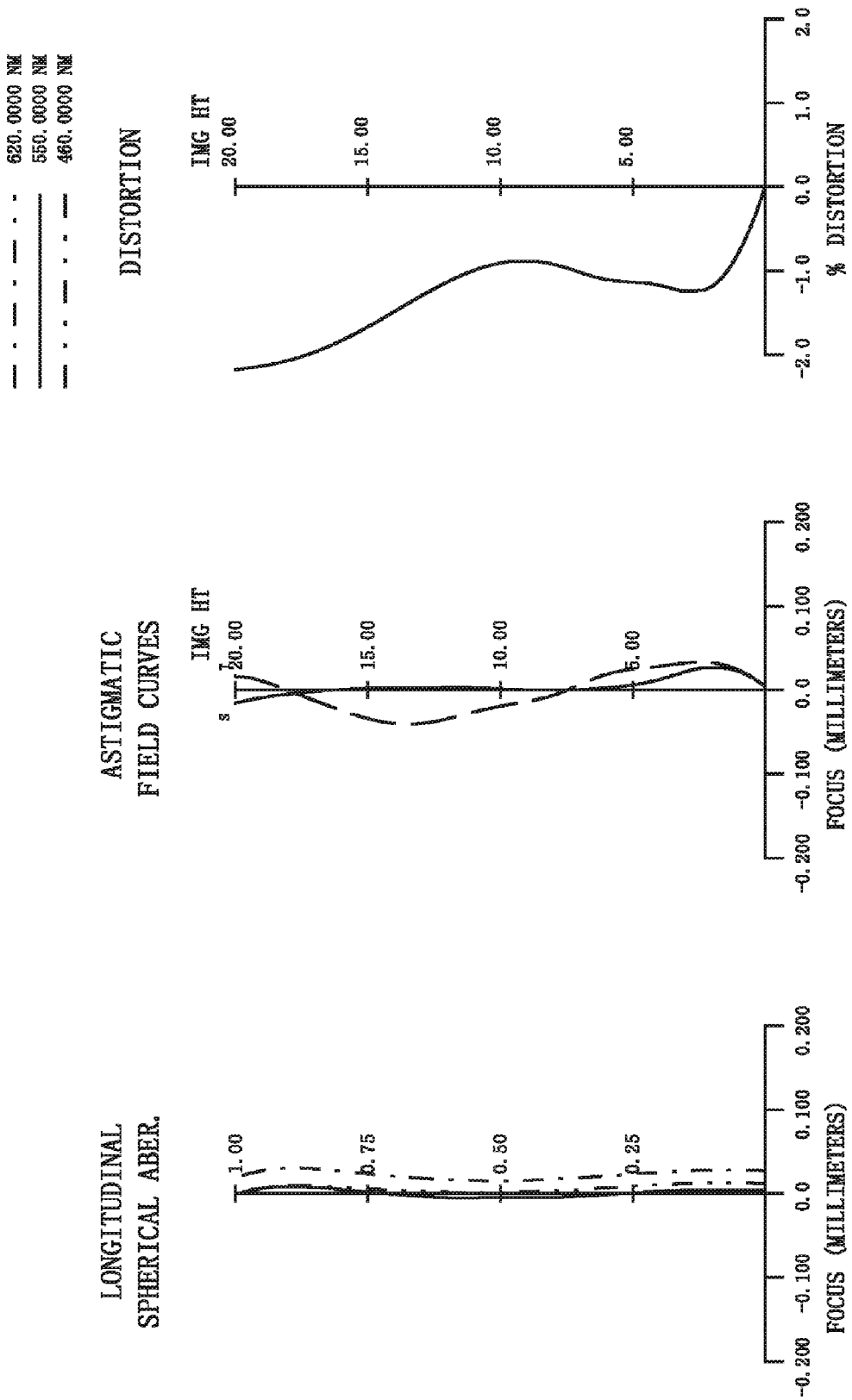
FIG. 14 is an aberration diagram of the projection system in a case where the lenses thereof are located in Position 3.

FIG. 12 is an aberration diagram (spherical aberration, astigmatism, and distortion) in the case where the lenses of the projection system 3C are located in Position 1. FIG. 13 is an aberration diagram (spherical aberration, astigmatism, and distortion) in the case where the lenses of the projection system 3C are located in Position 2. FIG. 14 is an aberration diagram (spherical aberration, astigmatism, and distortion) in the case where the lenses of the projection system 3C are located in Position 3. In the projection system 3C, the spherical aberration, astigmatism, and distortion are satisfactorily corrected, as shown in FIGS. 12 to 14.

Further, in the projection system 3C, the first-lens-unit first lens L1 is made of a resin and is therefore readily processed. The manufacturing cost of the projection system 3C can therefore be suppressed. The manufacturing cost of the projector 1 can be suppressed accordingly. Further, since the first-lens-unit first lens L1 is an aspheric lens, the diameter thereof is readily reduced.

To incorporate the projection system 3C into the projector 1, the first mirror 31 is disposed between the second-lens-unit first lens L13 and the second-lens-unit second lens L14 to deflect the optical path (optical axis L) therebetween, as in the projection system 3A. Further, the second mirror 32 is disposed between the first-lens-unit sixth lens L6 and the first-lens-unit seventh lens L7 to deflect the optical path (optical axis L) therebetween (see FIG. 6).

Since the arrangement of the first mirror 31 and the second mirror 32 in the projection system 3C allows the optical axis L to be oriented in a desired direction, the projection system 3C is readily incorporated into the projector 1. Further, since the on-axis inter-surface distance between the second-lens-unit first lens L13 and the second-lens-unit second lens L14 and the on-axis inter-surface distance between the first-lens-unit sixth lens L6 and the first-lens-unit seventh lens L7 have large values, the mirrors are readily disposed between these lenses. Moreover, the arrangement of the first mirror 31 between the second-lens-unit first lens L13 and the second-lens-unit second lens L14 allows the intermediate image 30 to be formed in a position relatively remote from the first mirror 31. As a result, in a case where scratches, dust, and other defects are present on the surface of the first mirror 31, a situation in which these undesirable objects are displayed on the screen S (enlargement-side image formation plane) can be avoided.

Example 4

Figure 15:
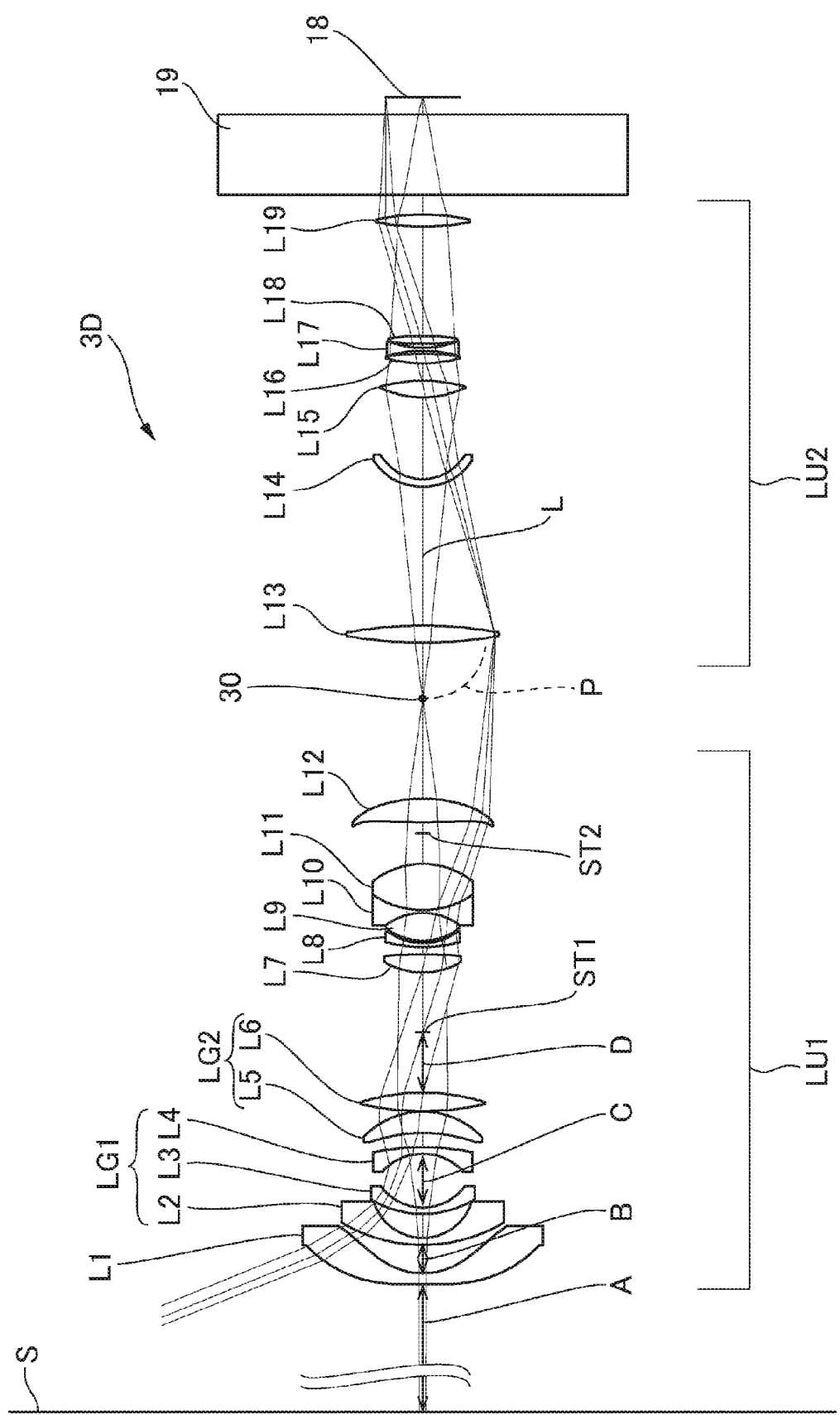
FIG. 15 is a configuration diagram of a projection system of Example 4.

FIG. 15 is a configuration diagram (light ray diagram) of a projection system of Example 4. A projection system 3D of the present example is formed of a first lens unit LU1, which makes the screen S, which is an enlargement-side image formation plane, conjugate with an intermediate image 30, and a second lens unit LU2, which makes the intermediate image 30 conjugate with the liquid crystal panels 18 (18R, 18G, and 18B), each of which is a reduction-side image formation plane, as shown in FIG. 15. The first lens unit LU1 has positive power. The second lens unit LU2 has negative power.

The first lens unit LU1 includes a first-lens-unit first lens L1 (first-lens-unit enlargement-side lens), which has negative power, a first lens group LG1, which has negative power, and a second lens group LG2, which has positive power, arranged from the side facing the screen S toward the intermediate image 30. The first-lens-unit first lens L1 is made of a resin. The first-lens-unit first lens L1 is an aspheric lens having aspheric shapes on both sides. In the present example, the first-lens-unit first lens L1 has a meniscus shape that is convex toward the screen S.

The first lens group LG1 is formed of at least two lenses. In the present example, the first lens group LG1 is formed of three lenses, a first-lens-unit second lens L2, a first-lens-unit third lens L3, and a first-lens-unit fourth lens L4, arranged from the side facing the screen S toward the intermediate image 30. Each of the first-lens-unit second lens L2, the first-lens-unit third lens L3, and the first-lens-unit fourth lens L4 has negative power. The second lens group LG2 is formed of at least two lenses each having positive power. In the present example, the second lens group LG2 is formed of a first-lens-unit fifth lens L5, which has positive power, and a first-lens-unit sixth lens L6, which has positive power.

The first lens unit LU1 further includes a first-lens-unit seventh lens L7, a first-lens-unit eighth lens L8, a first-lens-unit ninth lens L9, a first-lens-unit tenth lens L10, a first-lens-unit eleventh lens L11, and a first-lens-unit twelfth lens L12 arranged from the side facing the second lens group LG2 toward the intermediate image 30. The first lens unit LU1 is therefore formed of 12 lenses. A stop ST1 is disposed between the second lens group LG2 and the first-lens-unit seventh lens L7. A stop ST2 is disposed between the first-lens-unit eleventh lens L11 and the first-lens-unit twelfth lens L12. In the present example, the first-lens-unit twelfth lens L12 (first-lens-unit intermediate-image-side lens) is an aspheric lens having aspheric shapes on both sides.

The second lens unit LU2 includes a second-lens-unit first lens L13, a second-lens-unit second lens L14, a second-lens-unit third lens L15, a second-lens-unit fourth lens L16, a second-lens-unit fifth lens L17, a second-lens-unit sixth lens L18, and a second-lens-unit seventh lens L19 arranged from the side facing the intermediate image 30 toward the liquid crystal panels. That is, the second lens unit LU2 is formed of 7 lenses. The cross dichroic prism 19 is disposed between the second-lens-unit seventh lens L19 and the liquid crystal panels 18.

The second-lens-unit first lens L13 (second-lens-unit intermediate-image-side first lens) has positive power. In the present example, the second-lens-unit first lens L13 is a convex lens having convex shapes on both sides. The second-lens-unit second lens L14 is an aspheric lens having aspheric shapes on both sides. The second-lens-unit seventh lens L19 (second-lens-unit reduction-side first lens), which is closest to the liquid crystal panels 18, and the second-lens-unit sixth lens L18 (second-lens-unit reduction-side second lens), which is located in the position adjacent to the second-lens-unit seventh lens L19, each have positive power.

In the projection system 3D, the chief ray of off-axis light rays that travel between the first-lens-unit twelfth lens L12 and the second-lens-unit first lens L13, which are located on opposite sides of the intermediate image 30, approaches an optical axis L when the chief ray travels from the second-lens-unit first lens L13 toward the first-lens-unit twelfth lens L12, as shown in FIG. 15. A focus position P on the intermediate image 30 where the off-axis light rays are brought into focus approaches the second-lens-unit first lens L13 with distance toward the off-axis side.

To change the size of an image projected by the projection system 3D on the screen S, the first lens group LG1, the first-lens-unit fourth lens L4, which is provided in the first lens group LG1 and closest to the second lens group LG2, and the second lens group LG2 are moved along the optical axis L with the first-lens-unit first lens L1 fixed to perform focusing. In the present example, when the focusing is performed, the distance between the first lens group LG1 and the second lens group LG2 is not changed, but the first-lens-unit fourth lens L4 and the second lens group LG2 are together moved along the optical axis L.

The projection system 3D of Example 4 has the following data on the focal length |f|, the maximum angle of view (half angle of view) ω, the F-number FNo, and the effective image circle diameter φ.

|f|=7.5 mm

ω=68°

FNo=1.95

φ=37 mm

The projection system 3D has the following lens data. The column labeled with "Lens" represents reference characters assigned to the lenses in FIG. 15. A surface having a surface number to which * is attached is an aspheric surface. Reference character R denotes the radius of curvature. Reference character d denotes the on-axis inter-surface distance (mm) (lens thickness or inter-lens distance). Reference character nd denotes the refractive index. Reference character vd denotes the Abbe number. The on-axis inter-surface distance A is the distance between the screen S and the first-lens-unit first lens L1. The on-axis inter-surface distance B is the distance between the first-lens-unit first lens L1 and the first lens group LG1. The on-axis inter-surface distance C is the distance between the first-lens-unit third lens L3 and the first-lens-unit fourth lens L4 in the first lens group LG1. The on-axis inter-surface distance D is the distance between the second lens group LG2 and the stop ST1. The on-axis inter-surface distance A changes when the projection size is changed, and the on-axis inter-surface distances B, C, and D change when the focusing is performed in the case where the projection size is changed.

| Lens | Surface number vd | R | d | nd | vd |
|---|---|---|---|---|---|
| S |  | INFINITY | A |  |  |
| L1 | *1 | −89.161 | 5.5 | 1.5094 | 56.6 |
|  | *2 | 109.733 | B |  |  |
| L2 | 3 | 79.94 | 3.5 | 1.83481 | 42.73 |
|  | 4 | 25.736 | 12.019 |  |  |
| L3 | 5 | 49.643 | 3.2 | 1.83481 | 42.73 |
|  | 6 | 26.264 | C |  |  |
| L4 | 7 | −27.526 | 3.2 | 1.83481 | 42.73 |
|  | 8 | −126.895 | 7.182 |  |  |
| L5 | 9 | −78.505 | 10.72 | 1.85478 | 24.8 |
|  | 10 | −40.792 | 0.2 |  |  |
| L6 | 11 | 138.567 | 9.28 | 1.7725 | 49.6 |
|  | 12 | −104.935 | D |  |  |
| ST1 | 13 | INFINITY | 30.05 |  |  |
| L7 | 14 | 38.262 | 9.22 | 1.497 | 81.54 |
|  | 15 | −176.384 | 3.616 |  |  |
| L8 | 16 | 74.085 | 1.83 | 1.80518 | 25.42 |
|  | 17 | 28.764 | 1.268 |  |  |
| L9 | 18 | 30.423 | 13.95 | 1.437 | 95.1 |
| L10 | 19 | −30.869 | 1.4 | 1.90366 | 31.32 |
| L11 | 20 | 44.674 | 23.146 | 1.437 | 95.1 |
|  | 21 | −40.694 | 15.371 |  |  |
| ST2 | 22 | INFINITY | 5.454 |  |  |
| L12 | *23 | 263.035 | 12 | 1.58573 | 59.7 |
|  | *24 | −62.45 | 78.11 |  |  |
| L13 | 25 | 218.2 | 8.53 | 1.92286 | 20.88 |
|  | 26 | −213.87 | 69.77 |  |  |
| L14 | *27 | 36.498 | 3.8 | 1.5094 | 56.6 |
|  | *28 | 26.569 | 40.938 |  |  |
| L15 | 29 | 49.75 | 8.28 | 1.43875 | 94.93 |
|  | 30 | −77.05 | 8.806 |  |  |
| L16 | 31 | 71.28 | 4.56 | 1.43875 | 94.93 |
|  | 32 | −181.816 | 1.5 |  |  |
| L17 | 33 | −74.665 | 1.7 | 1.72825 | 28.46 |
|  | 34 | 47.805 | 1.892 |  |  |
| L18 | 35 | 115.729 | 4.08 | 1.834 | 37.34 |
|  | 36 | −111.922 | 54.808 |  |  |
| L19 | 37 | 130.717 | 5.98 | 1.92286 | 20.88 |
|  | 38 | −111.912 | 10 |  |  |
| 19 | 39 | INFINITY | 40 | 1.51633 | 64.14 |
|  | 40 | INFINITY | 8.793 |  |  |

When focusing is performed with the projection size changed, the on-axis inter-surface distances A, B, C, and D, the focal length |f|, and the half angle of view ω change as shown in the following list. In the list, Position 1 collectively refers to the positions of the lenses after the focusing in the case where the on-axis inter-surface distance A, which is the distance between the first-lens-unit first lens and the screen S, is set at 900 mm. Similarly, Position 2 collectively refers to the positions of the lenses in the case where the on-axis inter-surface distance A is set at 600 mm, and Position 3 collectively refers to the positions of the lenses in the case where the on-axis inter-surface distance A is set at 6000 mm.

|  | Position 1 | Position 2 | Position 3 |
|---|---|---|---|
| A | 900 | 600 | 3000 |
| B | 14.141 | 14.437 | 13.778 |
| C | 27.024 | 27.133 | 26.881 |
| D | 30.2 | 29.795 | 30.706 |
| Focal length \|f\| | 7.5 | 7.47 | 7.54 |
| Maximum angle of view ω | 68° | 67.8° | 68.23° |

Aspheric surface data on each of the aspheric surfaces are next shown in the following Tables 7 and 8. Table 7 shows coefficients of an aspheric surface equation for specifying the shapes of the aspheric surfaces labeled with the surface numbers 1 and 2, each of which represents an aspheric surface. Table 8 shows coefficients of an even-numbered aspheric surface equation for specifying the shapes of the aspheric surfaces labeled with the surface numbers 23, 24, 27, and 28, each of which represents an aspheric surface.

TABLE 7

|  | 1 | 2 |
|---|---|---|
| Radius of Y curvature | −89.161 | 109.733 |
| Conic constant | −78.460 | 2.000 |
| Second aspheric surface coefficient | 3.01266E−03 | 7.22734E−03 |
| Third aspheric surface coefficient | 7.39384E−05 | 1.94198E−04 |
| Fourth aspheric surface coefficient | 1.16636E−06 | −6.16629E−07 |
| Fifth aspheric surface coefficient | −5.17651E−08 | −4.56501E−08 |
| Sixth aspheric surface coefficient | 4.44302E−10 | −6.03855E−10 |
| Seventh aspheric surface coefficient | 4.61146E−12 | −1.27369E−11 |
| Eighth aspheric surface coefficient | −2.37077E−14 | −1.18936E−13 |
| Ninth aspheric surface coefficient | −3.93261E−16 | −3.43785E−16 |
| Tenth aspheric surface coefficient | −2.73498E−18 | 2.52246E−17 |
| Eleventh aspheric surface coefficient | −1.87328E−20 | 9.21791E−19 |
| Twelfth aspheric surface coefficient | 3.19841E−22 | 2.32436E−20 |

TABLE 7-continued

|  | 1 | 2 |
|---|---|---|
| Thirteenth aspheric surface coefficient | 9.07337E−24 | 4.94523E−22 |
| Fourteenth aspheric surface coefficient | 1.34747E−25 | 8.17439E−24 |
| Fifteenth aspheric surface coefficient | −2.67359E−28 | 1.03349E−25 |
| Sixteenth aspheric surface coefficient | −3.28912E−30 | 3.88156E−28 |
| Seventeenth aspheric surface coefficient | −2.63248E−31 | −2.89196E−29 |
| Eighteenth aspheric surface coefficient | −3.60564E−33 | −1.50445E−30 |
| Nineteenth aspheric surface coefficient | −4.14378E−35 | −3.98582E−32 |
| Twentieth aspheric surface coefficient | −3.68416E−38 | 0.00000E+00 |

TABLE 8

|  | 23 | 24 | 27 | 28 |
|---|---|---|---|---|
| Radius of Y curvature | 263.035 | −62.450 | 36.498 | 26.569 |
| Conic constant (K) | 45.632 | −1.265 | −1.119 | −0.221 |
| Fourth coefficient (A) | −2.85145E−07 | 2.43467E−06 | 1.40148E−05 | 1.16630E−05 |
| Sixth coefficient (B) | −2.51912E−09 | −3.39171E−09 | −7.63650E−09 | −8.01571E−09 |
| Eighth coefficient (C) | −1.61220E−13 | 2.00384E−13 | 8.49820E−12 | 4.47664E−12 |
| Tenth coefficient (D) | 3.29195E−16 | 3.28204E−16 | 1.81215E−15 | 1.14718E−14 |
| Twelfth coefficient (E) | −4.05001E−20 | −8.08418E−20 | −1.10419E−18 | 2.25357E−19 |
| Fourteenth coefficient (F) | −1.59994E−22 | −1.59605E−22 | 2.34426E−22 | 1.31341E−21 |
| Sixteenth coefficient (G) | 1.32231E−26 | −1.61561E−26 | −4.79633E−24 | −4.00975E−23 |
| Eighteenth coefficient (H) | 3.14419E−29 | 3.24131E−29 | −1.34761E−28 | 1.95307E−26 |

According to the projection system 3D of the present example, since the second-lens-unit first lens L13 is a positive lens, the intermediate image 30 is readily formed in a position shifted from the second-lens-unit first lens L13 toward the first lens unit LU1. Since the intermediate image 30 is formed by the positive lens, distortion produced by the first lens unit LU1 is readily corrected by the second lens unit LU2. Further, the chief ray of the off-axis light rays that travel between the first-lens-unit twelfth lens L12 and the second-lens-unit first lens L13, which are located on opposite sides of the intermediate image 30, approaches the optical axis L when the chief ray travels from the second-lens-unit first lens L13 toward the first-lens-unit twelfth lens L12, and the focus position P on the intermediate image 30 where the off-axis light rays are brought into focus approaches the second-lens-unit first lens L13 with distance toward the off-axis side. As a result, the distortion produced by the first lens unit LU1 is more readily corrected by the second lens unit LU2.

The projection system 3D satisfies the following conditional expression (1):

$$-0.3 \leq fU1/fU2 < 0 \quad (1)$$

where fU1 denotes the focal length of the first lens unit LU1, and fU2 denotes the focal length of the second lens unit LU2.

That is, $$fU1 = 14.07,$$

$$fU2 = -1250.44, \text{ and}$$

$$fU1/fU2 = -0.011.$$

Since the projection system 3D satisfies the conditional expression (1), it is easy to increase the maximum angle of view to a value greater than or equal to 120° (increase the half angle of view ω to a value greater than or equal to 60°) without an increase in the number of lenses. Further, the lens diameter of the second lens unit LU2 can be reduced. That is, when the value of the conditional expression (1) exceeds the lower limit, the focal length of the first lens unit LU1 increases, so that it is not easy to increase the angle of view. Further, when the value of the conditional expression (1) exceeds the lower limit, the inclination of the light rays between the second lens unit LU2 and the intermediate image 30 with respect to the optical axis L increases, resulting in degradation in field curvature and an increase in the diameter of the lens that is provided in the second lens unit LU2 and closest to the intermediate image 30 (second-lens-unit first lens L13). On the other hand, when the value of the conditional expression (1) exceeds the upper limit, the second lens unit LU2 has positive power, so that the light rays incident from the side facing the intermediate image 30 on the first lens unit LU1 become roughly telecentric light rays or light rays the overall diameter of which increases. As a result, since the burden on the first lens unit=increases, it is necessary to increase the number of lenses of the first lens unit LU1 for aberration correction. Further, since the projection system 3D of the present example satisfies the conditional expression (1), an increase in the size of the first-lens-unit first lens L1 can be suppressed.

In the projection system 3D, the second-lens-unit first lens L13 has a refractive index nd13 and an Abbe number vd13 as follows:

$$nd13=1.92286;\text{ and}$$

$$vd13=20.88,$$

and the following conditional expressions (2) and (3) are satisfied.

$$nd1>1.7 \tag{2}$$

$$vd1<35 \tag{3}$$

In the projection system 3D of the present example, since the refractive index of the second-lens-unit first lens L13, which has positive power, satisfies the conditional expression (2) (refractive index is greater than 1.7), the intermediate image 30 is readily formed in a position shifted from the second-lens-unit first lens L13 toward the first lens unit LU1. Further, since the Abbe number of the second-lens-unit first lens L13 satisfies the conditional expression (3) (Abbe number is smaller than 35), chromatic aberrations can be satisfactorily corrected.

In the projection system 3D, the second-lens-unit sixth lens L18 (second-lens-unit reduction-side second lens) has a refractive index nd18 and an Abbe number vd18 as follows:

$$nd18=1.834;\text{ and}$$

$$vd18=37.34,$$

and the refractive index nd18 and the Abbe number vd18 satisfy the following conditional expressions (4) and (5).

$$1.75<nd18<2.00 \tag{4}$$

$$20<vd18<45 \tag{5}$$

In the projection system 3D, the second-lens-unit seventh lens L19 (second-lens-unit reduction-side first lens) has a refractive index nd19 and an Abbe number vd19 as follows:

$$nd19=1.92286;\text{ and}$$

$$vd19=20.88,$$

and the refractive index nd19 and the Abbe number vd19 satisfy the following conditional expressions (4') and (5').

$$1.75<nd19<2.00 \tag{4'}$$

$$20<vd19<45 \tag{5'}$$

That is, in the projection system 3D, the two lenses that are provided in the second lens unit LU2 and close to the liquid crystal panels (second-lens-unit eighth lens L18 and second-lens-unit ninth lens L19) each have positive power, and the refractive indices of the two lenses are greater than 1.75 but smaller than 2.00. Further, the Abbe numbers of the two lenses are greater than 20 but smaller than 45. Field curvature and chromatic aberrations can therefore be satisfactorily corrected.

Further, in the projection system 3D, each of the first-lens-unit twelfth lens L12 and the second-lens-unit second lens L14 is an aspheric lens. Since each of these lenses is an aspheric lens, field curvature can be corrected in a high image height position. Field curvature can therefore be satisfactorily corrected.

The first-lens-unit twelfth lens L12 has a refractive index nd12 and an Abbe number vd12 as follows:

$$nd12=1.58573;\text{ and}$$

$$vd12=59.7,$$

and the refractive index nd12 and the Abbe number vd12 satisfy the following conditional expressions (6) and (7).

$$1.5<nd12<1.8 \tag{6}$$

$$35<vd12<85 \tag{7}$$

Further, the second-lens-unit second lens L14 has a refractive index nd14 and an Abbe number vd14 as follows:

$$nd14=1.5094;\text{ and}$$

$$vd14=56.6,$$

and the refractive index nd14 and the Abbe number vd14 satisfy the following conditional expressions (6') and (7').

$$1.5<nd14<1.8 \tag{6'}$$

$$35<vd14<85 \tag{7'}$$

In the projection system 3D, since the first-lens-unit twelfth lens L12 and the second-lens-unit second lens L14, which are located on opposite sides of the second-lens-unit first lens L13, which forms the intermediate image 30, satisfy the conditional expressions (6) and (6'), field curvature can be satisfactorily corrected. Further since the first-lens-unit twelfth lens L12 and the second-lens-unit second lens L14, which are located on opposite sides of the second-lens-unit first lens L13, which forms the intermediate image 30, satisfy the conditional expressions (7) and (7'), chromatic aberrations can be satisfactorily corrected.

Figure 16:
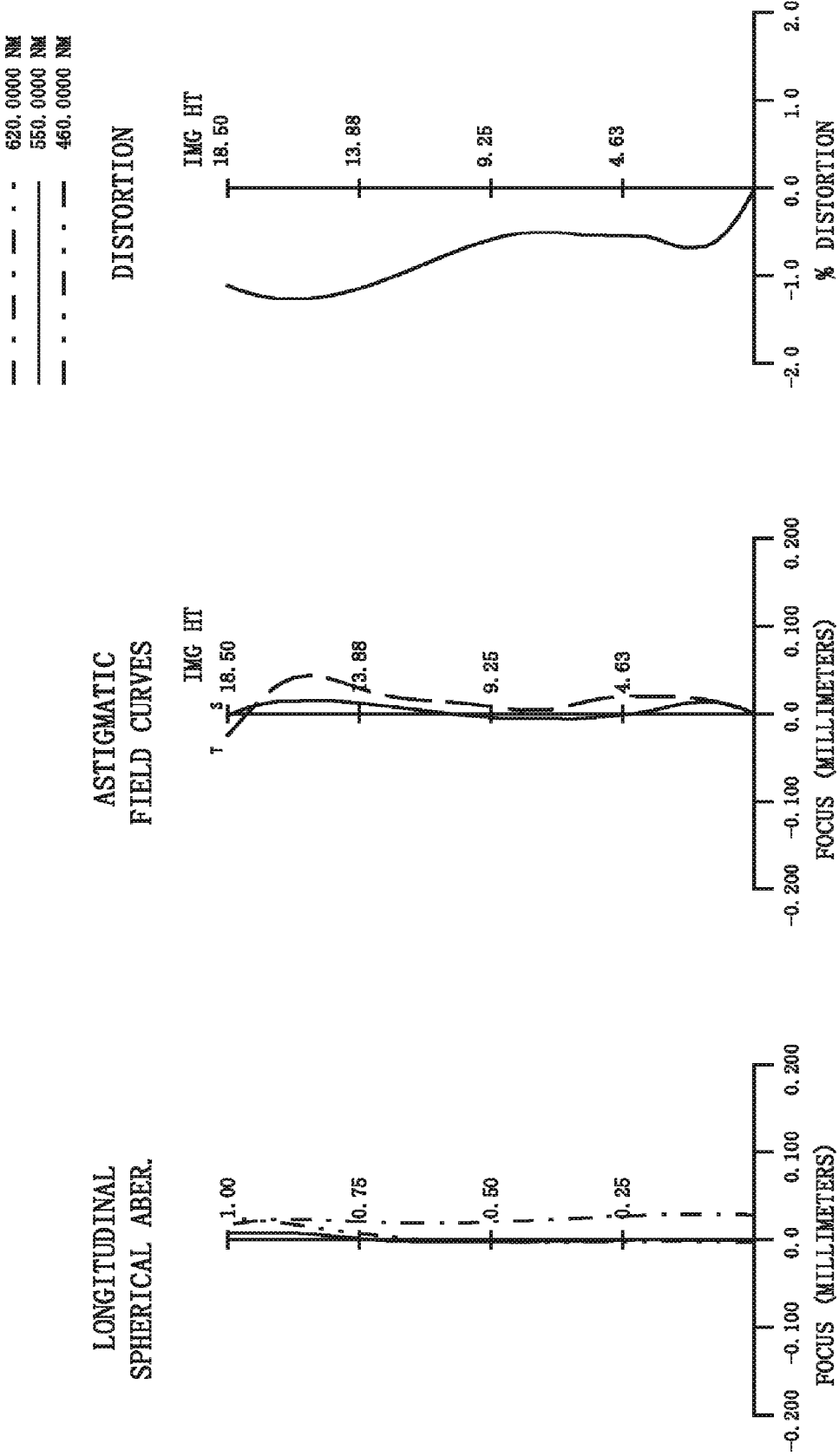
FIG. 16 is an aberration diagram of the projection system in a case where the lenses thereof are located in Position 1.
Figure 17:
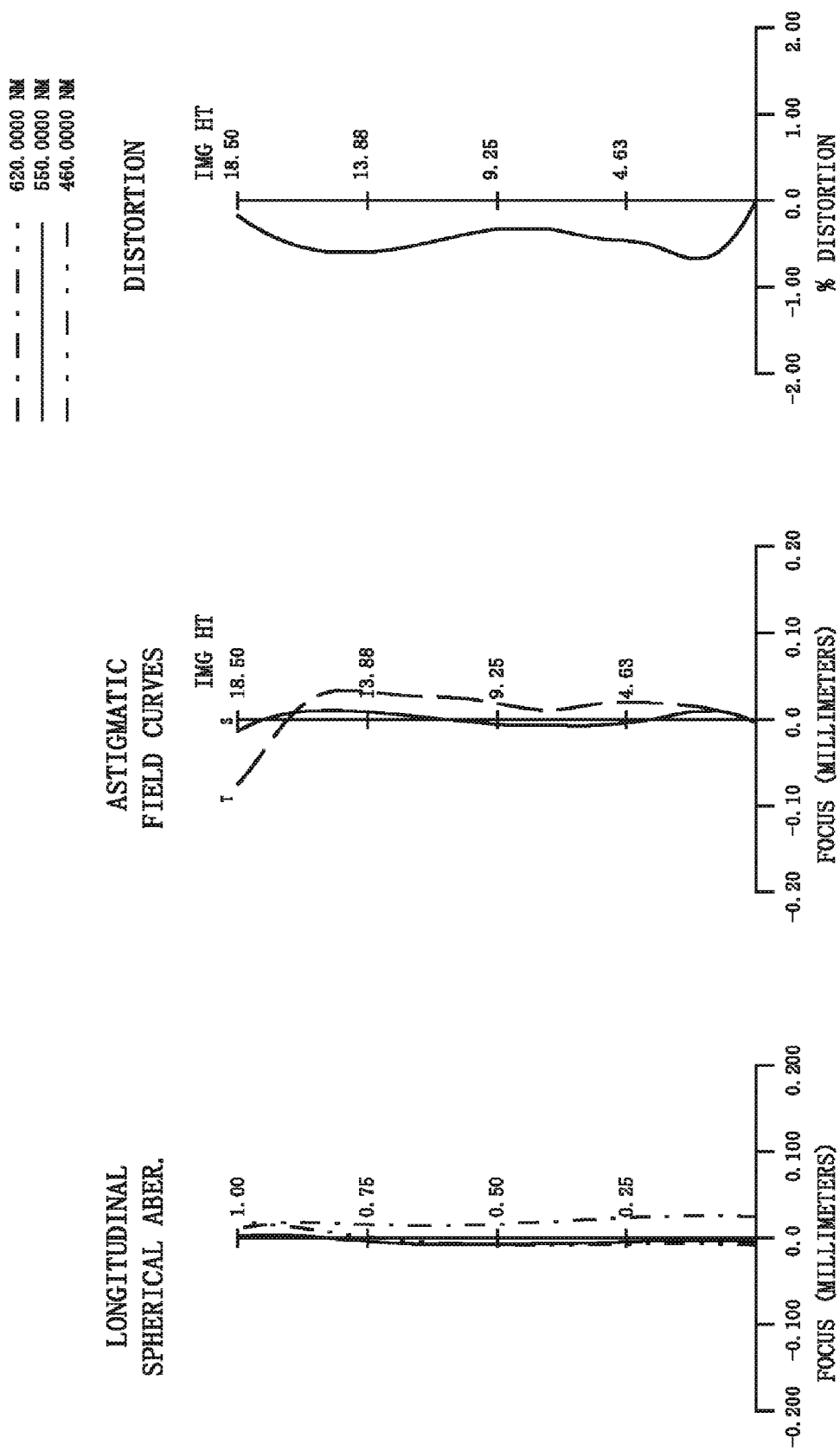
FIG. 17 is an aberration diagram of the projection system in a case where the lenses thereof are located in Position 2.
Figure 18:
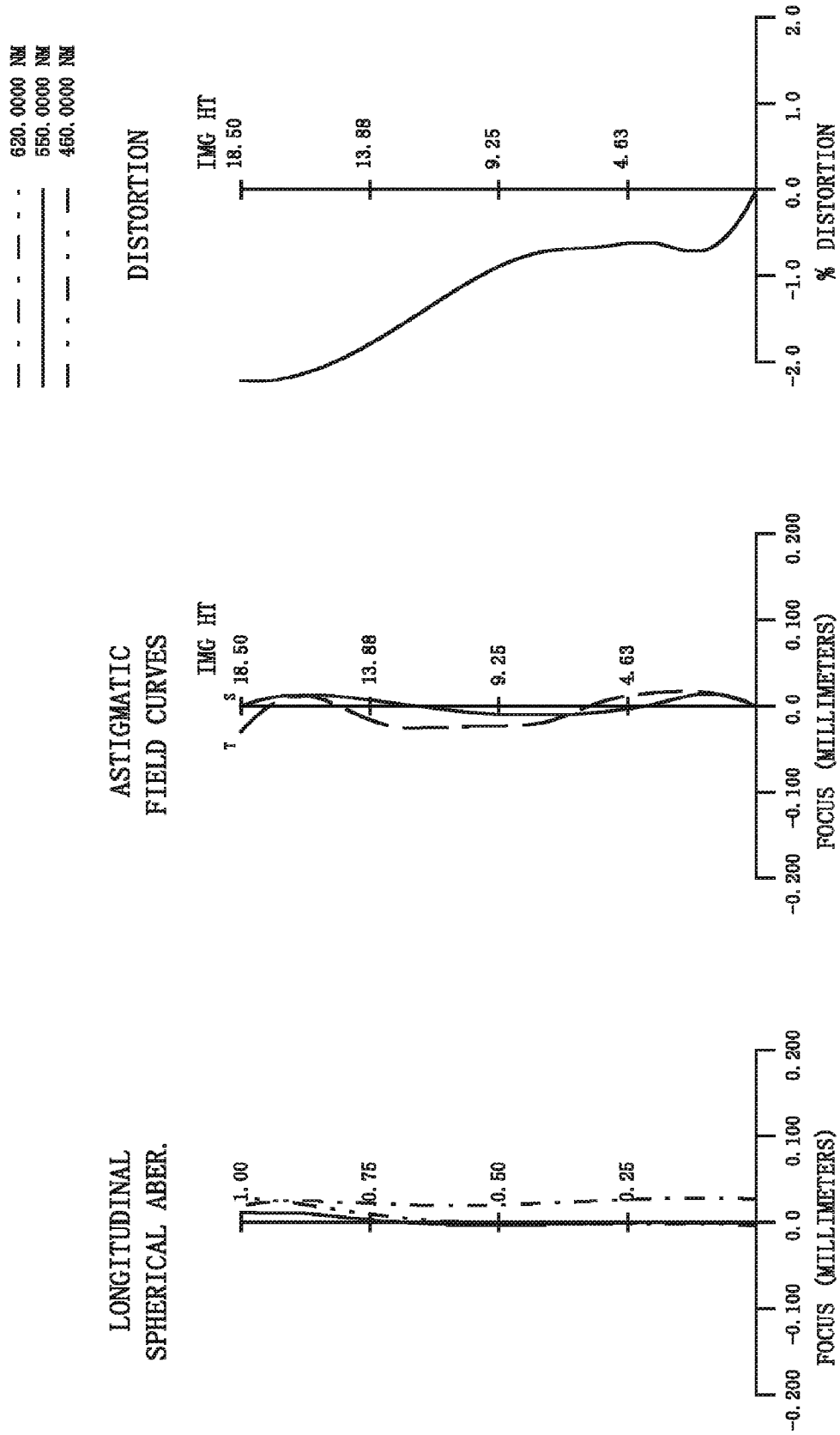
FIG. 18 is an aberration diagram of the projection system in a case where the lenses thereof are located in Position 3.

FIG. 16 is an aberration diagram (spherical aberration, astigmatism, and distortion) in the case where the lenses of the projection system 3D are located in Position 1. FIG. 17 is an aberration diagram (spherical aberration, astigmatism, and distortion) in the case where the lenses of the projection system 3D are located in Position 2. FIG. 18 is an aberration diagram (spherical aberration, astigmatism, and distortion) in the case where the lenses of the projection system 3D are located in Position 3. In the projection system 3D, the spherical aberration, astigmatism, and distortion are satisfactorily corrected, as shown in FIGS. 16 to 18.

Further, in the projection system 3D, the first-lens-unit first lens L1 is made of a resin and is therefore readily processed. The manufacturing cost of the projection system 3D can therefore be suppressed. The manufacturing cost of the projector 1 can be suppressed accordingly. Further, since the first-lens-unit first lens L1 is an aspheric lens, the diameter thereof is readily reduced.

To incorporate the projection system 3D into the projector 1, the first mirror 31 is disposed between the second-lens-unit first lens L13 and the second-lens-unit second lens L14 to deflect the optical path (optical axis L) therebetween, as in the projection system 3A. Further, the second mirror 32 is disposed between the first-lens-unit sixth lens L6 and the first-lens-unit seventh lens L7 to deflect the optical path (optical axis L) therebetween (see FIG. 6).

Since the arrangement of the first mirror 31 and the second mirror 32 in the projection system 3D allows the optical axis L to be oriented in a desired direction, the projection system 3D is readily incorporated in the projector 1. Further, since the on-axis inter-surface distance between the second-lens-unit first lens L13 and the second-lens-unit second lens L14 and the on-axis inter-surface distance between the first-lens-unit sixth lens L6 and the first-lens-unit seventh lens L7 have large values, the mirrors are readily disposed between these lenses. Moreover, the arrangement of the first mirror 31 between the second-lens-unit first lens L13 and the second-lens-unit second lens L14 allows the intermediate image 30 to be formed in a position relatively remote from the first mirror 31. As a result, in a case where scratches, dust, and other defects are present on the surface of the first mirror 31, a situation in which these undesirable objects are displayed on the screen S (enlargement-side image formation plane) can be avoided.

Example 5

Figure 19:
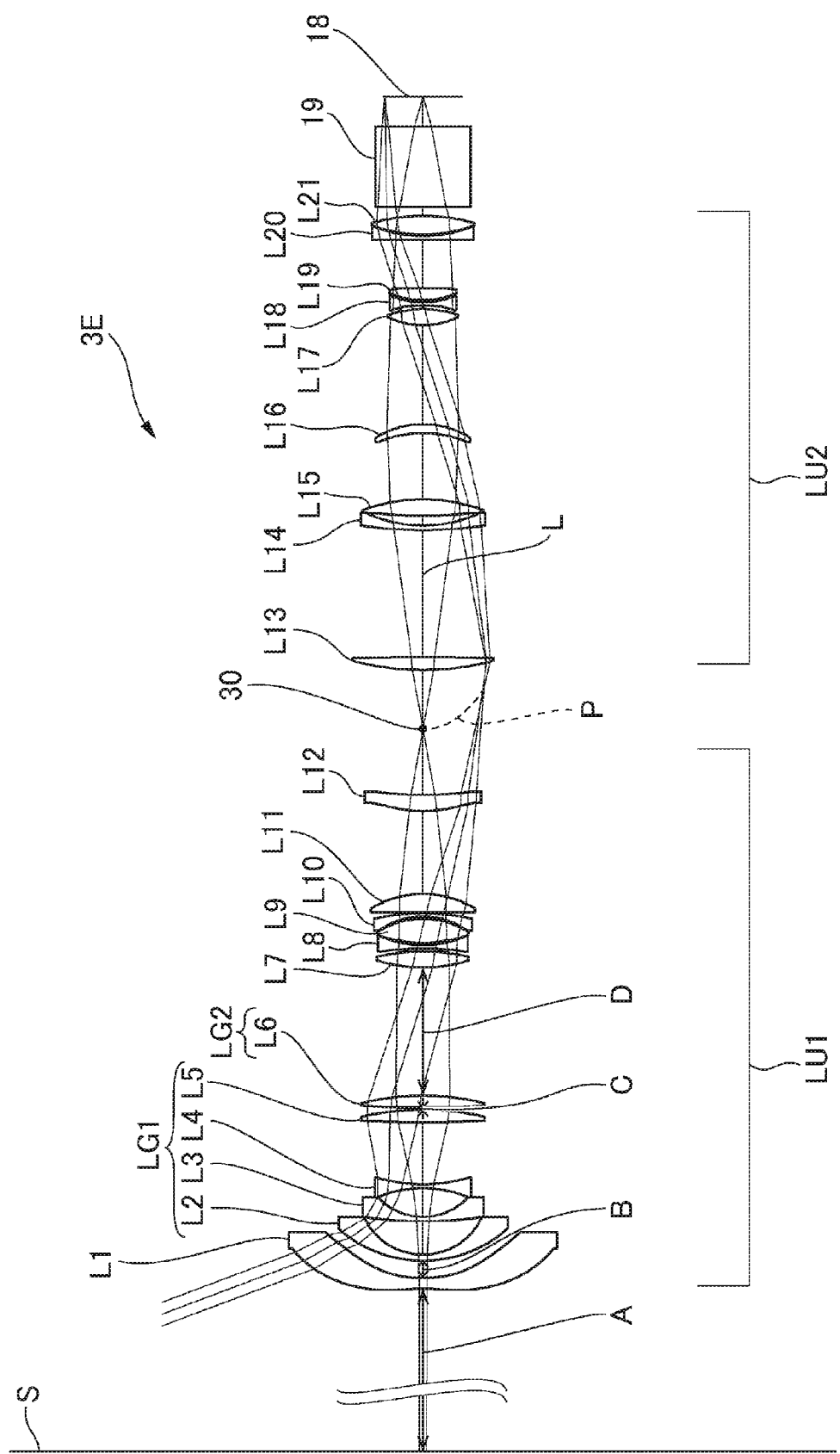
FIG. 19 is a configuration diagram of a projection system of Example 5.

FIG. 19 is a configuration diagram (light ray diagram) of a projection system of Example 5. A projection system 3E of the present example is formed of a first lens unit LU1, which makes the screen S, which is an enlargement-side image formation plane, conjugate with an intermediate image 30, and a second lens unit LU2, which makes the intermediate image 30 conjugate with the liquid crystal panels 18 (18R, 18G, and 18B), each of which is a reduction-side image formation plane, as shown in FIG. 19. The first lens unit LU1 has positive power. The second lens unit LU2 has negative power.

The first lens unit LU1 includes a first-lens-unit first lens L1 (first-lens-unit enlargement-side lens), which has negative power, a first lens group LG1, which has negative power, and a second lens group LG2, which has positive power, arranged from the side facing the screen S toward the intermediate image 30. The first-lens-unit first lens L1 is made of a resin. The first-lens-unit first lens L1 is an aspheric lens having aspheric shapes on both sides. In the present example, the first-lens-unit first lens L1 has a meniscus shape that is convex toward the screen S.

The first lens group LG1 is formed of at least two lenses. In the present example, the first lens group LG1 is formed of four lenses, a first-lens-unit second lens L2, a first-lens-unit third lens L3, a first-lens-unit fourth lens L4, and a first-lens-unit fifth lens L5, arranged from the side facing the screen S toward the intermediate image 30. Each of the first-lens-unit second lens L2, the first-lens-unit third lens L3, and the first-lens-unit fourth lens L4 has negative power.

The first-lens-unit fifth lens L5 has positive power. The second lens group LG2 includes a first-lens-unit sixth lens L6, which has positive power. In the present example, the second lens group LG2 is formed of one lens.

The first lens unit LU1 further includes a first-lens-unit seventh lens L7, a first-lens-unit eighth lens L8, a first-lens-unit ninth lens L9, a first-lens-unit tenth lens L10, a first-lens-unit eleventh lens L11, and a first-lens-unit twelfth lens L12 arranged from the side facing the second lens group LG2 toward the intermediate image 30. The first lens unit LU1 is therefore formed of 12 lenses. In the present example, the first-lens-unit twelfth lens L12 (first-lens-unit intermediate-image-side lens) is an aspheric lens having aspheric shapes on both sides.

The second lens unit LU2 includes a second-lens-unit first lens L13, a second-lens-unit second lens L14, a second-lens-unit third lens L15, a second-lens-unit fourth lens L16, a first-lens-unit fifth lens L17, a second-lens-unit sixth lens L18, a second-lens-unit seventh lens L19, a second-lens-unit eighth lens L20, and a second-lens-unit ninth lens L21 arranged from the side facing the intermediate image 30 toward the liquid crystal panels. That is, the second lens unit LU2 is formed of 9 lenses. The cross dichroic prism 19 is disposed between the second-lens-unit ninth lens L21 and the liquid crystal panels 18.

The second-lens-unit first lens L13 (second-lens-unit intermediate-image-side first lens) has positive power. In the present example, the second-lens-unit first lens L13 is a convex lens having convex shapes on both sides. The second-lens-unit ninth lens L21 (second-lens-unit reduction-side first lens), which is closest to the liquid crystal panels 18, has positive power. The second-lens-unit eighth lens L20 (second-lens-unit reduction-side second lens), which is located in the position adjacent to the second-lens-unit ninth lens L21 on the side closer to the intermediate image 30, has negative power.

In the projection system 3E, the chief ray of off-axis light rays that travel between the first-lens-unit twelfth lens L12 and the second-lens-unit first lens L13, which are located on opposite sides of the intermediate image 30, approaches an optical axis L when the chief ray travels from the second-lens-unit first lens L13 toward the first-lens-unit twelfth lens L12, as shown in FIG. 19. A focus position P on the intermediate image 30 where the off-axis light rays are brought into focus approaches the second-lens-unit first lens L13 with distance toward the off-axis side.

To change the size of an image projected by the projection system 3E on the screen S, the first lens group LG1 and the second lens group LG2 are moved along the optical axis L with the first-lens-unit first lens L1 fixed to perform focusing.

The projection system 3E of Example 5 has the following data on the focal length |f|, the maximum angle of view (half angle of view) ω, the F-number FNo, and the effective image circle diameter φ.

|f|=8.13 mm

ω=68.4°

FNo=1.92

φ=41.2 mm

The projection system 3E has the following lens data. The column labeled with "Lens" represents reference characters assigned to the lenses in FIG. 19. A surface having a surface number to which * is attached is an aspheric surface.

Reference character R denotes the radius of curvature. Reference character d denotes the on-axis inter-surface distance (mm) (lens thickness or inter-lens distance). Reference character nd denotes the refractive index. Reference character vd denotes the Abbe number. The on-axis inter-surface distance A is the distance between the screen S and the first-lens-unit first lens L1. The on-axis inter-surface distance B is the distance between the first-lens-unit first lens L1 and the first lens group LG1 (first-lens-unit first lens L1 and first-lens-unit second lens L2). The on-axis inter-surface distance C is the distance between the first lens group LG1 and the second lens group LG2 (first-lens-unit sixth lens L6). The on-axis inter-surface distance D is the distance between the second lens group LG2 (first-lens-unit sixth lens L6) and the first-lens-unit seventh lens L7. The on-axis inter-surface distance A changes when the projection size is changed, and the on-axis inter-surface distances B, C, and D change when the focusing is performed in the case where the projection size is changed.

| Lens | Surface number | R | d | nd | vd |
|---|---|---|---|---|---|
| S |   | INFINITY | A |   |   |
| L1 | *1 | −78.215 | 6.000 | 1.5094 | 56.6 |
|   | *2 | 120.775 | B |   |   |
| L2 | 3 | 66.350 | 3.400 | 1.8515 | 40.78 |
|   | 4 | 34.200 | 18.574 |   |   |
| L3 | 5 | 223.600 | 2.400 | 1.8515 | 40.78 |
|   | 6 | 32.200 | 15.932 |   |   |
| L4 | 7 | −62.500 | 2.200 | 1.497 | 81.54 |
|   | 8 | 82.250 | 34.516 |   |   |
| L5 | 9 | 617.000 | 6.900 | 1.85478 | 24.8 |
|   | 10 | −149.800 | C |   |   |
| L6 | 11 | 582.000 | 6.620 | 1.8515 | 40.78 |
|   | 12 | −128.150 | D |   |   |
| L7 | 13 | 76.350 | 8.900 | 1.6968 | 55.53 |
|   | 14 | −107.000 | 1.754 |   |   |
| L8 | 15 | −148.150 | 1.800 | 1.80518 | 25.46 |
|   | 16 | 54.300 | 1.321 |   |   |
| L9 | 17 | 71.300 | 13.300 | 1.437 | 95.1 |
|   | 18 | −44.700 | 1.390 |   |   |
| L10 | 19 | −38.450 | 1.900 | 1.80518 | 25.46 |
|   | 20 | −107.900 | 0.300 |   |   |
| L11 | 21 | INFINITY | 10.29 | 1.48749 | 70.23 |
|   | 22 | −52.400 | 46.211 |   |   |
| L12 | *23 | 73.280 | 9.000 | 1.693 | 53.18 |
|   | *24 | 1482.000 | 69.527 |   |   |
| L13 | 25 | 144.000 | 7.280 | 1.90366 | 31.32 |
|   | 26 | −1152.000 | 70.507 |   |   |
| L14 | 27 | 210.800 | 2.600 | 1.8061 | 33.27 |
|   | 28 | 70.050 | 5.613 |   |   |
| L15 | 29 | 306.000 | 8.920 | 1.91082 | 35.25 |
|   | 30 | −90.900 | 36.917 |   |   |
| L16 | 31 | −59.850 | 4.970 | 1.497 | 81.54 |
|   | 32 | −46.350 | 55.021 |   |   |
| L17 | 33 | 40.700 | 9.040 | 1.437 | 95.1 |
|   | 34 | −56.100 | 2.213 |   |   |
| L18 | 35 | −52.850 | 1.600 | 1.78472 | 25.68 |
|   | 36 | 43.450 | 1.363 |   |   |
| L19 | 37 | 47.650 | 6.620 | 1.53775 | 74.7 |
|   | 38 | −163.200 | 26.652 |   |   |
| L20 | 39 | 2532.000 | 2.200 | 1.497 | 81.54 |
|   | 40 | 66.550 | 0.880 |   |   |
| L21 | 41 | 76.550 | 10.400 | 1.92286 | 20.88 |
|   | 42 | −96.350 | 5.000 |   |   |
| 19 | 43 | INFINITY | 45.000 | 1.51633 | 64.14 |
|   | 44 | INFINITY | 16.380 |   |   |

When focusing is performed with the projection size changed, the on-axis inter-surface distances A, B, C, and D, the focal length |f|, and the half angle of view ω change as shown in the following list. In the list, Position 1 collectively refers to the positions of the lenses after the focusing in the case where the on-axis inter-surface distance A, which is the distance between the first-lens-unit first lens and the screen S, is set at 1050 mm. Similarly, Position 2 collectively refers to the positions of the lenses in the case where the on-axis inter-surface distance A is set at 730 mm, and Position 3 collectively refers to the positions of the lenses in the case where the on-axis inter-surface distance A is set at 2500 mm.

|   | Position 1 | Position 2 | Position 3 |
|---|---|---|---|
| A | 1050 | 730 | 2500 |
| B | 10.007 | 10.322 | 9.53 |
| C | 1.555 | 1.697 | 1.367 |
| D | 70.608 | 70.151 | 71.272 |
| Focal length |f| | 8.13 | 8.11 | 8.17 |
| Maximum angle of view ω | 68.44° | 68.30° | 68.66° |

Aspheric surface data on each of the aspheric surfaces are next shown in the following Tables 9 and 10. Table 9 shows coefficients of an aspheric surface equation for specifying the shapes of the aspheric surfaces labeled with the surface numbers 1 and 2, each of which represents an aspheric surface. Table 10 shows coefficients of an even-numbered aspheric surface equation for specifying the shapes of the aspheric surfaces labeled with the surface numbers 23 and 24, each of which represents an aspheric surface.

TABLE 9

|   | 1 | 2 |
|---|---|---|
| Radius of Y curvature | −78.215 | 120.775 |
| Conic constant | −38.4246 | 0.6905 |
| Second aspheric surface coefficient | 0.00000E+00 | 0.00000E+00 |
| Third aspheric surface coefficient | 1.35449E−04 | 2.09884E−04 |
| Fourth aspheric surface coefficient | 6.30816E−07 | −3.20217E−07 |
| Fifth aspheric surface coefficient | −5.76819E−08 | −4.33166E−08 |
| Sixth aspheric surface coefficient | 4.85972E−10 | −1.88248E−10 |
| Seventh aspheric surface coefficient | 7.00072E−12 | 1.63792E−12 |
| Eighth aspheric surface coefficient | −7.53663E−14 | 2.70949E−14 |
| Ninth aspheric surface coefficient | −4.96751E−16 | 9.82212E−16 |
| Tenth aspheric surface coefficient | 2.09991E−18 | 1.41999E−17 |
| Eleventh aspheric surface coefficient | 1.71529E−20 | 6.04317E−20 |
| Twelfth aspheric surface coefficient | −1.48557E−22 | −4.19937E−21 |
| Thirteenth aspheric surface coefficient | 1.54886E−23 | −6.26004E−23 |
| Fourteenth aspheric surface coefficient | 1.13311E−25 | 6.34369E−25 |
| Fifteenth aspheric surface coefficient | −2.62389E−27 | 1.42052E−26 |
| Sixteenth aspheric surface coefficient | −5.26786E−30 | −3.29401E−28 |
| Seventeenth aspheric surface coefficient | −3.35595E−31 | −6.43121E−30 |
| Eighteenth aspheric surface coefficient | 4.91953E−33 | −2.66288E−32 |
| Nineteenth aspheric surface coefficient | 0.00000E+00 | 2.54245E−33 |

TABLE 10

|  | 23 | 24 |
|---|---|---|
| Radius of Y curvature | 73.280 | 1482.000 |
| Conic constant (K) | 2.2860 | 0.0000 |
| Fourth coefficient (A) | 2.64951E−06 | 9.91970E−06 |
| Sixth coefficient (B) | −6.98677E−09 | −1.08993E−08 |
| Eighth coefficient (C) | −2.94198E−13 | −7.46212E−13 |
| Tenth coefficient (D) | −6.61209E−16 | 3.04687E−15 |
| Twelfth coefficient (E) | 6.89269E−20 | 3.62240E−20 |
| Fourteenth coefficient (F) | 6.49006E−22 | 4.84323E−22 |
| Sixteenth coefficient (G) | 7.84597E−25 | −1.05254E−25 |
| Eighteenth coefficient (H) | 1.16628E−27 | −3.50649E−28 |
| Twentieth coefficient (J) | −1.42212E−30 | 0.00000E+00 |

According to the projection system 3E of the present example, since the second-lens-unit first lens L13 is a positive lens, the intermediate image 30 is readily formed in a position shifted from the second-lens-unit first lens L13 toward the first lens unit LU1. Since the intermediate image 30 is formed by the positive lens, distortion produced by the first lens unit LU1 is readily corrected by the second lens unit LU2. Further, the chief ray of the off-axis light rays that travel between the first-lens-unit twelfth lens L12 and the second-lens-unit first lens L13, which are located on opposite sides of the intermediate image 30, approaches the optical axis L when the chief ray travels from the second-lens-unit first lens L13 toward the first-lens-unit twelfth lens L12, and the focus position P on the intermediate image 30 where the off-axis light rays are brought into focus approaches the second-lens-unit first lens L13 with distance toward the off-axis side. As a result, the distortion produced by the first lens unit LU1 is more readily corrected by the second lens unit LU2.

The projection system 3E satisfies the following conditional expression (1):

$$-0.3 \leq fU1/fU2 < 0 \quad (1)$$

where fU1 denotes the focal length of the first lens unit LU1, and fU2 denotes the focal length of the second lens unit LU2.

That is, $fU1=12.13$, $fU2=-333.14$, and $fU1/fU2=-0.036$.

Since the projection system 3E satisfies the conditional expression (1), it is easy to increase the maximum angle of view to a value greater than or equal to 120° (increase the half angle of view ω to a value greater than or equal to 60°) without an increase in the number of lenses suppressed. Further, the lens diameter of the second lens unit LU2 can be reduced. That is, when the value of the conditional expression (1) exceeds the lower limit, the focal length of the first lens unit LU1 increases, so that it is not easy to increase the angle of view. Further, when the value of the conditional expression (1) exceeds the lower limit, the inclination of the light rays between the second lens unit LU2 and the intermediate image 30 with respect to the optical axis L increases, resulting in degradation in field curvature and an increase in the diameter of the lens that is provided in the second lens unit LU2 and closest to the intermediate image 30 (second-lens-unit first lens L13). On the other hand, when the value of the conditional expression (1) exceeds the upper limit, the second lens unit LU2 has positive power, so that the light rays incident from the side facing the intermediate image 30 on the first lens unit LU1 become roughly telecentric light rays or light rays the overall diameter of which increases. As a result, since the burden on the first lens unit increases, it is necessary to increase the number of lenses of the first lens unit LU1 for aberration correction. Further, since the projection system 3E of the present example satisfies the conditional expression (1), an increase in the size of the first-lens-unit first lens L1 can be suppressed.

In the projection system 3E, the second-lens-unit first lens L13 has a refractive index nd13 and an Abbe number vd13 as follows:

$nd13=1.90366$; and $vd13=31.32$, and the following conditional expressions (2) and (3) are satisfied.

$$nd1 > 1.7 \quad (2)$$

$$vd1 < 35 \quad (3)$$

In the projection system 3E of the present example, since the refractive index of the second-lens-unit first lens L13, which has positive power, satisfies the conditional expression (2) (refractive index is greater than 1.7), the intermediate image 30 is readily formed in a position shifted from the second-lens-unit first lens L13 toward the first lens unit LU1. Further, since the Abbe number of the second-lens-unit first lens L13 satisfies the conditional expression (3) (Abbe number is smaller than 35), chromatic aberrations can be satisfactorily corrected.

Further, in the projection system 3E, the second-lens-unit ninth lens L21 (second-lens-unit reduction-side first lens) has a refractive index nd11 and an Abbe number vd11, and the second-lens-unit eighth lens L20 (second-lens-unit reduction-side second lens) has a refractive index nd12 and an Abbe number vd12 as follows:

$nd11=1.92286$;

$vd11=20.88$;

$nd12=1.497$; and $vd12=81.54$, and the refractive index nd11 and the Abbe number vd11 and the refractive index nd12 and the Abbe number vd12 satisfy the following conditional expressions (8) to (11).

$$1.75 < nd11 < 2 \quad (8)$$

$$20 < vd11 < 45 \quad (9)$$

$$nd11 - nd12 > 0.1 \quad (10)$$

$$vd12 - vd11 > 40 \quad (11)$$

That is, the values of the conditional expressions (10) and (11) are as follows:

$nd11-nd12=1.92286-1.497=0.42586$; and $vd12-vd11=81.54-20.88=60.66$.

In the projection system 3E, the second-lens-unit ninth lens L21, which is provided in the second lens group LG2 and closest to the liquid crystal panels, has positive power, the second-lens-unit eighth lens L20, which is located in the position adjacent to the second-lens-unit ninth lens L21 on the side closer to the intermediate image 30, is a meniscus lens having negative power, and the refractive indices and Abbe numbers of the second-lens-unit ninth lens L21 and the second-lens-unit eighth lens L20 satisfy the conditional expressions (8) to (11). Chromatic aberrations can therefore be satisfactorily corrected.

Further, in the projection system 3E, the first-lens-unit twelfth lens L12 is an aspheric lens. Since this lens is an aspheric lens, field curvature can be corrected in a high image height position. Field curvature can therefore be satisfactorily corrected.

The first-lens-unit twelfth lens L12 has a refractive index nd12 and an Abbe number vd12 as follows:

$$nd12=1.693; \text{ and}$$

$$vd12=53.18,$$

and the refractive index nd12 and the Abbe number vd12 satisfy the following conditional expressions (6) and (7).

$$1.5<nd12<1.8 \quad (6)$$

$$35<vd12<85 \quad (7)$$

In the projection system 3E, since the first-lens-unit twelfth lens L12, which is located on the enlargement-side of the intermediate image 30 (side facing screen S), satisfies the conditional expression (6), field curvature can be satisfactorily corrected. Further, since the first-lens-unit twelfth lens L12, which is located on the enlargement-side of the intermediate image 30 (side facing screen S), satisfies the conditional expressions (7), chromatic aberrations can be satisfactorily corrected.

Figure 20:
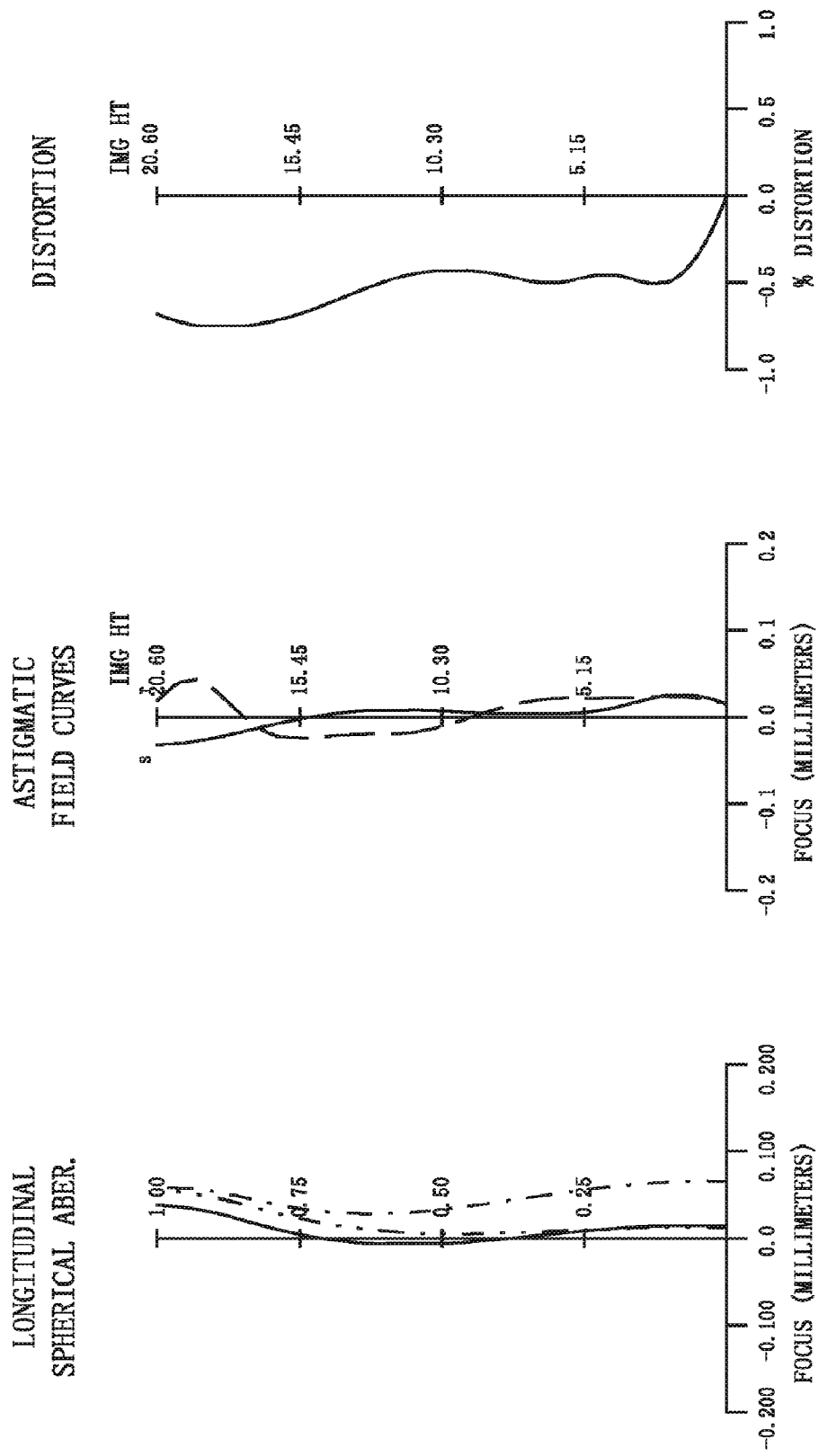
FIG. 20 is an aberration diagram of the projection system in a case where the lenses thereof are located in Position 1.
Figure 21:
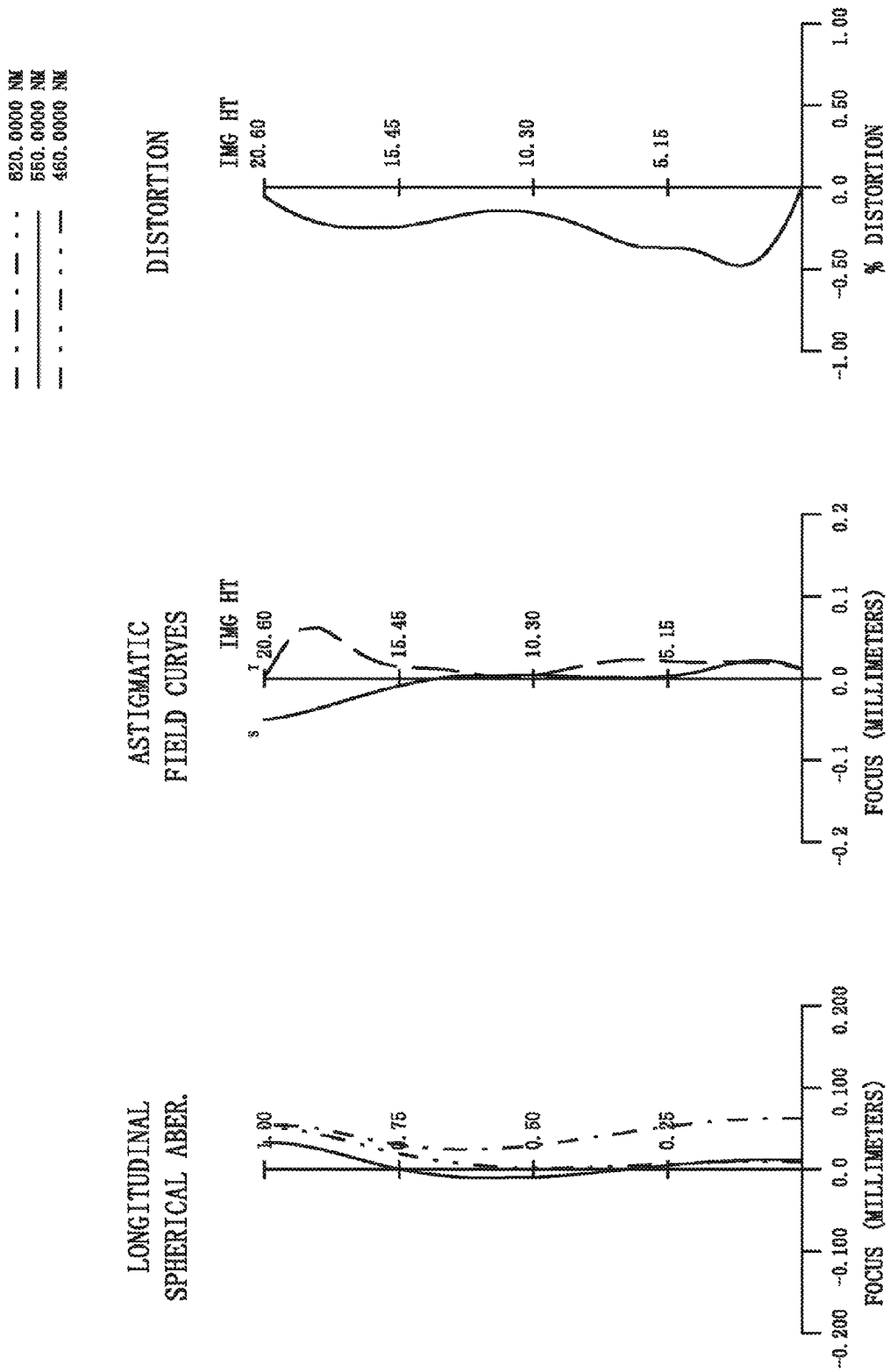
FIG. 21 is an aberration diagram of the projection system in a case where the lenses thereof are located in Position 2.

FIG. 20 is an aberration diagram (spherical aberration, astigmatism, and distortion) in the case where the lenses of the projection system 3E are located in Position 1. FIG. 21 is an aberration diagram (spherical aberration, astigmatism, and distortion) in the case where the lenses of the projection system 3E are located in Position 2. FIG. 22 is an aberration diagram (spherical aberration, astigmatism, and distortion) in the case where the lenses of the projection system 3E are located in Position 3. In the projection system 3E, the spherical aberration, astigmatism, and distortion are satisfactorily corrected, as shown in FIGS. 20 to 22.

Further, in the projection system 3E, the first-lens-unit first lens L1 is made of a resin and is therefore readily processed. The manufacturing cost of the projection system 3E can therefore be suppressed. The manufacturing cost of the projector 1 can be suppressed accordingly. Further, since the first-lens-unit first lens L1 is an aspheric lens, the diameter thereof is readily reduced.

To incorporate the projection system 3E into the projector 1, the first mirror 31 is disposed between the second-lens-unit first lens L13 and the second-lens-unit second lens L14 to deflect the optical path (optical axis L) therebetween, as in the case where the projection system 3A of Example 1 is incorporated into the projector 1 (see FIG. 6). Further, the second mirror 32 is disposed between the first-lens-unit sixth lens L6 and the first-lens-unit seventh lens L7 to deflect the optical path (optical axis L) therebetween.

Since the arrangement of the first mirror 31 and the second mirror 32 in the projection system 3E allows the optical axis L to be oriented in a desired direction, the projection system 3E is readily incorporated into the projector 1. Further, since the on-axis inter-surface distance between the second-lens-unit first lens L13 and the second-lens-unit second lens L14 and the on-axis inter-surface distance between the first-lens-unit sixth lens L6 and the first-lens-unit seventh lens L7 have large values, the mirrors are readily disposed between these lenses. Moreover, the arrangement of the first mirror 31 between the second-lens-unit first lens L13 and the second-lens-unit second lens L14 allows the intermediate image 30 to be formed in a position relatively remote from the first mirror 31. As a result, in a case where scratches, dust, and other defects are present on the surface of the first mirror 31, a situation in which these undesirable objects are displayed on the screen S (enlargement-side image formation plane) can be avoided.

The entire disclosure of Japanese Patent Application No. 2016-109811, filed Jun. 1, 2016 and Japanese Patent Application No. 2016-239109, filed Dec. 9, 2016 are expressly incorporated by reference herein.

What is claimed is:

1. A projection system comprising:
    a first lens unit that makes an enlargement-side image formation plane, which is located on an enlargement-side, conjugate with an intermediate image; and
    a second lens unit that makes the intermediate image conjugate with a reduction-side image formation plane, which is located on a reduction side,
    wherein the first lens unit has positive power,
    the second lens unit has negative power,
    a second-lens-unit intermediate-image-side first lens, which is provided in the second lens unit and closest to the intermediate image, has positive power,
    the following expression is satisfied:

$$-0.3 \le fU1/fU2<0$$

where fU1 denotes a focal length of the first lens unit, and fU2 denotes a focal length of the second lens unit, and
    the first lens unit includes a first-lens-unit enlargement-side lens, a first lens group having at least two lenses each having negative power, and a second lens group arranged from the enlargement-side toward the intermediate image, and to change a size of an image projected on the enlargement-side image formation plane, the first lens group and the second lens group are moved along an optical axis with the first-lens-unit enlargement-side lens fixed to perform focusing.

2. The projection system according to claim 1, wherein a chief ray of off-axis light rays that travel between the second-lens-unit intermediate-image-side first lens and a first-lens-unit intermediate-image-side lens, which is provided in the first lens unit and closest to the intermediate image, approaches an optical axis as the chief ray travels from the second-lens-unit intermediate-image-side first lens toward the first-lens-unit intermediate-image-side lens.

3. A projection-type image display apparatus comprising:
    the projection system according to claim 2; and
    an image display device that displays an image in the reduction-side image formation plane.

4. The projection system according to claim 1, wherein a focus position on the intermediate image where off-axis light rays are brought into focus is closer to an intermediate-image-side of the second-lens-unit first lens than to an intermediate-image-side of any lens of the first lens unit.

5. A projection-type image display apparatus comprising:
    the projection system according to claim 4; and
    an image display device that displays an image in the reduction-side image formation plane.

6. The projection system according to claim 1, wherein the second-lens-unit intermediate-image-side first lens has a refractive index greater than 1.7 and less than 1.93 and an Abbe number smaller than 35 and greater than 20.

7. A projection-type image display apparatus comprising:
the projection system according to claim 6; and
an image display device that displays an image in the reduction-side image formation plane.

8. The projection system according to claim 1, wherein the first-lens-unit enlargement-side lens, which is provided in the first lens unit and closest to the enlargement-side image formation plane, is made of a resin and is an aspheric lens having negative power.

9. A projection-type image display apparatus comprising:
the projection system according to claim 8; and
an image display device that displays an image in the reduction-side image formation plane.

10. The projection system according to claim 1, wherein at least one of a first-lens-unit intermediate-image-side lens, which is provided in the first lens unit and is closest to the intermediate image, and a second-lens-unit intermediate-image-side second lens, which is provided in the second lens unit and located in a position adjacent to the second-lens-unit intermediate-image-side first lens, is an aspheric lens.

11. A projection-type image display apparatus comprising:
the projection system according to claim 10; and
an image display device that displays an image in the reduction-side image formation plane.

12. The projection system according to claim 1, wherein the second lens unit includes a mirror that is located between the second-lens-unit intermediate-image-side first lens and a second-lens-unit intermediate-image-side second lens, which is located in a position adjacent to the second-lens-unit intermediate-image-side first lens, and the mirror deflects an optical path between the second-lens-unit intermediate-image-side first lens and the second-lens-unit intermediate-image-side second lens.

13. A projection-type image display apparatus comprising:
the projection system according to claim 12; and
an image display device that displays an image in the reduction-side image formation plane.

14. The projection system according to claim 1,
wherein a second-lens-unit reduction-side first lens, which is provided in the second lens unit and closest to the reduction-side image formation plane, and a second-lens-unit reduction-side second lens, which is located in a position adjacent to the second-lens-unit reduction-side first lens on a side closer to the intermediate image, each have positive power, and
at least one of the second-lens-unit reduction-side first lens and the second-lens-unit reduction-side second lens has a refractive index greater than 1.75 but smaller than 2.00 and an Abbe number greater than 20 but smaller than 45.

15. A projection-type image display apparatus comprising:
the projection system according to claim 14; and
an image display device that displays an image in the reduction-side image formation plane.

16. The projection system according to claim 1,
wherein a second-lens-unit reduction-side first lens, which is provided in the second lens unit and closest to the reduction-side image formation plane, has positive power,
a second-lens-unit reduction-side second lens, which is located in a position adjacent to the second-lens-unit reduction-side first lens on a side closer to the intermediate image, has negative power, and
the following expressions are satisfied:

$$1.75 < nd11 < 2;$$

$$20 < vd11 < 45;$$

$$0.45 > nd11 - nd12 > 0.1; \text{ and}$$

$$61 > vd12 - vd11 > 40$$

where nd11 and vd11 denote a refractive index and an Abbe number of the second-lens-unit reduction-side first lens, respectively, and nd12 and vd12 denote a refractive index and an Abbe number of the second-lens-unit reduction-side second lens, respectively.

17. The projection system according to claim 1, wherein a maximum angle of view is between 120° and 180°.

18. A projection-type image display apparatus comprising:
the projection system according to claim 1; and
an image display device that displays an image in the reduction-side image formation plane.

* * * * *